(12) United States Patent
Peters et al.

(10) Patent No.: US 9,456,942 B2
(45) Date of Patent: *Oct. 4, 2016

(54) METHOD AND APPARATUS FOR SETTING OR MODIFYING PROGRAMMABLE PARAMETER IN POWER DRIVEN WHEELCHAIR

(71) Applicant: Invacare Corporation, Elyria, OH (US)

(72) Inventors: Darryl Peters, Elyria, OH (US); Bruce A. Jaenke, Parma, OH (US); Carrie L. Burke, Fort Myers, FL (US); Gary E. Chopcinski, North Ridgeville, OH (US)

(73) Assignee: Invacare Corporation, Elyria, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/641,880

(22) Filed: Mar. 9, 2015

(65) Prior Publication Data

US 2015/0342807 A1   Dec. 3, 2015

Related U.S. Application Data

(63) Continuation of application No. 14/027,970, filed on Sep. 16, 2013, now Pat. No. 8,977,431, which is a (Continued)

(51) Int. Cl.
| | |
|---|---|
| *A61G 5/00* | (2006.01) |
| *G05B 19/00* | (2006.01) |

(Continued)

(52) U.S. Cl.
CPC . *A61G 5/10* (2013.01); *A61G 5/04* (2013.01); *G05B 19/106* (2013.01);

(Continued)

(58) Field of Classification Search
USPC ...................................................... 701/1, 36
See application file for complete search history.

(56) References Cited

U.S. PATENT DOCUMENTS

| | | | |
|---|---|---|---|
| 1,114,948 A | 10/1914 | Walker | |
| 2,759,525 A | 8/1956 | Reis | |

(Continued)

FOREIGN PATENT DOCUMENTS

| | | |
|---|---|---|
| DE | 3923937 | 1/1990 |
| DE | 3923937 A1 | 1/1990 |

(Continued)

OTHER PUBLICATIONS

Notice of Allowance in U.S. Appl. No. 13/430,011 dated Jan. 9, 2013.

(Continued)

*Primary Examiner* — Yonel Beaulieu
(74) *Attorney, Agent, or Firm* — Calfee, Halter & Griswold LLP

(57) ABSTRACT

A method and apparatus for setting or modifying a programmable operating parameter associated with a power driven wheelchair is provided. In one embodiment, the method includes: a) operating a user interface device associated with a power driven wheelchair in a programming mode, b) selecting a programmable operating parameter associated with operation of the power driven wheelchair using the user interface device, c) selecting a value for the programmable operating parameter using the user interface device, and d) saving the selected value for the programmable operating parameter in a portion of a storage device associated with the power driven wheelchair using the user interface device. A method and apparatus for selecting one or more programmable parameter sets from a portable storage medium and saving the selected sets to a local storage device associated with a power driven wheelchair and vice versa is also provided.

20 Claims, 31 Drawing Sheets

Related U.S. Application Data continuation of application No. 13/311,140, filed on Dec. 5, 2011, now Pat. No. 8,793,032, which is a continuation of application No. 11/514,016, filed on Aug. 31, 2006, now Pat. No. 8,073,588.

(60) Provisional application No. 60/712,987, filed on Aug. 31, 2005, provisional application No. 60/727,005, filed on Oct. 15, 2005, provisional application No. 60/726,983, filed on Oct. 15, 2005, provisional application No. 60/726,666, filed on Oct. 15, 2005, provisional application No. 60/726,981, filed on Oct. 15, 2005, provisional application No. 60/726,993, filed on Oct. 15, 2005, provisional application No. 60/727,249, filed on Oct. 15, 2005, provisional application No. 60/727,250, filed on Oct. 15, 2005.

(51) Int. Cl.
 A61G 5/10 (2006.01)
 A61G 5/04 (2013.01)
 G05B 19/10 (2006.01)
 A61G 5/12 (2006.01)
 A61G 7/057 (2006.01)

(52) U.S. Cl.
 CPC .......... A61G 5/1059 (2013.01); A61G 5/1075 (2013.01); A61G 5/12 (2013.01); A61G 2005/1089 (2013.01); A61G 2005/128 (2013.01); A61G 2007/05784 (2013.01); A61G 2203/14 (2013.01); A61G 2203/20 (2013.01); B60Y 2200/84 (2013.01); G05B 2219/23128 (2013.01); G05B 2219/23129 (2013.01); G05B 2219/23159 (2013.01); G05B 2219/23193 (2013.01); G05B 2219/23332 (2013.01); G05B 2219/23388 (2013.01); G05B 2219/2637 (2013.01); Y02T 10/643 (2013.01); Y02T 10/7258 (2013.01)

(56) References Cited

U.S. PATENT DOCUMENTS

| | | |
|---|---|---|
| 3,454,305 A | 7/1969 | Gilmour |
| 4,207,959 A | 6/1980 | Youdin et al. |
| 4,736,921 A | 4/1988 | Zane et al. |
| 4,779,884 A | 10/1988 | Minati |
| 4,951,766 A | 8/1990 | Basedow et al. |
| 5,033,000 A | 7/1991 | Littlejohn et al. |
| 5,157,768 A | 10/1992 | Hoeber et al. |
| 5,187,797 A | 2/1993 | Nielsen et al. |
| 5,197,559 A | 3/1993 | Garin et al. |
| 5,234,066 A | 8/1993 | Ahsing et al. |
| 5,245,558 A | 9/1993 | Hachey |
| 5,248,007 A | 9/1993 | Watkins et al. |
| 5,261,715 A | 11/1993 | Blatt et al. |
| 5,299,824 A | 4/1994 | Roberts et al. |
| 5,516,021 A | 5/1996 | Douglass |
| 5,547,038 A | 8/1996 | Madwed |
| 5,555,949 A | 9/1996 | Stallard et al. |
| 5,647,520 A | 7/1997 | McDaid |
| 5,701,965 A | 12/1997 | Kamen et al. |
| 5,718,442 A | 2/1998 | Alexander et al. |
| 5,794,730 A | 8/1998 | Kamen |
| 5,817,137 A | 10/1998 | Kaemmerer |
| 5,899,526 A | 5/1999 | LaPointe et al. |
| 5,961,561 A | 10/1999 | Wakefield |
| 6,068,280 A | 5/2000 | Torres |
| 6,135,476 A | 10/2000 | Dickie et al. |
| 6,138,970 A | 10/2000 | Sohrt et al. |
| 6,152,246 A | 11/2000 | King et al. |
| 6,154,690 A | 11/2000 | Coleman |
| 6,170,598 B1 | 1/2001 | Furukawa |
| 6,290,011 B1 | 9/2001 | Langaker et al. |
| 6,354,390 B1 | 3/2002 | Uchiyama et al. |
| 6,390,426 B1 | 5/2002 | Berry |
| 6,409,265 B1 | 6/2002 | Koerlin et al. |
| 6,425,635 B1 | 7/2002 | Pulver |
| 6,588,792 B1 | 7/2003 | Koerlin et al. |
| 6,688,571 B1 | 2/2004 | Pauls |
| 6,715,784 B2 | 4/2004 | Koerlin et al. |
| 6,816,762 B2 | 11/2004 | Hensey et al. |
| 6,819,981 B2 | 11/2004 | Wakefield, II et al. |
| 6,832,745 B2 | 12/2004 | Lindsay |
| 6,842,692 B2 | 1/2005 | Fehr et al. |
| 6,866,107 B2 | 3/2005 | Heinzmann et al. |
| 6,868,931 B2 | 3/2005 | Morrrell et al. |
| 6,871,122 B1 | 3/2005 | Wakefield, II |
| 6,874,591 B2 | 4/2005 | Morrell et al. |
| 6,926,106 B2 | 8/2005 | Richey, II et al. |
| 6,938,923 B2 | 9/2005 | Mulhern et al. |
| 6,974,194 B2 | 12/2005 | Schreiber et al. |
| 6,976,699 B2 | 12/2005 | Koerlin |
| 6,989,642 B2 | 1/2006 | Wakefield, II et al. |
| 6,991,292 B2 | 1/2006 | Kasten |
| 7,003,381 B2 | 2/2006 | Wakefield, II |
| 7,083,019 B2 | 8/2006 | Chiou et al. |
| 7,113,854 B2 | 9/2006 | Mansell et al. |
| 7,148,638 B2 | 12/2006 | Wakefield, II |
| 7,159,181 B2 | 1/2007 | Mansell et al. |
| 7,171,288 B2 | 1/2007 | Wakefield, II |
| 7,246,856 B2 | 7/2007 | Kruse et al. |
| 7,262,762 B2 | 8/2007 | McAlindon |
| 7,296,312 B2 | 11/2007 | Menkedick et al. |
| 7,310,776 B2 | 12/2007 | Mansell et al. |
| 7,374,679 B2 | 5/2008 | Huang et al. |
| 7,403,844 B2 | 7/2008 | Chopcinski et al. |
| 7,461,897 B2 | 12/2008 | Kruse et al. |
| 7,635,164 B2 | 12/2009 | Torres et al. |
| 7,668,634 B2 | 2/2010 | Mansell et al. |
| 8,065,051 B2 | 11/2011 | Chopcinski et al. |
| 8,073,585 B2 | 12/2011 | Jaenke et al. |
| 8,073,588 B2 | 12/2011 | Peters et al. |
| 8,127,875 B2 | 3/2012 | Mattes |
| 8,145,373 B2 | 3/2012 | Jaenke |
| 8,285,440 B2 | 10/2012 | Jaenke |
| 8,315,753 B2 | 11/2012 | Meyer |
| 8,437,899 B2 | 5/2013 | Jaenke et al. |
| 8,646,551 B2 | 2/2014 | Mattes |
| 8,793,032 B2 | 7/2014 | Peters et al. |
| 8,977,431 B2* | 3/2015 | Peters ............. A61G 5/10 701/1 |
| 2002/0008718 A1 | 1/2002 | Obradovich |
| 2002/0173993 A1 | 11/2002 | Skulason et al. |
| 2003/0001875 A1 | 1/2003 | Black |
| 2003/0090089 A1 | 5/2003 | Koerlin et al. |
| 2003/0109973 A1 | 6/2003 | Hensey et al. |
| 2003/0120601 A1 | 6/2003 | Ouye et al. |
| 2003/0127261 A1 | 7/2003 | Borroni-Bird et al. |
| 2004/0002305 A1 | 1/2004 | Byman-Kivivuori et al. |
| 2004/0004372 A1 | 1/2004 | Mullen et al. |
| 2004/0006422 A1 | 1/2004 | Fehr |
| 2004/0085295 A1 | 5/2004 | Cowen |
| 2004/0094936 A1 | 5/2004 | Koerlin |
| 2004/0195173 A1 | 10/2004 | Huang et al. |
| 2004/0210351 A1 | 10/2004 | Wakefield, II et al. |
| 2004/0227728 A1 | 11/2004 | McAlindon |
| 2004/0252341 A1 | 12/2004 | Adachi et al. |
| 2004/0259591 A1 | 12/2004 | Grams et al. |
| 2005/0062726 A1 | 3/2005 | Marsden et al. |
| 2005/0075758 A1 | 4/2005 | Wakefield, II |
| 2005/0076308 A1 | 4/2005 | Mansell et al. |
| 2005/0080518 A1 | 4/2005 | Wakefield |
| 2005/0082995 A1 | 4/2005 | Wakefield, II et al. |
| 2005/0107925 A1 | 5/2005 | Enigk et al. |
| 2005/0195173 A1 | 9/2005 | McKay |
| 2005/0236196 A1 | 10/2005 | Runkles et al. |
| 2005/0236208 A1 | 10/2005 | Runkles et al. |
| 2005/0236217 A1 | 10/2005 | Koerlin et al. |
| 2006/0247836 A1 | 11/2006 | Mansell et al. |
| 2007/0050096 A1 | 3/2007 | Mattes et al. |
| 2007/0050111 A1 | 3/2007 | Mattes et al. |

(56) References Cited

U.S. PATENT DOCUMENTS

| | | |
|---|---|---|
| 2007/0055424 A1 | 3/2007 | Peters et al. |
| 2007/0056780 A1 | 3/2007 | Jaenke et al. |
| 2007/0056781 A1 | 3/2007 | Mattes et al. |
| 2007/0056782 A1 | 3/2007 | Chopcinski et al. |
| 2007/0067072 A1 | 3/2007 | Chopcinski et al. |
| 2007/0074917 A1 | 4/2007 | Jaenke et al. |
| 2007/0080003 A1 | 4/2007 | Koerlin et al. |
| 2007/0130522 A1 | 6/2007 | Mansell et al. |
| 2007/0262629 A1 | 11/2007 | Kruse et al. |
| 2008/0030463 A1 | 2/2008 | Forest |
| 2008/0097254 A1 | 4/2008 | Torres et al. |
| 2008/0249694 A1 | 10/2008 | Jaenke et al. |
| 2009/0121532 A1 | 5/2009 | Kruse et al. |
| 2009/0153370 A1 | 6/2009 | Cooper et al. |
| 2010/0082182 A1 | 4/2010 | Griggs et al. |
| 2012/0064502 A1 | 3/2012 | Chopcinski |
| 2012/0166020 A1 | 6/2012 | Mattes |
| 2014/0058582 A1 | 2/2014 | Jaenke |
| 2014/0067158 A1 | 3/2014 | Peters et al. |

FOREIGN PATENT DOCUMENTS

| | | |
|---|---|---|
| DE | 3832844 | 3/1990 |
| DE | 3832844 A1 | 3/1990 |
| EP | 0345785 | 12/1989 |
| EP | 0436103 | 7/1991 |
| EP | 1148394 | 10/1991 |
| GB | 2222701 | 3/1990 |
| JP | 2008-194183 | 8/2008 |
| JP | 2009-261472 | 1/2009 |
| JP | 2009-078028 | 4/2009 |
| JP | 2010-017354 | 1/2010 |
| WO | 03034967 | 5/2003 |
| WO | 2004/036390 | 4/2004 |
| WO | 2005032924 | 4/2005 |
| WO | 2005037168 | 4/2005 |
| WO | 2005039473 | 5/2005 |
| WO | 2005039930 | 5/2005 |
| WO | 2007027845 | 3/2007 |
| WO | 2007027846 | 3/2007 |
| WO | 2007027851 | 3/2007 |
| WO | 2007027852 | 3/2007 |
| WO | 2007027853 | 3/2007 |
| WO | 2007027857 | 3/2007 |
| WO | 2007027872 | 3/2007 |
| WO | 2007027971 | 3/2007 |
| WO | WO 2007027846 A2 | 3/2007 |
| WO | WO 2007027851 A2 | 3/2007 |
| WO | WO 2007027852 A2 | 3/2007 |
| WO | WO 2007027853 A2 | 3/2007 |
| WO | WO 2007027857 A2 | 3/2007 |
| WO | WO 2007027872 A2 | 3/2007 |
| WO | WO 2007027971 A2 | 3/2007 |

OTHER PUBLICATIONS

First Office Action in CA Application No. 2,614,744 dated Feb. 1, 2013.
First Office Action from CA Application No. 2,615,084 dated Feb. 1, 2013.
2nd Examination Report from AU Appl. No. 2006284747 dated Mar. 21, 2013.
First Office Action in CA Application No. 2,615,087 dated Mar. 1, 2013.
Office action from U.S. Appl. No. 13/412,034 dated Mar. 19, 2013.
Response to Office Action from AU Application No. 2006284747 dated Feb. 26, 2013.
First Office Action in CA Application No. 2,616,332 dated Feb. 5, 2013.
First Office Action in CA Application No. 2,616,325 dated Feb. 4, 2013.
First Office Action from CA Application No. 2,615,091 dated Jan. 30, 2013.
Corrected Notice of Allowability for U.S. Appl. No. 13/430,011 dated Feb. 19, 2013.
First Office Action from CA Application No. 2,614,752 dated Feb. 5, 2013.
Teknic, Inc., "The price/performance leader for OEM machine automation", Investigating Servo Architectures, 14 pgs. printed Aug. 15, 2006 from http://www.teknic.com/systems/, copyright 2006.
Office action from U.S. Appl. No. 11/513,740 dated Feb. 4, 2010.
Response from U.S. Appl. No. 11/513,740 dated Jul. 6, 2010.
Office action from U.S. Appl. No. 11/513,740 dated Oct. 4, 2010.
Response from U.S. Appl. No. 11/513,740 dated Feb. 4, 2011.
Office action from U.S. Appl. No. 11/513,740 dated Apr. 21, 2011.
Response from U.S. Appl. No. 11/513,740 dated Jul. 21, 2011.
Office action from U.S. Appl. No. 11/513,740 dated Oct. 18, 2011.
Office action from U.S. Appl. No. 11/514,016 dated Feb. 22, 2010.
Response from U.S. Appl. No. 11/514,016 filed Jul. 21, 2010.
Notice of Allowance from U.S. Appl. No. 11/514,016 dated Sep. 30, 2010.
Comments on Statement of Reasons for Allowance from U.S. Appl. No. 11/514,016 dated Oct. 29, 2010.
Notice of Allowance from U.S. Appl. No. 11/514,016 dated Jan. 19, 2011.
Notice of Allowance from U.S. Appl. No. 11/514,016 dated May 5, 2011.
Response from U.S. Appl. No. 11/514,016 dated Aug. 4, 2011.
Notice of Allowance from U.S. Appl. No. 11/514,016 dated Sep. 12, 2011.
Office action from U.S. Appl. No. 11/513,854 dated Apr. 15, 2009.
Response from U.S. Appl. No. 11/513,854 dated Oct. 15, 2009.
Office action from U.S. Appl. No. 11/513,854 dated Feb. 3, 2010.
Response from U.S. Appl. No. 11/513,854 dated Aug. 3, 2010.
Notice of Allowance from U.S. Appl. No. 11/513,854 dated Jul. 18, 2011.
Notice of Allowance from U.S. Appl. No. 11/513,854 dated Oct. 4, 2011.
U.S. Appl. No. 11/511,606, Notice of Allowance and Fees Due with Notice of Allowability, 5 pages, mailed May 8, 2008.
Response to Office action from U.S. Appl. No. 11/511,606 dated Jan. 8, 2008.
Office Action from U.S. Appl. No. 11/511,606, 5 pages, mailed Sep. 13, 2007.
Response to Office action from U.S. Appl. No. 11/511,606 dated Aug. 24, 2007.
U.S. Appl. No. 11/511,606, Final Office Action, 5 pages, mailed Jun. 7, 2007.
Response to Office action from U.S. Appl. No. 11/511,606 submitted Mar. 21, 2007.
U.S. Appl. No. 11/511,606, Non-final Office Action, 4 pages, mailed Dec. 21, 2006.
Office action from U.S. Appl. No. 11/513,780 dated Jan. 27, 2011.
Response from U.S. Appl. No. 11/513,780 dated Apr. 27, 2011.
Office action from U.S. Appl. No. 11/513,780 dated Aug. 2, 2011.
U.S. Appl. No. 11/513,746, Non-final Office Action, 7 pages, mailed Jun. 26, 2008.
Response to Office action from U.S. Appl. No. 11/513,746 dated Oct. 27, 2008.
Office action from U.S. Appl. No. 11/513,746 dated Jan. 15, 2009.
Office action from U.S. Appl. No. 11/513,802 dated Aug. 7, 2009.
Response from U.S. Appl. No. 11/513,802 dated Dec. 3, 2009.
Office action from U.S. Appl. No. 11/513,802 dated Mar. 19, 2010.
Response from U.S. Appl. No. 11/513,802 dated Aug. 19, 2010.
Office action from U.S. Appl. No. 11/513,802 dated Oct. 6, 2010.
Response from U.S. Appl. No. 11/513,802 dated Feb. 4, 2011.
Office action from U.S. Appl. No. 11/513,802 dated Apr. 14, 2011.
Response from U.S. Appl. No. 11/513,802 dated Jul. 14, 2011.
Notice of Allowance from U.S. Appl. No. 11/513,802 dated Aug. 25, 2011.
Notice of Allowance from U.S. Appl. No. 11/513,802 dated Oct. 31, 2011.
Office action from U.S. Appl. No. 12/064,697 dated Jun. 22, 2011.
Amendment with Terminal Disclaimer from U.S. Appl. No. 12/064,697 dated Sep. 22, 2011.

(56) References Cited

OTHER PUBLICATIONS

Notice of Allowance from U.S. Appl. No. 12/064,697 dated Nov. 23, 2011.
Office action from Australian Application No. 2006284687 dated Jul. 26, 2011.
Response to Office action from Australian Application No. 2006284741 dated May 17, 2012.
First Office action from EP Application No. 06814005.2 dated Nov. 2, 2011.
Response from EP Application No. 06814005.2 dated May 4, 2012.
Supplemental Amendment from U.S. Appl. No. 13/228,677 dated May 30, 2012.
Office action for U.S. Appl. No. 13/311,140 dated Jan. 10, 2013.
Office action from New Zealand Application No. 565,932 dated Oct. 12, 2009.
Response from New Zealand Application No. 565,932 dated Mar. 21, 2011.
Office action from New Zealand Application No. 565,932 dated Mar. 29, 2011.
Response from New Zealand Application No. 565,932 dated May 13, 2011.
Office action from New Zealand Application No. 565,933 dated Sep. 28, 2009.
Response from New Zealand Application No. 565,933 dated Feb. 16, 2011.
Office action from New Zealand Application No. 565,933 dated Feb. 28, 2011.
Response from New Zealand Application No. 565,933 dated Apr. 18, 2011.
Office action from New Zealand Application No. 565,934 dated Oct. 12, 2009.
Response from New Zealand Application No. 565,934 dated Mar. 7, 2011.
Office action from New Zealand Application No. 565,934 dated Mar. 28, 2011.
Response from New Zealand Application No. 565,934 dated May 13, 2011.
Office action from New Zealand Application No. 565,935 dated Oct. 5, 2009.
Response from New Zealand Application No. 565,935 dated Feb. 4, 2011.
Office action from New Zealand Application No. 565,935 dated Feb. 18, 2011.
Response from New Zealand Application No. 565,935 dated Apr. 15, 2011.
Office action from New Zealand Application No. 591,829 dated Mar. 28, 2011.
Office action from New Zealand Application No. 592,317 dated Apr. 21, 2011.
Exam Report from Australian Application No. 2013211496 dated Mar. 13, 2015.
Office action from U.S. Appl. No. 14/027,970 dated May 16, 2014.
Office action from New Zealand Application No. 591831 dated Mar. 28, 2011.
Office action from Canadian Application No. 2,615,087 dated Sep. 20, 2013.
Response from U.S. Appl. No. 14/027,970 dated Aug. 18, 2014.
Notice of Allowance from U.S. Appl. No. 14/027,970 dated Oct. 28, 2014.
Response from European Application No. 06813984.9 dated Oct. 31, 2014.
Response from European Application No. 06813991.4 dated Aug. 21, 2014.
Office action from Canadian Application No. 2,616,325 dated Jul. 14, 2014.
Office action from Canadian Application No. 2,616,332 dated Sep. 23, 2014.
Response from Canadian Application No. 2,616,332 dated Apr. 26, 2014.
Electric Motors Reference Center by Machine Design, DC Motors, seven page printout dated Jul. 25, 2006 from http:// www.electricmotors.machinedesign.com/guiEdits/Content/bdeee3//bdeee3_1 . . .
Int'l App. No. PCT/US06/33963, International Preliminary Report on Patentability, mailed Mar. 4, 2008, 7 pages.
Int'l App. No. PCT/US06/33964, International Preliminary Report on Patentability, mailed Mar. 4, 2008, 11 pages.
Int'l App. No. PCT/US06/33971, International Preliminary Report on Patentability, mailed Mar. 4, 2008, 7 pages.
Int'l App. No. PCT/US06/33972, International Preliminary Report on Patentability, mailed Mar. 4, 2008, 6 pages.
Int'l App. No. PCT/US06/33973, International Preliminary Report on Patentability, mailed Mar. 4, 2008, 6 pages.
Int'l App. No. PCT/US06/33978, International Preliminary Report on Patentability, mailed Mar. 4, 2008, 9 pages.
Int'l App. No. PCT/US06/33998, International Preliminary Report on Patentability, mailed Mar. 4, 2008, 7 pages.
Int'l App. No. PCT/US06/33998, International Search Report, mailed Mar. 9, 2007, 4 pages.
Int'l App. No. PCT/US06/33998, Written Opinion of the International Searching Authority, mailed Mar. 9, 2007, 6 pages.
Int'l App. No. PCT/US06/34149, International Preliminary Report on Patentability, mailed Mar. 4, 2008, 7 pages.
Office Action from U.S. Appl. No. 13/412,034 dated Jul. 19, 2012.
Response to Election Requirement for U.S. Appl. No. 13/412,034 dated Nov. 19, 2012.
Notice of Allowance from U.S. Appl. No. 13/975,614 dated Dec. 10, 2014.
Office action from Australian Application No. 2006284747 dated Jul. 1, 2011.
Exam Report from Australian Application No. 2006284748 dated Aug. 29, 2011.
Office action from Australian Application No. 2006284749 dated Apr. 28, 2011.
Office action from Australian Application No. 2006284741 date May 9, 2011.
Office action from Australian Application No. 2006284753 dated Jul. 22, 2011.
Exam Report from Australian Application No. 2006284768 dated Sep. 8, 2011.
Office action from CA Application No. 2,616,332 dated Sep. 26, 2013.
Office Action from Canadian Application No. 2,858,951 dated Jan. 21, 2015.
Office action from New Zealand Application No. 565,929 dated Oct. 8, 2009.
Response from New Zealand Application No. 565,929 dated Mar. 7, 2011.
Office action from New Zealand Application No. 565,929 dated Mar. 25, 2011.
Response from New Zealand Application No. 565,929 dated May 11, 2011.
Office action from New Zealand Application No. 565,930 dated Oct. 7, 2009.
Office action from New Zealand Application No. 565,930 dated Mar. 10, 2011.
Response from New Zealand Application No. 565,930 dated May 5, 2011.
Office action from New Zealand Application No. 565,930 dated May 26, 2011.
Response from New Zealand Application No. 565,930 dated Jun. 24, 2011.
Office action from New Zealand Application No. 565,931 dated Oct. 8, 2009.
Response from New Zealand Application No. 565,931 dated Mar. 7, 2011.
Office action from New Zealand Application No. 565,931 dated Mar. 25, 2011.
Response from New Zealand Application No. 565,931 dated May 4, 2011.
Response to Office Action for U.S. Appl. No. 13/311,140 dated Apr. 10, 2013.

(56) References Cited

OTHER PUBLICATIONS

Notice of Allowance from U.S. Appl. No. 13/311,140 dated May 15, 2013.
Response to Office Action for U.S. Appl. No. 13/412,034 dated Jun. 18, 2013.
Response to Office Action in AU Application No. 2006284753 dated Feb. 27, 2013.
2nd Office Action from EP Appl. No. 06814005.2 dated May 21, 2013 (received Jul. 4, 2013).
Office Action for U.S. Appl. No. 13/301,051 dated May 9, 2013.
Notice of Allowance from U.S. Appl. No. 13/228,677 dated Jun. 5, 2012.
Examiner Initiated Interview Summary from U.S. Appl. No. 13/228,677 dated Jun. 5, 2012.
Statement of Substance of Interview from U.S. Appl. No. 11/513,740 dated Feb. 23, 2012.
Response to Office Action from Australian Application No. 2006284749 dated Apr. 30, 2012.
Second Examination Report from New Zealand Application No. 591,831 dated Aug. 16, 2012.
Office Action from U.S. Appl. No. 13/430,011 dated Aug. 8, 2012.
Asakawa et al., "Experiment on operating methods of an electric wheelchair for a system of detecting position and direction", Robotics and Biomimetics, ROBIO 2007, IEEE Int'l Conf on Digital Object Identifier, 10.1109/ROBIO.2007.4522345, pp. 1260-1265 (2007).
Barea, R., et al., "EOG guidance of a wheelchair using nerual networks", Proceedings 15th Intl Conf. on Pattern Recognition, vol. 4, Digital Object Identifier 10.1109/ICPR.2000.903006, pp. 668-671, published 2000.
Cooper et al., "Analysis of position and isometric joysticks for powered wheelchair driving", Biomedical Engineering, IEEE Transactions on Digital Object Identifier, vol. 47, issue 7, 10.1109/10.846684, published 2000, pp. 902-910.
Jones et al., "Powered wheelchair driving performance using force- and position-sensing joysticks", Bioengineering Conference, Proceedings of the IEEE 24th Annual Northeast, Digital Object identifier, 10.1109/NEBC.1998.664901, pp. 130-132, published 1998.
Katsura et al., "Semiautonomous wheelchair based on quarry of environmental information", IEEE Translations on Industrial Electronics, vol. 53, issue 4, Digital Object Identifier 10.1109/TIE.2006.878294, pp. 1373-1382, published 2006.
Sasaki et al., "Development of a new adaptation system for a manual wheelchair based on human body function", MHS '07 International Symposium on Micro-NanoMechatronics and Human Science, Digital Object Identifier, 10.1109/MHS.2007.4420902, pp. 478-484, published 2007.
Seong-Pal Kang, "A hand gesture controlled semi-autonomous wheelchair", IEEE/RSL Intl Conf on Intelligent Robots and Systems, Digital Object Identifier: 10.1109/IROS.2004.1389968, pp. 3565-3570, vol. 4, published 2004.
Tanimoto et al., "Measurement of wheelchair position for analyzing transfer motion for SCI patient", Imaging Systems and Techniques, IST '07, IEEE International Workshop on Digital Object Identifier, 10.1009/IST.2007.379605, pp. 1-6, published 2007.
Dynamic, Actuator Remote Control Module DX-ARC5 Installation Manual, copyright Jun. 2004, 10 pgs.
Dynamic, DX Attendant Control Unit (ACU) Installation Manual, No. 60013, issue 4, Nov. 1998, 30 pgs.
Dynamic, DX Dolphin Remote (DX-Rem34) Installation Manual, No. 60025, issue 5, Jan. 1999, 69 pgs.
Dynamic, DX Power Module (PMB, PMB1, PMB2, PMB-S) Installation Manual, No. 63824, issue 2, Jul. 1998, 85 pgs.
Dynamic, DX Remote Joystick Module (RJM) Installation Manual, No. 60014, iss. 4, Apr. 1997, 13 pgs.
Dynamic, DX Two Actuator Module (TAM) Installation Manual, No. 60026, issue 5, Jul. 1998, 45 pgs.
Dynamic, DX-GB, The Complete Gearless Brushless DC Control System brochure, 2 pgs., date unknown.
Dynamic, DX-REMG90, DX-REMG90A, DX-REMG9OT Master Remotes Installation Manual, GBK64048, issue 1, Jan. 2005, 61 pgs.
Flash, New and Notable Product Design, p. 28 from Design News Oct. 10, 2005.
Infineon Technologies, "XC164CS 16-Bit Single-Chip Microcontroller", Data Sheet, V2.1, Jun. 2003, 71 pgs.
Int'l App. No. PCT/US06/33963, International Search Report, mailed May 4, 2007, 3 pages.
Int'l App. No. PCT/US06/33963, Written Opinion of the International Searching Authority, mailed May 4, 2007, 6 pages.
Int'l App. No. PCT/US06/33964, International Search Report, mailed May 4, 2007, 3 pages.
Int'l App. No. PCT/US06/33964, Written Opinion of the International Searching Authority, mailed May 4, 2007, 10 pages.
Int'l App. No. PCT/US06/33971, International Search Report, mailed Mar. 9, 2007, 4 pages.
Int'l App. No. PCT/US06/33971, Written Opinion of the International Searching Authority, mailed Mar. 9, 2007, 6 pages.
Int'l App. No. PCT/US06/33973, International Search Report, mailed Mar. 16, 2007, 3 pages.
Int'l App. No. PCT/US06/33973, Written Opinion of the International Searching Authority, mailed Mar. 16, 2007, 5 pages.
Int'l App. No. PCT/US06/33978, International Search Report, mailed Jun. 5, 2007, 7 pages.
Int'l App. No. PCT/US06/33978, Invitation to Pay Additional Fees and Communication Relating to the Results of the Partial International Search, mailed Apr. 5, 2007, 8 pages.
Int'l App. No. PCT/US06/33978, Written Opinion of the International Searching Authority, mailed Jun. 5, 2007, 8 pages.
Int'l App. No. PCT/US06/34149, International Search Report, mailed Jun. 8, 2007, 3 pages.
Int'l App. No. PCT/US06/34149, Written Opinion of the International Searching Authority, mailed Jun. 8, 2007, 7 pages.
Invacare Corporation—Brochure—"Invacare Tarsys Series Powered Seating Systems", Form No. 00-313, rev. Sep. 2002, 16 pgs.
Invacare Corporation—Brochure—"Storm Series Power Wheelchairs including Fomula CG Powered Seating, MK6i Electronics", 16 pgs., 2006, Form No. 06-040.
Invacare Corporation—Brochure "Invacare Storm Series TDX Power Wheelchairs, including Formula Powered Seating", Form No. 03-018, rev. Jul. 2004, 32 pgs.
Invacare, Owner's Operator and Maintenance Manual, 3G Storm Series Wheelchair Bases, Arrow RWD, Torque SP RWD, Ranger X RWD, dated Jun. 30, 2006, 88 pgs., Part No. 1143151.
Invacare, Owner's Operator and Maintenance Manual, Formula, CG Powered Seating Tilt Only, 48 pgs., Part No. 1143155, dated Jun. 30, 2006.
Linak, Product Data Sheet, Actuator LA30, 8 pgs, Chapter 2.1, copyright 05.02.
Linak, Product Data Sheet, Actuator LA31, 8 pgs, Chapter 5.8.2, copyright 05.05.
MK5 Electronics Top 10 Application Features, 2005 Spring Update, 10 pgs (2005).
Paula, Taking sensors out of motors, Mechanical Engineering, The American Society of Mechanical Engineers, www.memagazine.org/backissues/ january98/ features/ sensout/ sensout.html, printed Aug. 16, 2006, 5 pgs (1998).
PG Drives Technology—R-Net Rehab-Powerchair Control System (Presentation), 30 pages, date unknown.
QR-ED Owners's Manual, Quickie Enhanced Display, Sunrise Medical, Inc., Longmont,Colorado, 10519 Rev. A, 2006 (51 pages).
Quantum Rehab Innovative Rehab Solutions, a division of Pride Mobility Products Corp., one page brochure, Q-Logic Drive Control System, QLOGIC-3-13-06 (Mar. 13, 2006).
Quantum Rehab Innovative Rehab Solutions, a division of Pride Mobility Products Group, Q controls, page from http://www.pridemobility.com/quantum/Electronics/Q_Controls/q_controls.html, printed Jun. 9, 2006, copyright 1995-2006.
Quickie HHP Programming Tree, Sunrise Medical, Inc., Longmont, Colorado (7 pages).
Service Manual, Quickie Rhythm & Groove, Sunrise Medical, Inc., Longmont, Colorado, 014061 Rev. A, 2006 (104 pages).

(56) References Cited

OTHER PUBLICATIONS

Specialty Control Set Up & Programming Guide, QR-SCM Owner's Manual, Quickie Electronics Platform powered by Delphi, Sunrise Medical, Inc., Longmont, Colorado, 101748 Rev. A, 2006 (15 pages).
Response from U.S. Appl. No. 13/301,061 dated Mar. 5, 2014.
Office action from U.S. Appl. No. 13/301,061 dated Mar. 27, 2014.
Response from U.S. Appl. No. 13/301,061 dated Jun. 26, 2014.
Office action from U.S. Appl. No. 13/301,061 dated Aug. 6, 2014.
Comments on Statement of Reasons for Allowance from U.S. Appl. No. 13/311,140 dated Aug. 13, 2013.
Notice of Allowance from U.S. Appl. No. 13/311,140 dated Mar. 31, 2014.
Office action from U.S. Appl. No. 13/975,614 dated Apr. 30, 2014.
Response from Canadian Serial No. 2,616,325 dated May 22, 2014.
Office action from Canadian Serial No. 2,616,325 dated Jul. 14, 2014.
Office action from European Application No. 06813984.9 dated Apr. 30, 2014.
Office action from European Application No. 06813991.4 dated Feb. 24, 2014.
Sasaki et al., "Development of a new adaptation system for a manual wheelchair based on human body function", MHS '07 International Symposium on Micro-NanoMechatronics and Human Science, Digital Object Identifier, 10.1109/MHS.2007.4420902, pp. 478-483, published 2007.
Seong-Pal Kang, "A hand gesture controlled semi-autonomous wheelchair", IEEE/RSJ Intl Conf on Intelligent Robots and Systems, Digital Object Identifier: 10.1109/IROS.2004.1389968, pp. 3565-3570, vol. 4, published 2004.
Electric Motors Reference Center by Machine Design, DC Motors, seven page printout dated Jul. 25, 2006 from http://www.electricmotors.machinedesign.com/guiEdits/Content/bdeee3//bdeee3_1.
Response from New Zealand Application No. 565,930 dated Feb. 22, 2011.
Response with RCE from U.S. Appl. No. 11/513,780 dated Feb. 2, 2012.
Office Action from U.S. Appl. No. 11/513,780 dated Mar. 30, 2012.
Final Office Action from U.S. Appl. No. 11/513,740 dated Apr. 13, 2012.
First Office Action from EP Application No. 06813984.9 dated Apr. 24, 2012.
Amendment from U.S. Appl. No. 13/228,677 dated May 2, 2012.
Interview Summary from U.S. Appl. No. 11/513,740 dated Jan. 27, 2012.
Office action from U.S. Appl. No. 11/513,750 dated Nov. 23, 2009.
Response from U.S. Appl. No. 11/513,750 dated May 21, 2010.
Notice of Allowance from U.S. Appl. No. 11/513,750 dated Dec. 2, 2010.
Notice of Allowance from U.S. Appl. No. 11/513,750 dated Jan. 20, 2011.
Notice of Allowance from U.S. Appl. No. 11/513,750 dated May 5, 2011.
Notice of Allowance from U.S. Appl. No. 11/513,750 dated Oct. 12, 2011.
Office action from Australian Application No. 2009230975 dated Nov. 24, 2010.
Response from Australian Application No. 2009230975 dated Nov. 30, 2011.
Office action from U.S. Appl. No. 13/228,677 dated Feb. 2, 2012.
Response from New Zealand Application No. 591,831 dated Jul. 23, 2012.
Response from European Application No. 06813984.9 dated Oct. 18, 2012.
Office action from New Zealand Application No. 592,271 dated Nov. 16, 2012.
Response from U.S. Appl. No. 13/430,011 dated Dec. 7, 2012.
Response from Australian Application No. 2006284687 dated Dec. 19, 2012.
Response from New Zealand Application No. 591,831 dated Nov. 12, 2012.
Ex Parte Quayle Action for U.S. Appl. No. 13/646,989 dated Jun. 27, 2013.
Office action from Canadian Application No. 2,616,332 dated Sep. 26, 2013.
Amendment to Office Action for U.S. Appl. No. 13/301,051 dated Aug. 9, 2013.
Final Office Action for U.S. Appl. No. 13/301,051 dated Aug. 29, 2013.
Non Final Office Action for U.S. Appl. No. 13/301,061 dated Jul. 19, 2013.
Office Action in EP Application No. 06802770.5 dated Jul. 1, 2013.
Response to Office Action in CA Application No. 2,614,744 dated Aug. 1, 2013.
Amendment in CA Application No. 2,615,091 dated Jul. 30, 2013.
Amendment in CA Application No. 2,616,325 dated Aug. 6, 2013.
Response to Office Action in CA Application No. 2,616,332 dated Aug. 6, 2013.
Response to Office Action in CA Application No. 2,615,087 dated Aug. 6, 2013.
Response from U.S. Appl. No. 13/301,051 dated Oct. 28, 2013.
Interview Summary from U.S. Appl. No. 13/031,051 dated Nov. 7, 2013.
Response from U.S. Appl. No. 13/031,061 dated Oct. 21, 2013.
Office action from U.S. Appl. No. 13/031,061 dated Nov. 5, 2013.
Notice of Allowance from U.S. Appl. No. 13/412,034 dated Sep. 30, 2013.
Office action from Canadian Application No. 2,614,744 dated Nov. 19, 2013.
Office action from Canadian Application No. 2,616,325 dated Nov. 22, 2013.
Response from European Application No. 06813984.9 dated Nov. 4, 2013.
Response from European Application No. 06802770.5 dated Nov. 11, 2013.
Office action from European Application No. 06813984.9 dated Apr. 25, 2013.
Exam Report from Australian Application No. 2006284748 dated Sep. 14, 2011.
Office action from New Zealand Application No. 591,831 dated Mar. 28, 2011.
Office action from New Zealand Application No. 592,271 dated Apr. 20, 2011.
Int'l App. No. PCT/US06/33972, International Search Report, mailed May 8, 2007, 2 pages.
Int'l App. No. PCT/US06/33972, Written Opinion of the International Searching Authority, mailed May 8, 2007, 5 pages.
Response from Canadian Application No. 2,616,332 dated May 23, 2015.
Final action from Canadian Application No. 2,616,332 dated Sep. 14, 2015.
Second Office from European Application No. 06813991.4 dated Jan. 20, 2016.
"ECU Fault Codes", 6 pgs, Revision 6, Aug. 5, 2002, retrieved from the Internet: www.topbuzz.com.uk/info/fault_codes/ fault_codes.pdf.
"Errors: Linux System Errors", Nov. 18, 2004, 3 pgs, retrieved from the Internet: web.archive.org/web/20041118004818/http://www-numi.fnal.gov/offline_software/srt_public-context/WebDocs/Errors/unix_system_errors.html.
Notice of Allowance from U.S. Appl. No. 14/802,221 dated Aug. 10, 2016.
Communication Pursuant to Article 94(3) EPC from European Application No. 06813991.4 dated Jul. 11, 2016.
US 8,538,599, 09/2013, Peters et al. (withdrawn)

* cited by examiner

| 120 | SYSTEM CONTROLLER (MPJ MODEL) |
| --- | --- |
| 122 | POWER/DRIVE SELECT SWITCH |
| 124 | MODE SELECT SWITCH |
| 126 | GRAPHIC DISPLAY |
| 128 | JOYSTICK CONTROL |
| 130 | SPEED CONTROL |
| 132 | MOUNTING HUB |

| 140 | SYSTEM CONTROLLER (PSR MODEL) |
| --- | --- |
| 124 | MODE SELECT SWITCH |
| 126 | GRAPHIC DISPLAY |
| 128 | JOYSTICK CONTROL |
| 130 | SPEED CONTROL |
| 132 | MOUNTING HUB |
| 142 | POWER/DRIVE SELECT SWITCH |
| 144 | REMOVABLE MEMORY CARD SLOT |

| 160 | SYSTEM CONTROLLER (DISPLAY MODEL) |
|-----|-----------------------------------|
| 144 | REMOVABLE MEMORY CARD SLOT |
| 162 | INFO SWITCH |
| 164 | POWER SWITCH |
| 166 | GRAPHIC DISPLAY |
| 168 | UP DIRECTION SWITCH |
| 170 | DOWN DIRECTION SWITCH |
| 172 | MENU/LEFT DIRECTION SWITCH |
| 174 | RIGHT DIRECTION SWITCH |
| 176 | SELECT SWITCH |
| 178 | SAVE SWITCH |

METHOD AND APPARATUS FOR SETTING OR MODIFYING PROGRAMMABLE PARAMETER IN POWER DRIVEN WHEELCHAIR

CROSS-REFERENCE TO RELATED APPLICATIONS

This application is a continuation of U.S. Ser. No. 14/027,970, filed Sep. 16, 2013, titled METHOD AND APPARATUS FOR SETTING OR MODIFYING PROGRAMMABLE PARAMETER IN POWER DRIVEN WHEELCHAIR, now U.S. Pat. No. 8,977,431 which is a continuation of U.S. Ser. No. 13/311,140, filed Dec. 5, 2011, titled METHOD AND APPARATUS FOR SETTING OR MODIFYING PROGRAMMABLE PARAMETER IN POWER DRIVEN WHEELCHAIR, now U.S. Pat. No. 8,793,032, which is a continuation of U.S. Ser. No. 11/514,016, filed Aug. 31, 2006, titled METHOD AND APPARATUS FOR SETTING OR MODIFYING PROGRAMMABLE PARAMETER IN POWER DRIVEN WHEELCHAIR, now U.S. Pat. No. 8,073,588, which claims the benefit of eight U.S. provisional patent applications, including Ser. No. 60/712,987, filed Aug. 31, 2005, Ser. No. 60/727,005, filed Oct. 15, 2005, Ser. No. 60/726,983, filed Oct. 15, 2005, Ser. No. 60/726,666, filed Oct. 15, 2005, Ser. No. 60/726,981, filed Oct. 15, 2005, Ser. No. 60/726,993, filed Oct. 15, 2005, Ser. No. 60/727,249, filed Oct. 15, 2005, and Ser. No. 60/727,250, filed Oct. 15, 2005. This application is also related to U.S. utility patent applications including Ser. No. 11/513,740, now abandoned, entitled "Mode Programmable Actuator Controller for Power Positioning Seat or Leg Support of a Wheelchair," Ser. No. 11/513,854, now U.S. Pat. No. 8,065,051, entitled "Context-Sensitive Help for Display Device Associated with Power Driven Wheelchair," Ser. No. 11/511,606, now U.S. Pat. No. 7,403,844, entitled "Method and Apparatus for Programming Parameters of a Power Driven Wheelchair for a Plurality of Drive Settings," Ser. No. 11/513,780, now abandoned, entitled "Adjustable Mount for Controller of Power Driven Wheelchair," Ser. No. 11/513,746, now abandoned, entitled "Method and Apparatus for Automated Positioning of User Support Surfaces in Power Driven Wheelchair," Ser. No. 11/513,802, now U.S. Pat. No. 8,127,875 entitled "Power Driven Wheelchair," and Ser. No. 11/513,750, now U.S. Pat. No. 8,073,585 entitled "Method and Apparatus for Improved Support of Power Driven Wheelchair." The contents of all above-identified patent application(s) and patent(s) are fully incorporated herein by reference.

BACKGROUND

Power driven wheelchairs generally include right and left drive wheels driven by a motor controller via corresponding right and left drive motors. A power driven wheelchair may also include actuators, motors, or other devices to control user support surfaces, such as seats, backs, leg rests, foot rests, or head rests. These various actuators, motors, and other devices may be controlled via a user interface device. The user interface device may include input devices, such as a joystick, pushbuttons and other types of switches, potentiometers and other types of control devices, and output devices, such as a graphic display, alphanumeric display, or indicators. Input devices for special needs users, such as a proportional head control, a sip n' puff system, a fiber optic tray array, a proximity head array, or a proximity switch array, may also be provided as a user interface device or as a remote input to the user interface device.

Examples of power driven wheelchairs are provided in a product brochure entitled "Invacare® Storm® Series TDX™ Power Wheelchairs, including Formula™ Powered Seating," Form No. 03-018, 2004 from Invacare Corporation of Elyria, Ohio, the contents of which are fully incorporated herein by reference. Additional examples of power driven wheelchairs are provided in another product brochure entitled "Invacare® Tarsys® Series Powered Seating System," Form No. 00-313, 2002 from Invacare Corporation, the contents of which are fully incorporated herein by reference.

Currently, a separate remote programmer unit may be used to set or modify programmable parameters associated with operation of a given power driven wheelchair. Examples of remote programmers and their use in conjunction with a power driven wheelchair are provided in U.S. Pat. No. 6,871,122 to Wakefield, I I and U.S. Pat. No. 6,819,981 to Wakefield, I I et al., both assigned to Invacare Corporation. The contents of both of these patents are fully incorporated herein by reference.

SUMMARY

In one aspect an apparatus associated with a power driven wheelchair for setting or modifying a programmable parameter is provided. In one embodiment, the apparatus includes: a user interface device associated with a power driven wheelchair and adapted to operate in a programming mode and a first storage device in operative communication with the user interface device with at least a portion designated for storage of a programmable operating parameter associated with operation of the power driven wheelchair. In this embodiment, the user interface device is used to select the programmable operating parameter, select a value for the programmable operating parameter, and save the selected value for the programmable operating parameter in the portion of the first storage device.

In another aspect, a method associated with a power driven wheelchair for setting or modifying a programmable parameter is provided. In one embodiment, the method includes: a) operating a user interface device associated with a power driven wheelchair in a programming mode, b) selecting a programmable operating parameter associated with operation of the power driven wheelchair using the user interface device, c) selecting a value for the programmable operating parameter using the user interface device, and d) saving the selected value for the programmable operating parameter in a portion of a storage device associated with the power driven wheelchair using the user interface device.

In still another aspect, an apparatus associated with a power driven wheelchair for communicating a programmable parameter set is provided. In one embodiment, the apparatus includes: a user interface device associated with a power driven wheelchair and adapted to operate in a programming mode, a portable storage medium in operative communication with the user interface device with at least a portion designated for storage of one or more programmable parameter sets associated with operation of the power driven wheelchair, and a local storage device in operative communication with the user interface device with at least a portion designated for storage of one or more programmable parameter sets associated with operation of the power driven wheelchair. In this embodiment, the user interface device is used to select one or more programmable parameter sets from the portable storage medium and save said selected programmable parameter sets to the local storage device or vice versa.

In yet another aspect, a method associated with a power driven wheelchair for communicating a programmable parameter set is provided. In one embodiment, the method includes: a) operating a user interface device associated with a power driven wheelchair in a programming mode, b) selecting at least one programmable parameter set associated with the power driven wheelchair using the user interface device, and c) communicating each selected programmable parameter set from a portable storage medium associated with the power driven wheelchair to a local storage device associated with the power driven wheelchair or vice versa using the user interface device. In this embodiment, the portable storage device includes at least a portion designated for storage of one or more programmable parameter sets and the local storage device includes at least a portion designated for storage of one or more programmable parameter sets.

DETAILED DESCRIPTION

Figure 1:
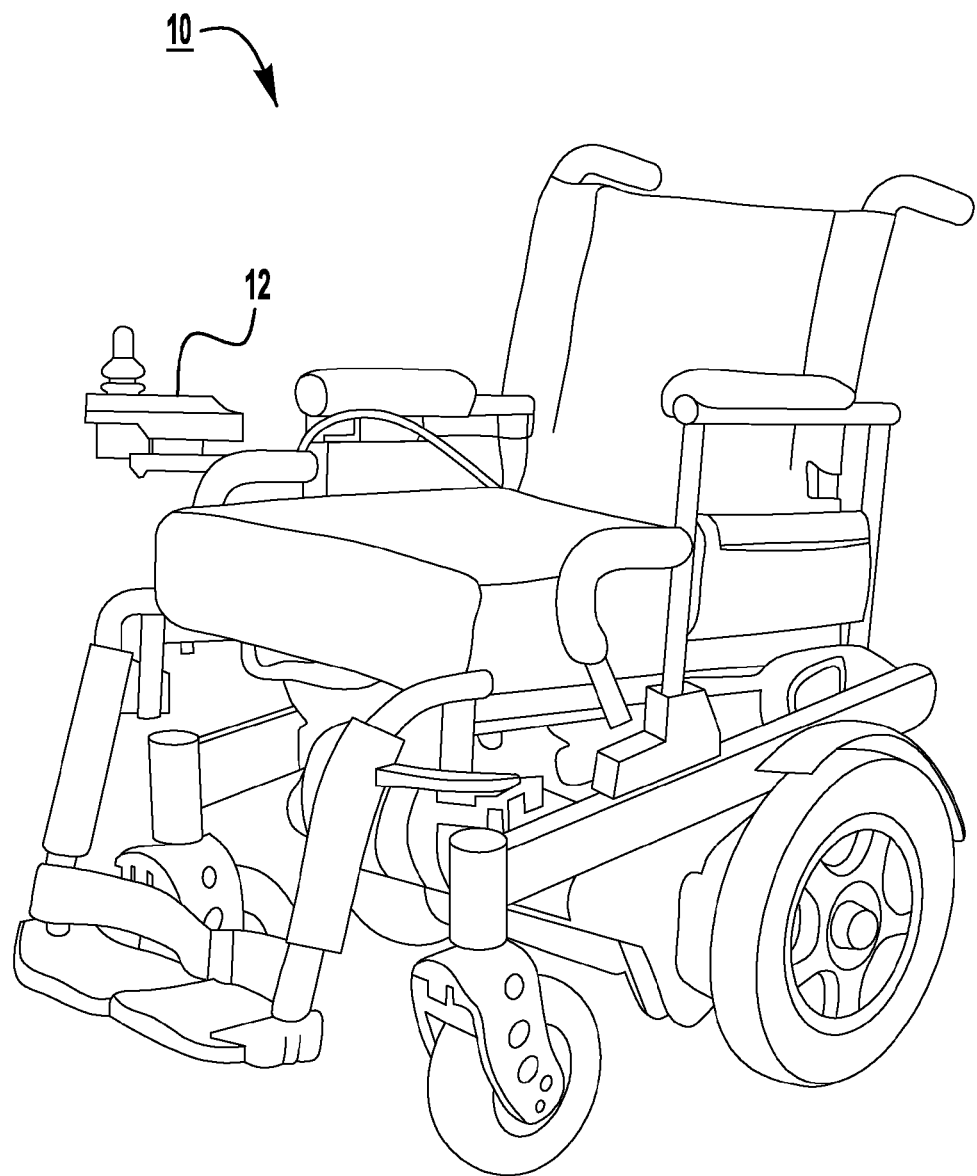
FIGS. 1 and 2 show exemplary embodiments of power driven wheelchairs.

The following paragraphs include definitions of exemplary terms used within this disclosure. Except where noted otherwise, variants of all terms, including singular forms, plural forms, and other affixed forms, fall within each exemplary term meaning Except where noted otherwise, capitalized and non-capitalized forms of all terms fall within each meaning.

"Circuit," as used herein includes, but is not limited to, hardware, firmware, software or combinations of each to perform a function(s) or an action(s). For example, based on a desired feature or need, a circuit may include a software controlled microprocessor, discrete logic such as an application specific integrated circuit (ASIC), or other programmed logic device. A circuit may also be fully embodied as software. As used herein, "circuit" is considered synonymous with "logic."

"Comprising," "containing," "having," and "including," as used herein, except where noted otherwise, are synonymous and open-ended. In other words, usage of any of these terms (or variants thereof) does not exclude one or more additional elements or method steps from being added in combination with one or more enumerated elements or method steps.

"Controller," as used herein includes, but is not limited to, any circuit or device that coordinates and controls the operation of one or more input or output devices. For example, a controller can include a device having one or more processors, microprocessors, or central processing units (CPUs) capable of being programmed to perform input or output functions.

"Logic," as used herein includes, but is not limited to, hardware, firmware, software or combinations of each to perform a function(s) or an action(s), or to cause a function or action from another component. For example, based on a desired application or need, logic may include a software controlled microprocessor, discrete logic such as an application specific integrated circuit (ASIC), or other programmed logic device. Logic may also be fully embodied as software. As used herein, "logic" is considered synonymous with "circuit."

"Operative communication," as used herein includes, but is not limited to, a communicative relationship between devices, logic, or circuits, including mechanical and pneumatic relationships. Direct electrical, electromagnetic, and optical connections and indirect electrical, electromagnetic, and optical connections are examples of such communications. Linkages, gears, chains, push rods, cams, keys, attaching hardware, and other components facilitating mechanical connections are also examples of such communications. Pneumatic devices and interconnecting pneumatic tubing may also contribute to operative communications. Two devices are in operative communication if an action from one causes an effect in the other, regardless of whether the action is modified by some other device. For example, two devices separated by one or more of the following: i) amplifiers, ii) filters, iii) transformers, iv) optical isolators, v) digital or analog buffers, vi) analog integrators, vii) other electronic circuitry, viii) fiber optic transceivers, ix) Bluetooth communications links, x) 802.11 communications links, xi) satellite communication links, and xii) other wireless communication links. As another example, an electromagnetic sensor is in operative communication with a signal if it receives electromagnetic radiation from the signal. As a final example, two devices not directly connected to each other, but both capable of interfacing with a third device, e.g., a central processing unit (CPU), are in operative communication.

"Or," as used herein, except where noted otherwise, is inclusive, rather than exclusive. In other words, "or" is used to describe a list of alternative things in which one may choose one option or any combination of alternative options. For example, "A or B" means "A or B or both" and "A, B, or C" means "A, B, or C, in any combination." If "or" is used to indicate an exclusive choice of alternatives or if there is any limitation on combinations of alternatives, the list of alternatives specifically indicates that choices are exclusive or that certain combinations are not included. For example, "A or B, but not both" is used to indicate use of an exclusive "or" condition. Similarly, "A, B, or C, but no combinations" and "A, B, or C, but not the combination of A, B, and C" are examples where certain combination of alternatives are not included in the choices associated with the list.

"Processor," as used herein includes, but is not limited to, one or more of virtually any number of processor systems or stand-alone processors, such as microprocessors, microcontrollers, central processing units (CPUs), and digital signal processors (DSPs), in any combination. The processor may be associated with various other circuits that support operation of the processor, such as random access memory (RAM), read-only memory (ROM), programmable read-only memory (PROM), erasable programmable read-only memory (EPROM), clocks, decoders, memory controllers, or interrupt controllers, etc. These support circuits may be internal or external to the processor or its associated electronic packaging. The support circuits are in operative communication with the processor. The support circuits are not necessarily shown separate from the processor in block diagrams or other drawings.

"Signal," as used herein includes, but is not limited to, one or more electrical signals, including analog or digital signals, one or more computer instructions, a bit or bit stream, or the like.

"Software," as used herein includes, but is not limited to, one or more computer readable or executable instructions that cause a computer or other electronic device to perform functions, actions, or behave in a desired manner. The instructions may be embodied in various forms such as routines, algorithms, modules or programs including separate applications or code from dynamically linked libraries. Software may also be implemented in various forms such as a stand-alone program, a function call, a servlet, an applet, instructions stored in a memory, part of an operating system, or other types of executable instructions. It will be appreciated by one of ordinary skill in the art that the form of software is dependent on, for example, requirements of a desired application, the environment it runs on, or the desires of a designer/programmer or the like.

With reference to FIG. 1, an exemplary embodiment of a power driven wheelchair 10 includes a system controller 12. The system controller 12 controls operation of the power driven wheelchair 10. Other embodiments of power driven wheelchairs and other embodiments of system controllers are available in various combinations. For example, as shown if FIG. 2, another exemplary embodiment of a power driven wheelchair 20 includes a system controller 22.

Figure 3:
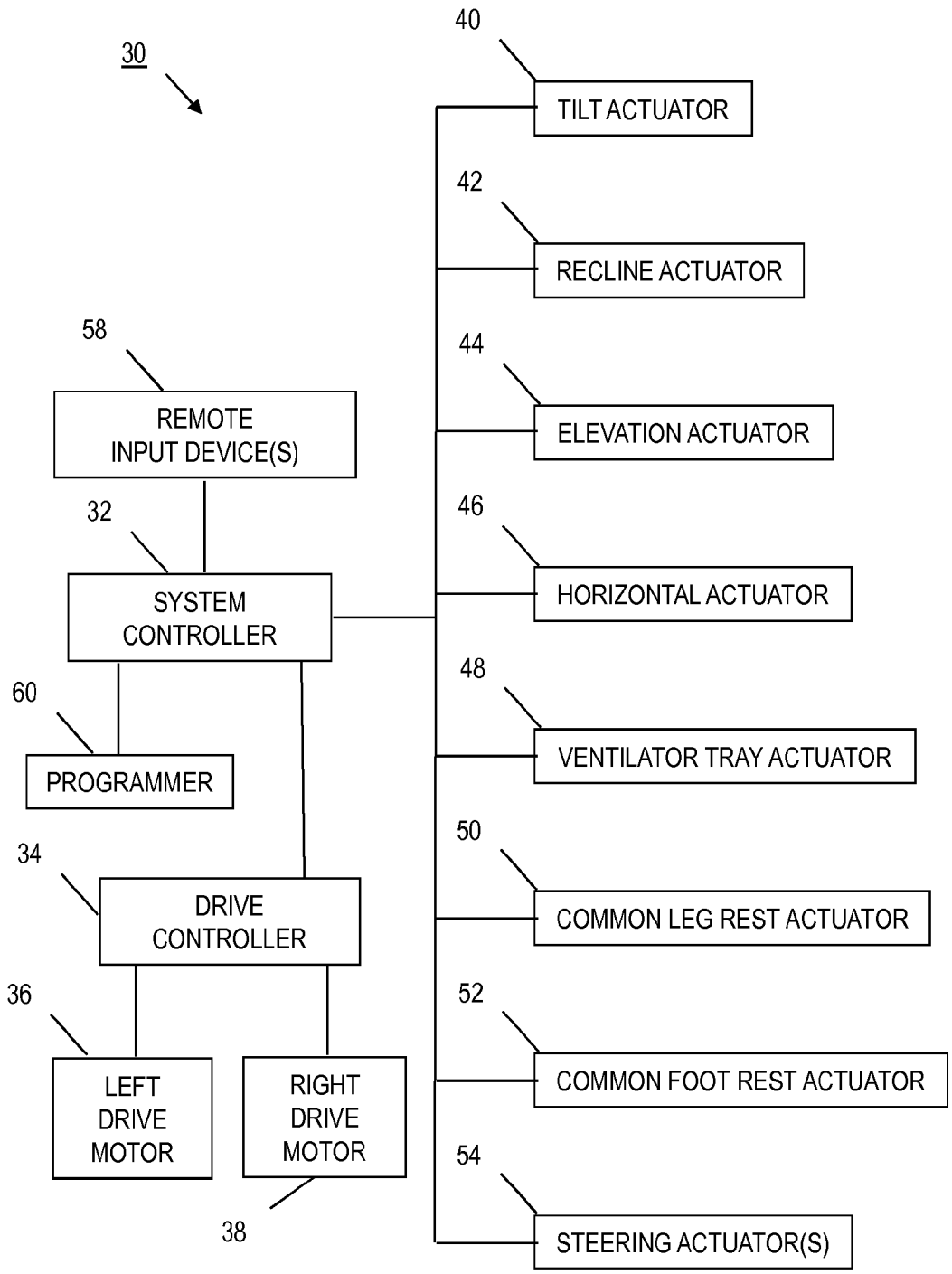
FIG. 3 is a block diagram of an exemplary embodiment of a power driven wheelchair.

With reference to FIG. 3, an exemplary embodiment of a power driven wheelchair 30 is depicted in block diagram fashion. As shown, the power driven wheelchair 30 may include a system controller 32, a drive controller 34, a left drive motor 36, a right drive motor 38, and a suitable power source (e.g., battery) (not shown). The system controller 32 may include a user interface device and may control the drive controller 34 in response to activation of one or more input devices associated with the user interface device and in response to software programs for one or more operating or support modes. The software programs may use a plurality of programmable parameters arranged in sets associated with, for example, different environmental conditions to define driving response characteristics. The drive controller 34 may control the left and right drive motors 36, 38 in response to commands from the system controller 32. Communication between the system controller 32 and drive controller 34 may be via serial or parallel bus connections or via discrete signal connections. For example, a Shark serial communication bus, developed by Dynamic Controls of New Zealand, may be used to communicate with the drive controller 34. In another embodiment, the system controller 34 may communicate directly with a left drive motor and a right drive motor via a serial communication bus, such as a controller area network (CAN) bus, where the left and right drive motors include a serial bus interface and local intelligence.

The power driven wheelchair 30 may also include various options, such as powered seating, powered front rigging, and powered steering. In one embodiment, the powered seating option may include a tilt actuator 40, a recline actuator 42, an elevation actuator 44, a horizontal actuator 46, and a ventilator tray actuator 48. In one embodiment, the powered front rigging option may include a common leg rest actuator 50 and a common foot rest actuator 52. In another embodiment, the powered front rigging option may include independent left and right leg rest actuators and independent left and right foot rest actuators. In one embodiment, the powered steering option may include one or more powered steering actuators 54. These options may be added to the wheelchair in any combination. Likewise, various combinations of actuators may be selected for each option. For example, a powered seating option may be limited to tilt and recline actuators 40, 42, tilt and elevation actuators 40, 44, recline and elevation actuators 40, 46, or tilt, recline, and elevation actuators 40, 42, 44. If the power driven wheelchair has split left and right leg rests, individual right and left leg rest actuators may be provided in lieu of the common leg rest actuator 50. Back and seat shear reduction, for example, may be provided by coordinated movement of the recline and horizontal actuators 42, 46. The system controller 32 may control the actuators in response to activation of one or more input devices associated with the user interface device and in response to software programs for one or more operating or support modes. The software programs may use a plurality of programmable parameters, for example, to define desired positions for user support surfaces and actuator response characteristics. Communication between the system controller 32 and actuators may be via serial or parallel bus connections or via discrete signal connections. For example, in one embodiment, actuators may include sensors and local electronics which provides an interface to a CAN bus. It is understood that any actuator may include a variable speed reversible motor, a stepper motor, a linear motor, a servo motor, or another suitable device associated with position control of an actuator mechanism. The actuator mechanism, for example, controlling the position of user support surfaces, such as seat, back, leg rest, foot rest, or head rest support surfaces, via a suitable linkage, drive train, coupling, or another type of mechanical interface.

In one embodiment, providing modularization of actuators, motors, and other output devices with sensors, detectors, or other devices providing feedback for closed loop control of the corresponding output device facilitates the use of a serial or parallel bus architecture in the power driven wheelchair 30. This also simplifies the addition or removal of optional output devices and streamlines upgrades and retrofits. Moreover, distributing intelligence, including interface circuits for output devices and associated feedback components, from the centralized controller to the modular output devices further improves performance through parallel processing. In additional embodiments, distributing additional intelligence, including closed-loop control algorithms, from the centralized controller to the modular output devices further improves performance through additional parallel processing and reduced bus traffic.

One or more remote input devices 58 may also be provided as options in the power driven wheelchair 30. For example, user interface devices for special needs users, such as a proportional head control, a sip n' puff system, a fiber optic tray array, a proximity head array, or a proximity switch array, may be provided as a remote input to the system controller 32. Additional examples of remote input devices 58 include, a 4-way toggle switch assembly, a quad pushbutton assembly, and a compact proportional joystick assembly. The 4-way toggle switch assembly or the quad pushbutton assembly, for example, may be used for controlling powered seating systems. The compact proportional joystick assembly, for example, may be used as a proportional attendant control. Communication between the system controller 32 and the remote input device(s) 58 may be via serial or parallel bus connections or via discrete signal connections. For example, a remote input device may be connected to a serial port on the system controller 32. If the remote input device includes the appropriate electronics and local intelligence (e.g., processes for composing and de-composing bus messages), communications with the system controller 32 may, for example, be via a CAN bus or another type of bus or network connection.

A programmer 60 may be used in conjunction with the power driven wheelchair 30. The programmer 60 described herein may be an optional accessory or special tool for dealers or technicians. The programmer 60 may be adapted for use on various models and configurations of power driven wheelchairs. Communication between the system controller 32 and the programmer 60 may be via serial or parallel bus connections or via discrete signal connections. For example, the programmer 60 may be connected to a serial port on the system controller 32. If the programmer 60 includes the appropriate electronics and local intelligence (e.g., processes for composing and de-composing bus messages), communications with the system controller 32 may, for example, be via a CAN bus or another type of bus or network connection. The various aspects of FIG. 3 described above may be automated, semi-automated, or manual and may be implemented through hardware, software, firmware, or combinations thereof.

Figure 4:
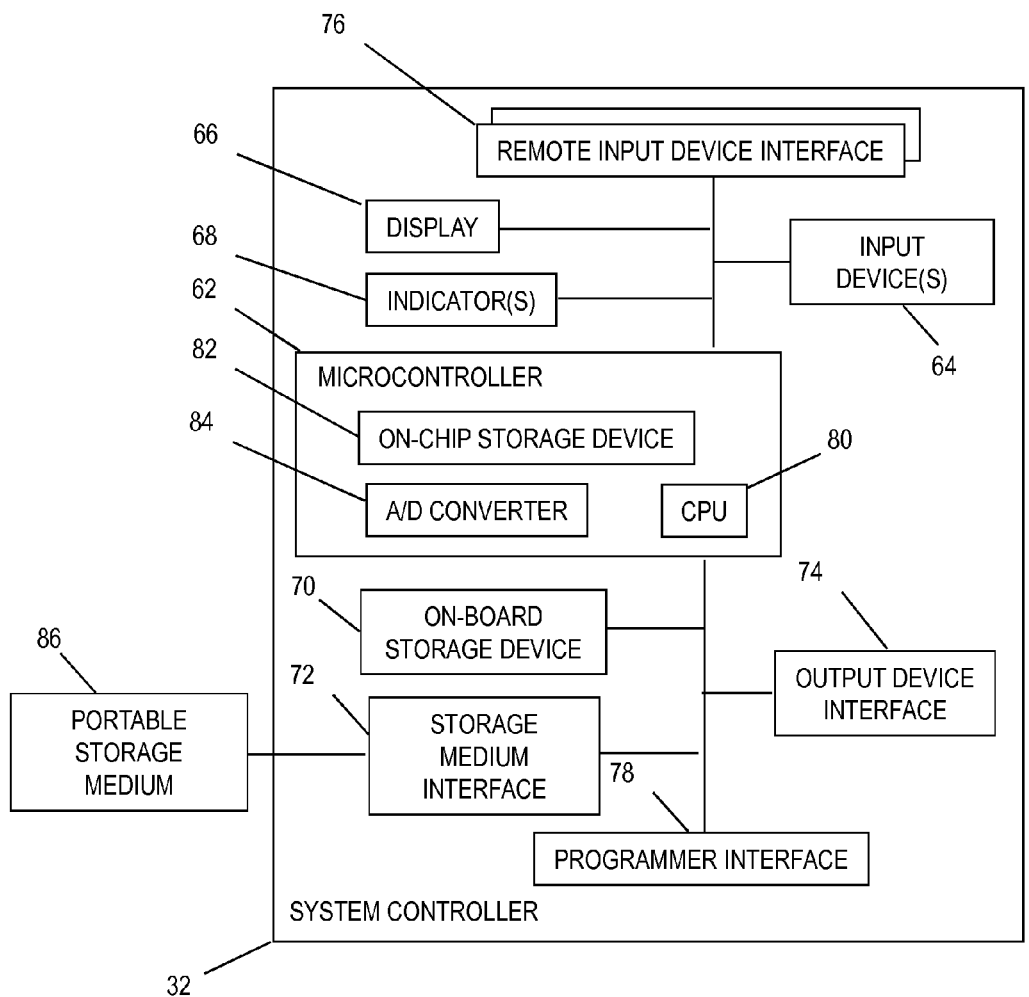
FIG. 4 is a block diagram of an exemplary embodiment of a system controller for a power driven wheelchair.

With reference to FIG. 4, a block diagram of an exemplary embodiment of a system controller 32 may include a microcontroller 62, one or more input devices 64, a display 66, one or more indicators 68, an on-board storage device 70, a storage medium interface 72, an output device interface 74, one or more remote input device interfaces 76, and a programmer interface 78. The microcontroller 62 may include a central processing unit (CPU) 80, an on-chip storage device 82, and an analog-to-digital (A/D) converter 84. The A/D converter 84 may provide the microcontroller 62 with an interface to receive analog input signals. In one embodiment, the microcontroller 62 may include an SAF-XC164CS 16-bit single-chip microcontroller by Infineon Technologies of Munchen, Germany.

The display 66, for example, may include a 128×64 pixel graphic display or a 160×160 pixel graphic display. In additional embodiments, the display may include a graphic display in a different size or a different arrangement of pixels. Any type of graphic display may be used, such as a liquid crystal display (LCD). Additionally, an alphanumeric display or another type of display may be used. The one or more indicators 68, for example, may include light emitting diodes (LEDs), lamps, other types of visual indicators, or audible devices. The one or more input devices 64, for example, may include a proportional analog joystick, a three position toggle or rotary switch, a return-to-center momentary three position switch, a rotary potentiometer, and a plurality of momentary pushbuttons. In additional embodiments, the one or more input devices 64, may include other types of joysticks, switches, potentiometers, pushbuttons, or other types of control devices.

The output device interface 74 may be connected, for example, to a motor controller, actuators, motors, or similar devices associated with the power driven wheelchair. The output device interface 74 may include one or more serial ports, one or more parallel ports, or discrete wiring connections in any combination. For example, the output device interface 74 may include a CAN bus serial port and a Shark bus serial port. The one or more remote input device interfaces 76 and programmer interface 78 may each include a serial port, parallel port, or discrete wiring connections.

Figure 2:
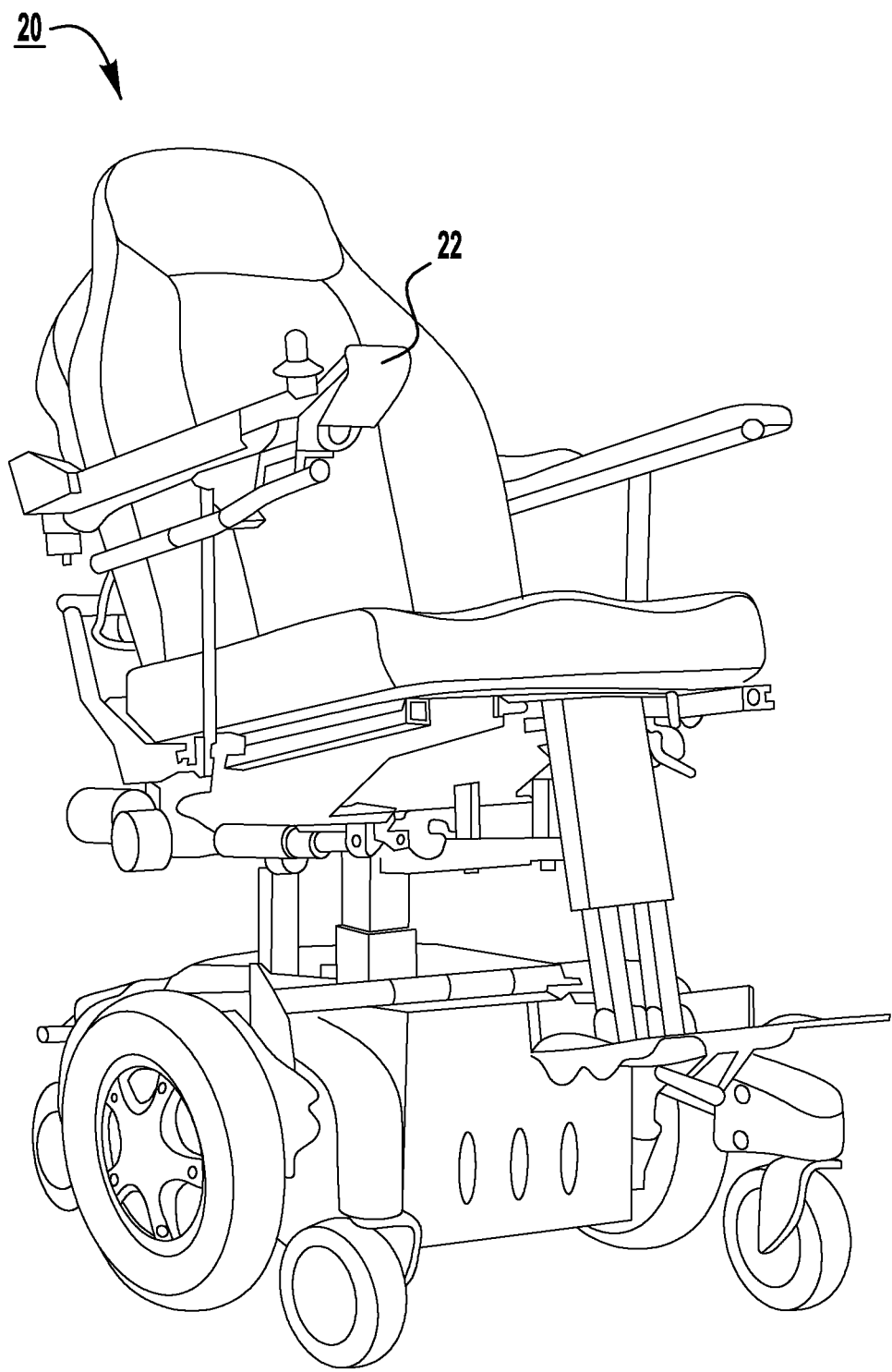

The microcontroller 62 may receive input signals from the one or more input devices 64, remote input devices 58 (FIG. 2) connected to the one or more remote input device interfaces 76, or a programmer 60 (FIG. 2) connected to the programmer interface 78. The microcontroller 62 may control the display 66, the one or more indicators 68, and various motors, actuators, and other output devices connected to the output device interface 74, at least in part, in response to the input signals from the one or more input devices 64, remote input devices 58 (FIG. 2), or programmer 60 (FIG. 2).

The on-board storage device 70 and on-chip storage device 82 each may include a volatile storage device, such as random access memory (RAM), and a non-volatile storage device, such as non-volatile memory, a fixed disk device, a removable disc device, an optical storage device, etc. Non-volatile memory, for example, may include read-only memory (ROM), programmable read-only memory (PROM), erasable programmable read-only memory (EPROM), electrically erasable programmable read only memory (EEPROM), or flash memory. For example, software programs, one or more programmable parameter sets, and help information may be stored in one or more non-volatile memory storage devices associated with the on-board storage device 70 or on-chip storage device 82. Each programmable parameter set may include a plurality of programmable operating parameters for the power driven wheelchair 20. The microcontroller 62 may run the software programs and may control the display 66, indicators 68, and various motors, actuators, and other output devices connected to the output device interface 74 based, at least in part, on one or more of the programmable operating parameters.

A portable storage medium 86 may be used in conjunction with the system controller 32. The portable storage medium 86 may include a plurality of storage locations which may store a security key, one or more library parameter sets, and a collection of help information. The portable storage medium 86 described herein may be an optional accessory or special tool for dealers or technicians. In some cases, the portable storage medium 86 may also be used in conjunction with normal operation of the power driven wheelchair by its owner or end user. The portable storage medium 86 described herein may be suitable for use on various models and configurations of power driven wheelchairs. However, in another scheme for protection and security of the information stored therein, a given portable storage medium 86 may be serialized or otherwise tailored and keyed to an individual system controller 32 and corresponding power driven wheelchair. Communication between the microcontroller 62 and the portable storage medium 86 may be via the storage medium interface 72.

The portable storage medium 86 may include a non-volatile storage medium, such as non-volatile memory. In one embodiment, the portable storage medium 86 may include, for example, a type of removable storage medium known as a removable memory card. For example, the portable storage medium 86 may include a secure digital (SD) card. In the embodiment being described, the storage medium interface 72 may include, for example, a corresponding removable memory interface (e.g., an SD card reader) to communicate and exchange information with the microcontroller 62.

In additional embodiments, the portable storage medium may include other types of removable memory, such as a compact flash (CF) card, a flash memory pen drive, a memory stick, a microdrive, a multimedia memory card (MMC), a smart media (SM) card, an xD picture card, a subscriber identity module (SIM) card, a memory chip (e.g., ROM, PROM, EPROM, EEPROM), or another suitable form of removable, separable, or detachable memory. In other additional embodiments, the portable storage medium may include other forms of removable storage medium, such as optical discs (e.g., compact discs (CDs), digital video discs (DVDs)) or floppy disks (e.g., zip disks).

In still further embodiments, the portable storage medium may include a portable storage device, such as an external memory card reader, an external optical disc drive, an external floppy disk drive, a portable computer (e.g., laptops, notebooks, personal digital assistants (PDAs)), a mobile telephone (e.g., cellular telephone, personal communication system, satellite telephone), a digital camera, an MP3 player, or any type of portable storage device capable of wired or wireless communication with another compatible communication device.

The storage medium interface 72, for example, may include a connector or socket that mates with the portable storage medium 86 and an electronic circuit that supports communication between the microcontroller 62 and the portable storage medium 86. For example, the storage medium interface 72 may include a memory card reader, a memory chip socket, an optical disc drive, a floppy disk drive, a serial port (e.g., universal serial bus (USB) port, RS-232), a parallel port (e.g., small computer system interface (SCSI) port), a modem, an Ethernet port, a wireless Ethernet transceiver (e.g., IEEE 802.11b), a Bluetooth transceiver, an infrared (IR) transceiver, a radio frequency (RF) transceiver, a mobile telephone interface, a cable television interface, a satellite television interface, or any communication device capable of wired or wireless communication with a corresponding portable storage medium. The various aspects of FIG. 4 described above may be automated, semi-automated, or manual and may be implemented through hardware, software, firmware, or combinations thereof.

Figure 5:
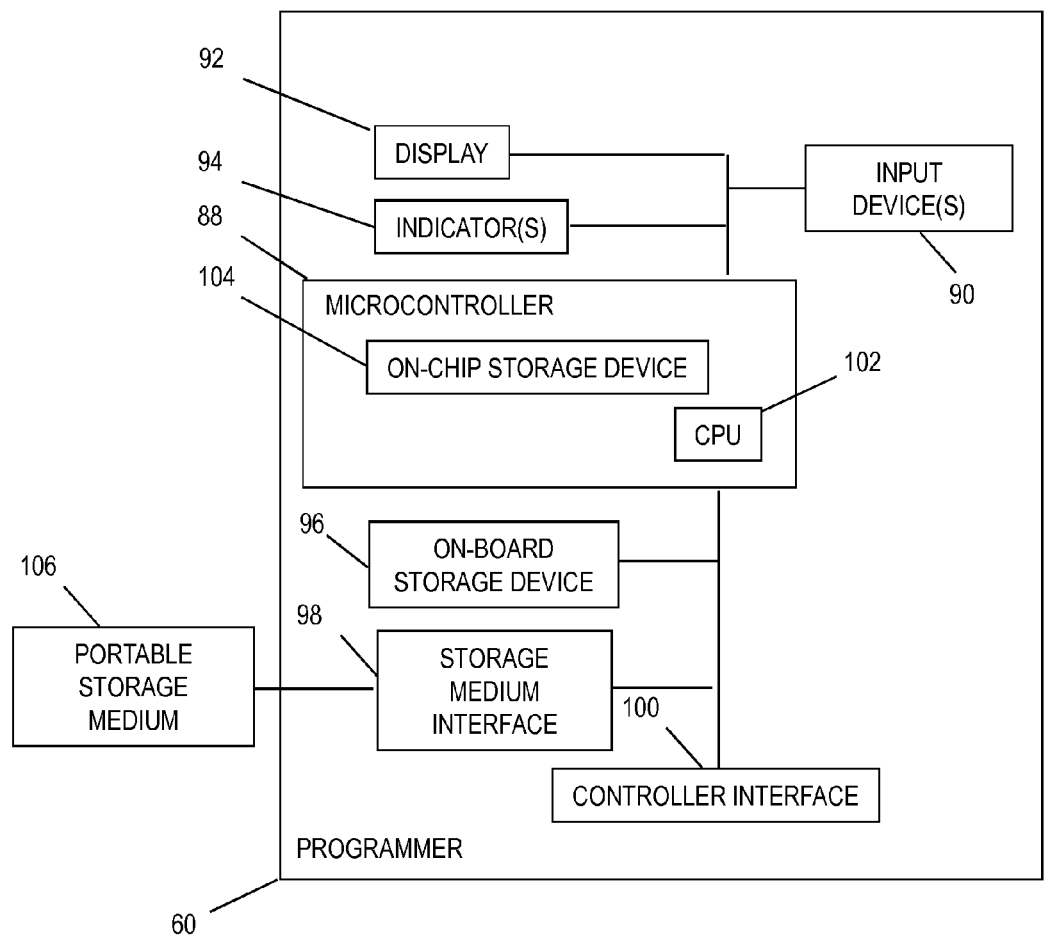
FIG. 5 is a block diagram of an exemplary embodiment of a programmer used in conjunction with related embodiments of power driven wheelchairs.

With reference to FIG. 5, an exemplary embodiment of a programmer 60 may include a microcontroller 88, one or more input devices 90, a display 92, one or more indicators 94, an on-board storage device 96, a storage medium interface 98, and a controller interface 100. The microcontroller 88 may include a CPU 102 and an on-chip storage device 104. In one embodiment, the microcontroller 88 may include an SAF-XC164CS 16-bit single-chip microcontroller by Infineon Technologies of Munchen, Germany.

The display 92, for example, may include a 160×160 pixel graphic display. In additional embodiments, the display may include a graphic display in a different size or a different arrangement of pixels. Any type of graphic display may be used, such as an LCD. Additionally, an alphanumeric display or another type of display may be used. The one or more indicators 94, for example, may include LEDs, lamps, other types of visual indicators, or audible devices. The one or more input devices 90, for example, may include a plurality of momentary pushbuttons. In additional embodiments, the one or more input devices 90, may include other types of pushbuttons or other types of control devices.

The controller interface 100 may include a serial port, parallel port, or discrete wiring connections for interfacing with a system controller 32 (FIG. 2) of a power driven wheelchair. The microcontroller 88 may receive input signals from the one or more input devices 90 and the system controller connected to the controller interface 100. The microcontroller 88 may latch or store activations of the one or more input devices 90 or other input signals over time. The microcontroller 88 may control the display 92 and the one or more indicators 94, at least in part, in response to the input signals from the one or more input devices or the system controller.

The microcontroller 88 may periodically (e.g., every 10 ms) receive a status check message from the system controller 32 (FIG. 2) via the controller interface 100. For example, if an activation of the one or more input devices 90 has occurred since the last status check, the microcontroller 88 may send a response to the status check message via the controller interface 100 that may include information regarding the latched or stored activations from the one or more input devices 90. Once the response is sent, certain latched or stored activations may be cleared. If no activations occurred since the last status check, the microcontroller 88 may send a response to the status check message indicating there is no new data to send. The microcontroller 88, for example, may also receive messages from system controller via the controller interface 100 containing information to be displayed on the display 92 or commands regarding control of the display 92.

The on-board storage device 96 and on-chip storage device 104 each may include a volatile storage device, such as RAM, and a non-volatile storage device, such as non-volatile memory, a fixed disk device, a removable disc device, an optical storage device, etc. Non-volatile memory, for example, may include ROM, PROM, EPROM, EEPROM, or flash memory. For example, software programs, a plurality of programmable parameter sets, and help information may be stored in one or more non-volatile memory storage devices associated with the on-board storage device 96 or on-chip storage device 104. The microcontroller 88 may run the software programs and may control the display 92 and indicators 94 based, at least in part, on one or more of the programmable operating parameters.

A portable storage medium 106 may be used in conjunction with the programmer 60. Like the portable storage medium 86 (FIG. 4) associated with the system controller 32 (FIG. 4), the portable storage medium 106 may also be an optional accessory or special tool for dealers or technicians. Therefore, the various characteristics, options, and alternatives described above for the portable storage medium 86 (FIG. 4) and storage medium interface 72 (FIG. 4) also apply to the portable storage medium 106 and storage medium interface 98 in the programmer 60. The microcontroller 88 is in communication with the portable storage medium 106 via the storage medium interface 98. This enables the microcontroller 88 to retrieve data from the portable storage medium 106 and provide it to the system controller via the controller interface 100 or to save data received from the system controller to the portable storage medium 106.

In one embodiment, the portable storage medium 106 associated with the programmer 60 and the portable storage medium 86 (FIG. 4) associated with the system controller 32 (FIG. 2) may be interchangeable. In other words, the portable storage medium 106 may be used in conjunction with the system controller and vice versa.

Moreover, this interchangeability may extend to other power driven wheelchairs. In other words, the portable storage medium 86 (FIG. 4) or 106 (FIG. 5) associated with the power driven wheelchair 10 (FIG. 1) may be used in system controllers or programmers associated with other power driven wheelchairs. This facilitates development of a master copy of library parameter sets on one or more portable storage medium that can be transported to multiple power driven wheelchairs for selective communication of library parameter sets from the master copy to corresponding system controllers associated with each power driven wheelchair. Additionally, programmable parameter sets can be selectively uploaded to the master copy to build or grow the library parameter sets from individual power driven wheelchairs. This is particularly useful after modifying a selected programmable parameter set on a first power driven wheelchair for a first user when a second user with a similar power driven wheelchair and similar physical impairments is identified. While a library parameter set and a corresponding programmable parameter set are equivalent (i.e., both including the same plurality of programmable operating parameters), it is sometimes useful to use the phrase "library parameter set" to refer to the plurality of programmable operating parameters on the portable storage medium and to use the phrase "programmable parameter set" to refer to them within the system controller. Nevertheless, the phrases have the same meaning and may be used interchangeably to refer to the plurality of programming operating parameters in any location. The various aspects of FIG. 5 described above may be automated, semi-automated, or manual and may be implemented through hardware, software, firmware, or combinations thereof.

Figure 6:
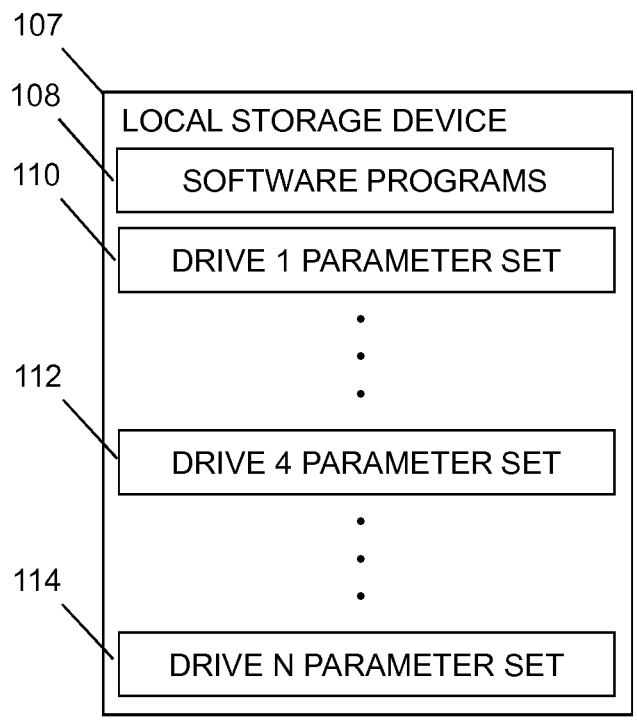
FIG. 6 is a block diagram of an exemplary embodiment of a local storage device associated with a system controller.

With reference to FIG. 6, an exemplary embodiment of a local storage device 107 associated with a system controller 32 (FIG. 4) may include a plurality of storage locations that may store software programs 108 and a plurality of programmable parameter sets. The local storage device 107, for example, may include an on-board storage device 70 (FIG. 4), 96 (FIG. 5) or an on-chip storage device 82 (FIG. 4), 104 (FIG. 5). In one embodiment, for example, a first programmable parameter set is identified as drive 1 parameter set 110, another programmable parameter set is identified as drive 4 parameter set 112, and additional programmable parameter sets are identified as drive N parameter set 114. In another embodiment, the local memory device 107 may include four programmable parameter sets. However, there may be more or less programmable parameter sets in additional embodiments. Each programmable parameter set may include multiple programmable operating parameters. The programmable parameter sets may also be viewed as a plurality of programmable operating parameters that may be arranged in sets according to, for example, different environmental conditions for the power driven wheelchair (e.g., indoor, outdoor, etc.).

Figure 7:
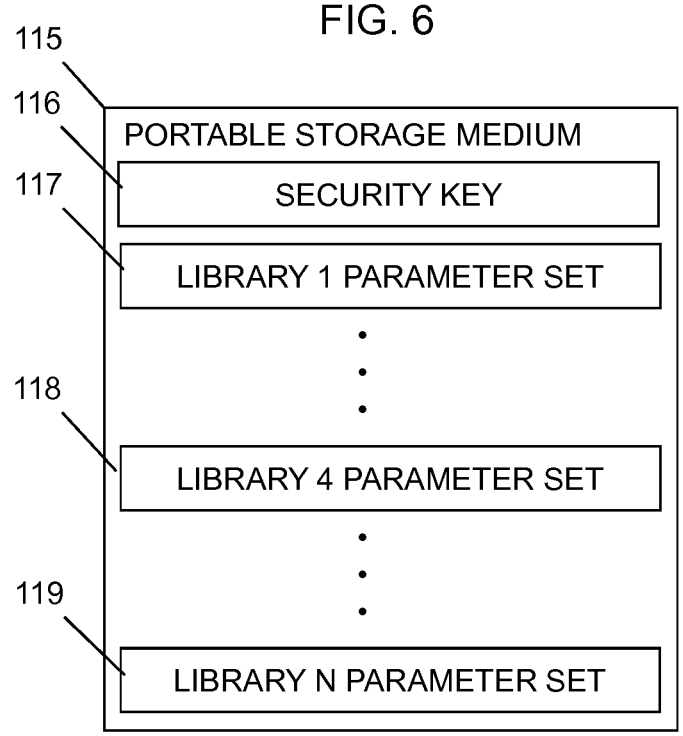
FIG. 7 is a block diagram of an exemplary embodiment of a portable storage medium associated with a system controller or a programmer.

With reference to FIG. 7, an exemplary embodiment of the portable storage medium 115 may include a plurality of storage locations that may store a security key 116 and a plurality of library parameter sets. The portable storage medium 115 has the same characteristics and features of the portable storage medium 86 (FIG. 4), 106 (FIG. 5) described above. In one embodiment, for example, a first library parameter set is identified as library 1 parameter set 117, another library parameter set is identified as library 4 parameter set 118, and additional library parameter sets are identified as library N parameter set 119. In another embodiment, the portable storage medium 115 may include four library parameter sets. However, there may be more or less library parameter sets in additional embodiments. Each library parameter set may include multiple programmable operating parameters. The library parameter sets may also be viewed as a plurality of programmable operating parameters that may be arranged in sets according to, for example, different environmental conditions for the power driven wheelchair (e.g., indoor, outdoor, etc.). In one embodiment, the same portable storage medium 115 may be used effectively when installed directly in a system controller or when installed in a programmer connected to the same system controller.

Figure 8:
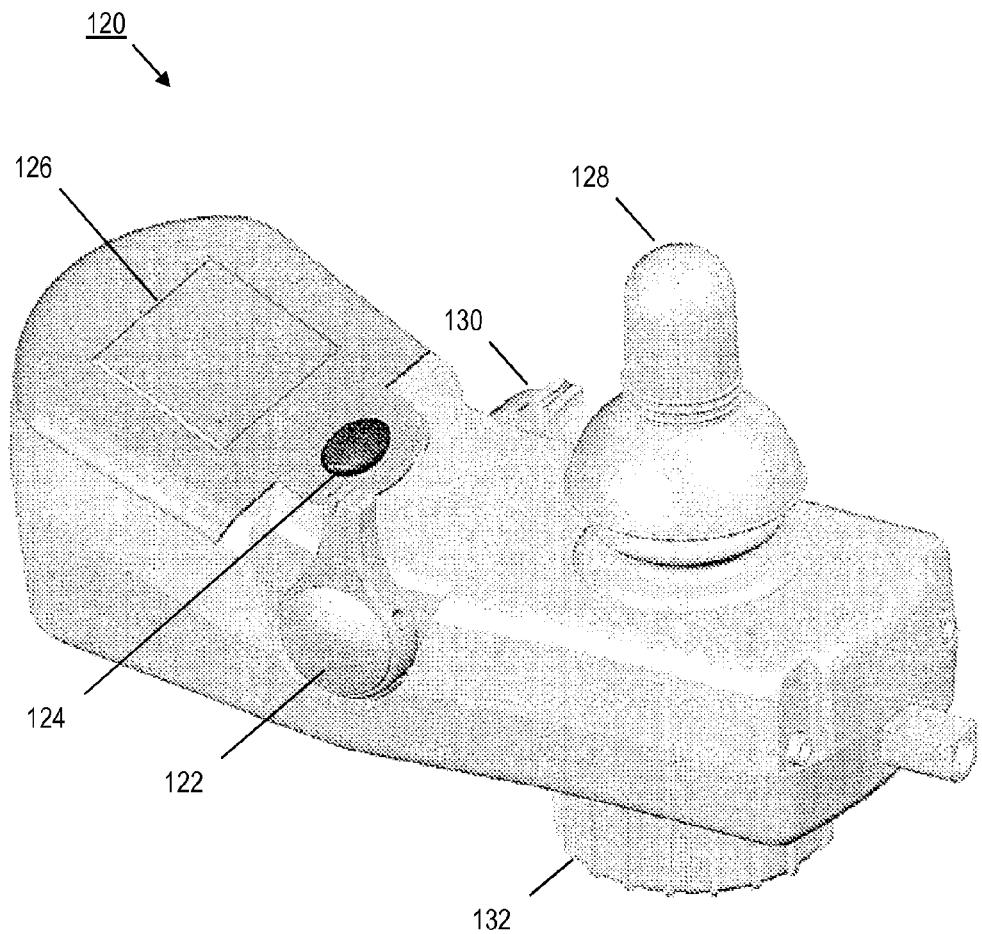
FIGS. 8 through 11 are perspective views of exemplary embodiments of a system controller for a power driven wheelchair.

With reference to FIG. 8, an exemplary embodiment of a system controller 120 may include a power/drive select switch 122, a mode select switch 124, a graphic display 126, a joystick control 128, a speed control 130, and a mounting hub 132. This configuration of the system controller 120 may be referred to as a multi-purpose joystick (MPJ) model. The MPJ model may also include a removable memory card slot (not shown) for receiving a portable storage medium 86 (FIG. 4), such as a removable memory card.

The power/drive select switch 122, for example, may include a three position rotary switch. The "on" position, for example, is a center position where the power driven wheelchair is powered on. The "drive select" position is a return-to-center position that advances through the available drives (i.e., programmable parameter sets). For example, when the "drive select" position is activated in programming mode, a next programmable parameter set from a group of programmable parameter sets stored in the system controller 32 is selected in relation to a currently-selected programmable parameter set. In one embodiment, the plurality of programmable parameters may include four programmable parameter sets. However, there may be more or less programmable parameter sets in additional embodiments. The "off" position of the power/drive select switch 122 is, for example, a latching position opposite the "drive select" position where the power driven wheelchair is powered down.

The mode select switch 103, for example, is a momentary pushbutton switch. When the mode select switch 103 is activated, for example, a next mode from a plurality of modes is selected in relation to a currently-selected mode. The plurality of modes, for example, may include a driving mode, an automated positioning mode associated with powered seating or powered front rigging, a 4-way switch positioning mode associated with powered seating or powered front rigging, and an environmental control unit (ECU) mode. Other embodiments may include any combination of these modes and additional modes.

The graphic display 126, for example, may include a 128×64 pixel display. A screen on the graphic display 126 may include about five or six lines of text by about 32 characters, about two large icons (e.g., 64×64 pixels icons), about eight small icons (e.g., 32×32 pixel icons), or various combinations thereof. Of course, larger or smaller icons may also be used in various combinations.

The joystick control 128, for example, may include a proportional analog joystick. The joystick control 128, for example, may be used for directional control for menu or icon navigation, setting or modifying a programmable parameter, saving a selected programmable parameter value, directional control for driving the power driven wheelchair, positional control of a selected user support surface, and other selection-type functions when directional or positional control is not required. The joystick control 128 is an example of a screen navigation control. The speed control 130, for example, may include a rotary potentiometer. Turning the speed control 130 between counter-clockwise and clockwise limits adjusts the maximum speed of the power driven wheelchair in relation to operation using the joystick control 128. The mounting hub 132, for example, may be inserted in a mating receptacle on the power driven wheelchair to mount the system controller 32.

Figure 9:
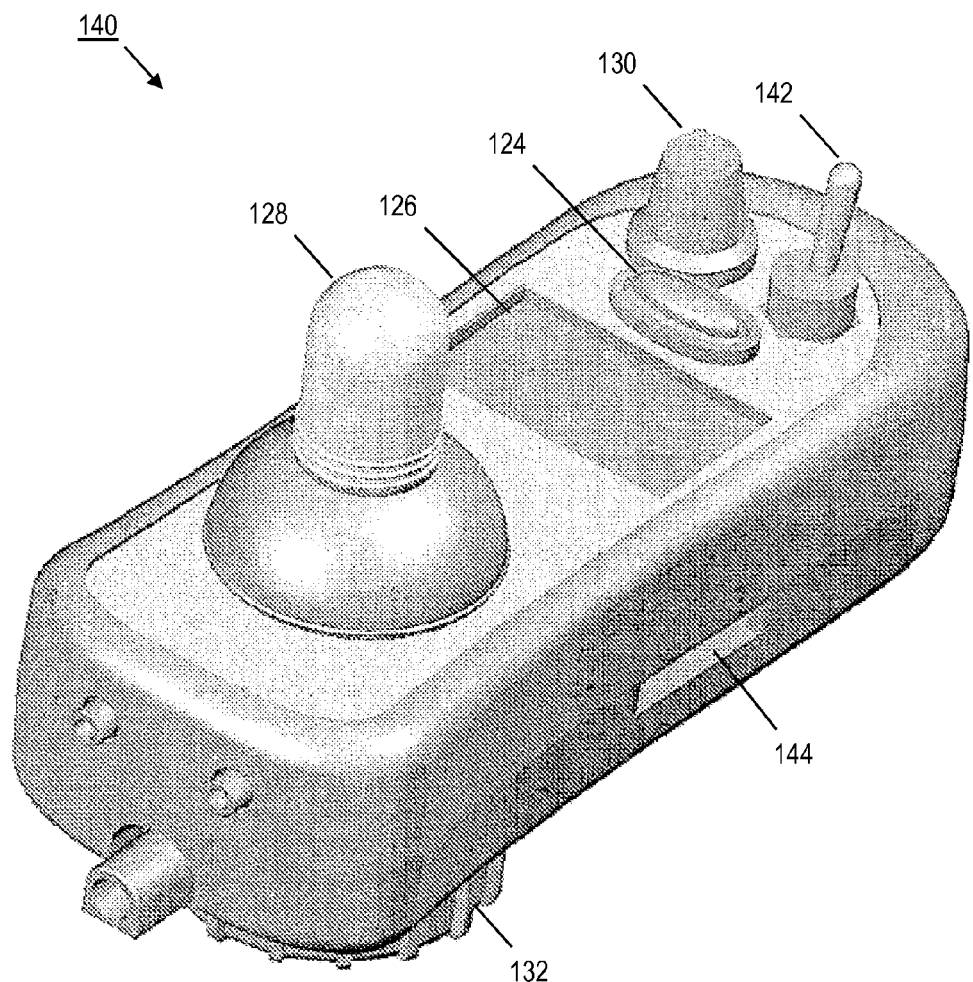

With reference to FIG. 9, another exemplary embodiment of a system controller 140 may include a mode select switch 124, a graphic display 126, a joystick control 128, a speed control 130, a mounting hub 132, a power/drive select switch 142, and a removable memory card slot 144. This system controller 140 may be referred to as a personalized switch rear-mount (PSR) joystick model or simply a PSR model. Generally, the components of the PSR model have the same functional characteristics as the components described above for the MPJ model (FIG. 8). The PSR model provides an alternate construction of a system controller.

Figure 10:
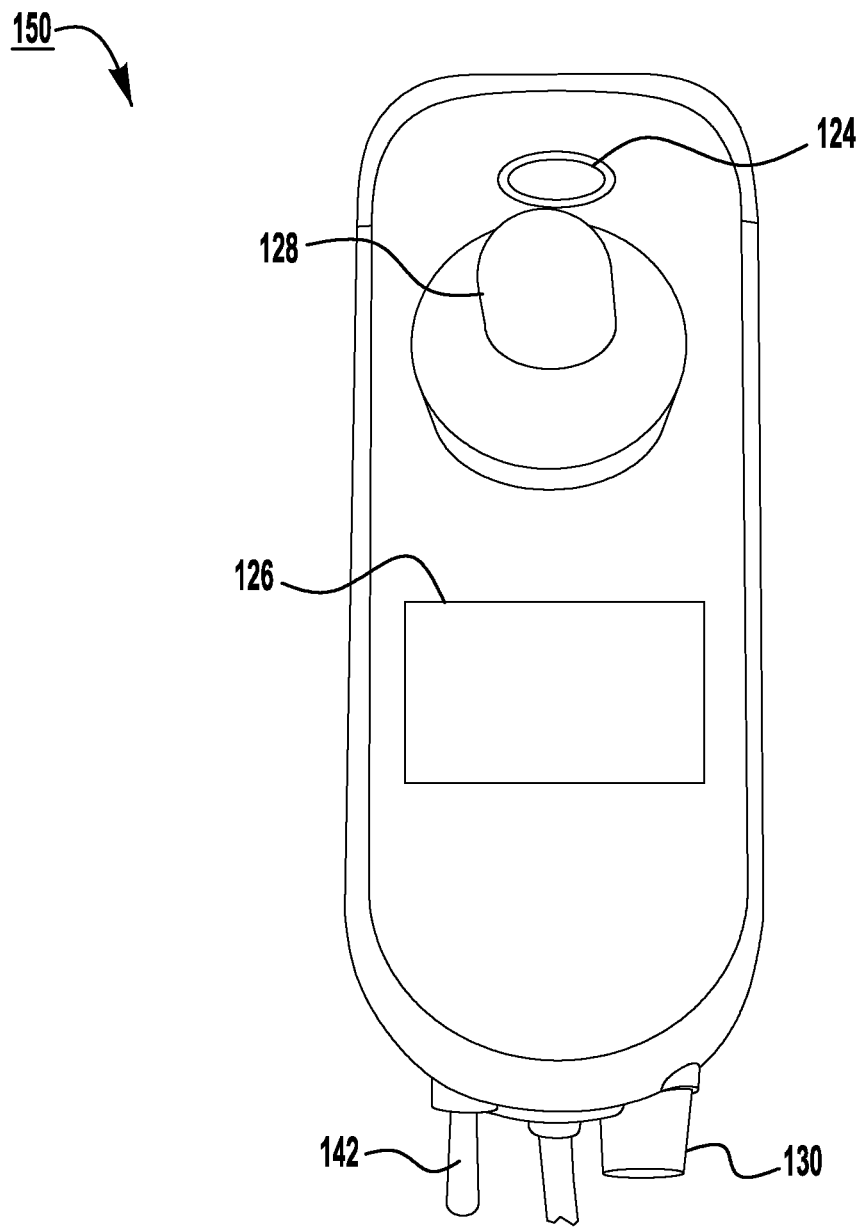

With reference to FIG. 10, still another exemplary embodiment of a system controller 150 may include a mode select switch 124, a graphic display 126, a joystick control 128, a speed control 130, and a power/drive select switch 142. This system controller 150 may be referred to as a personalized switch front-mount (PSF) joystick model or simply a PSF model. A mounting hub (not shown) may also be provided on the PSF model for mounting the system controller 150. The PSF model may also include a removable memory card slot (not shown) for receiving a portable storage medium 86 (FIG. 4), such as a removable memory card. Generally, the components of the PSF model have the same functional characteristics as the components described above for the MPJ model (FIG. 8). The PSF model provides an alternate construction of a system controller.

Figure 11:
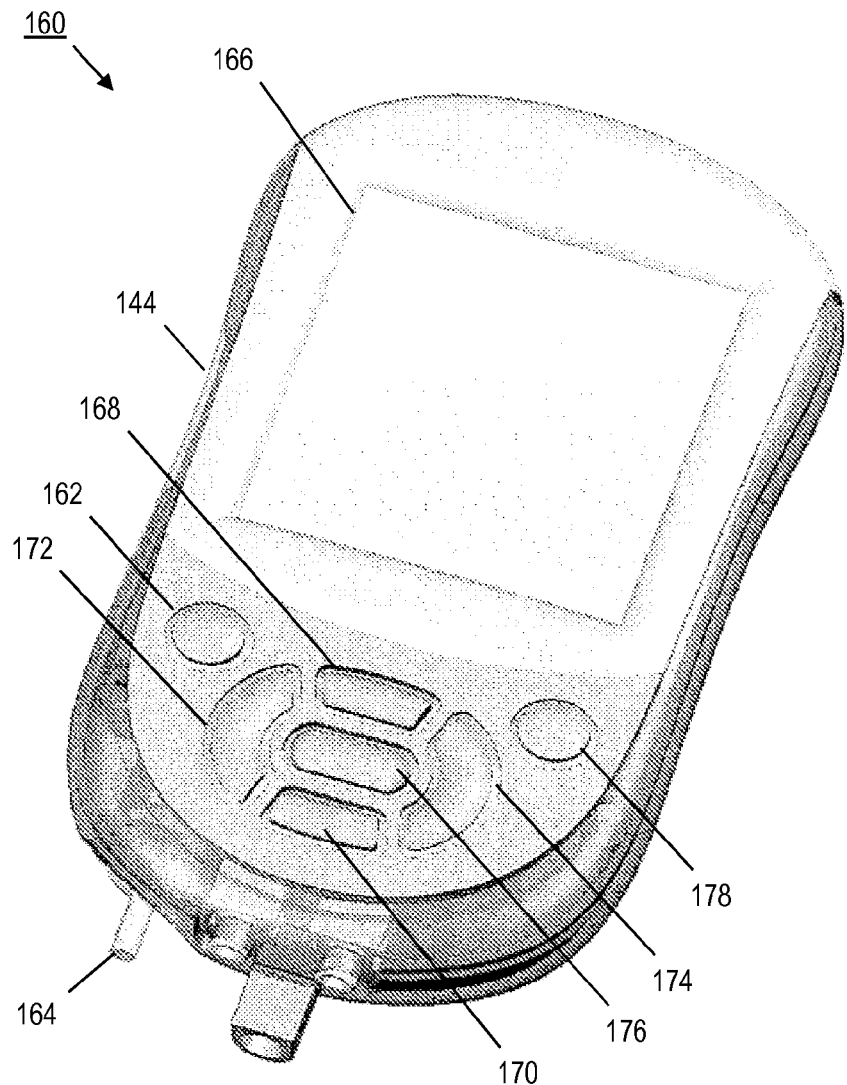

With reference to FIG. 11, yet another exemplary embodiment of a system controller 160 may include a removable memory card slot 144, an info switch 162, a power switch 164, a graphic display 166, an up direction switch 168, a down direction switch 170, a menu/left direction switch 172, a right direction switch 174, a select switch 176, and a save switch 178. This system controller 160 may be referred to as a DISPLAY model. The DISPLAY model may also include a mounting hub (not shown) for mounting the system controller 160. Generally, the removable memory card slot 144 has the same functional characteristics as described above for the MPJ model (FIG. 8).

The info switch 162, for example, may include a momentary pushbutton switch. Activation of the info switch 162 may cause the controller 160 to access and display help information. Certain information from help information file(s) may be provided on the graphic display 166. The help information provided may be related to the content of the display at or about the time the info switch 162 was activated. For example, information retrieved from help information file(s) may be context-sensitive with respect to an active screen object, such as a current menu or icon selection, a current programmable parameter selection, a current drive selection, a current mode selection, or a current error message. This provides information about a specific item as it is currently being used. The context-sensitive help information may: i) explain current selections for operation or support of the power driven wheelchair, ii) current settings for programmable parameters, iii) current selection(s) with respect to screen objects (i.e., active screen object(s)) of the display, and iv) describe an expected result from activation of the selected option. In additional embodiments, retrieval of specific information from the help information file(s) may be menu-driven, topic-driven, or driven by another suitable means.

The power switch 164, for example, may include a two position toggle switch with on and off positions. When the power switch 164 is set to the "on" position the power driven wheelchair is powered on. When the power switch 164 is switched from the "on" position to the "off" position, for example, the power driven wheelchair may begin a predetermined shutdown sequence. The graphic display 166, for example, is a 160×160 pixel display. A screen on the graphic display 166 may include about twelve lines of text by about 40 characters, about four large icons (e.g., 64×64 pixels icons), about 25 small icons (e.g., 32×32 pixel icons), or various combinations thereof. Of course, larger or smaller icons may also be used in various combinations.

The up, down, menu/left, and right direction switches 168, 170, 172, 174, for example, may include momentary pushbutton switches. The up, down, menu/left, and right direction switches 168, 170, 172, 174 may be used for directional control for menu or icon navigation, setting or modifying a programmable parameter, positional control of a selected user support surface, and other selection-type functions when directional or positional control is not required. For certain display screens, activation of the menu/left direction switch 172 may cause the controller 160 to present the previous menu on the graphic display 166. The up, down, menu/left, and right direction switches 168, 170, 172, 174, in any combination, are examples of a screen navigation control. In another embodiment, the up, down, menu/left, and right direction switches 168, 170, 172, 174, for example, may also be used for directional control for certain power driven wheelchair driving operations.

The select switch 176, for example, may include a momentary pushbutton switch. The select switch 176 may be used for selection of menu items or icons. The save switch 178, for example, may include a momentary pushbutton switch. The save switch 178 may be used for saving a displayed value of a selected programmable parameter as the current value for the parameter. The mode select, drive select, and speed control functions described above for the MPJ model (FIG. 7), for example, may be implemented through the graphic display 166, navigational control using the up, down, menu/left, and right direction switches 168, 170, 172, 174, and activation of the select or save switches 176, 178.

Figure 12:
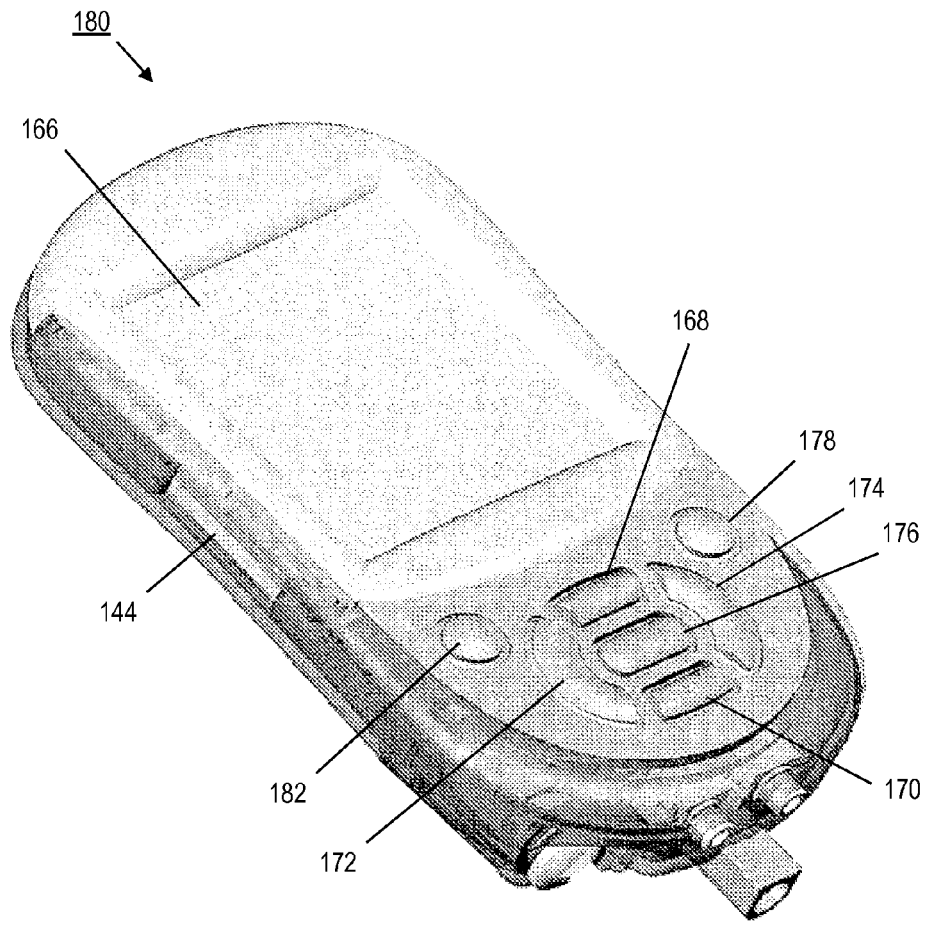
FIG. 12 is a perspective view of an exemplary embodiment of a programmer used in conjunction with related embodiments of power driven wheelchairs.

With reference to FIG. 12, an exemplary embodiment of a programmer 180 may include a removable memory card slot 144, a graphic display 166, an up direction switch 168, a down direction switch 170, a menu/left direction switch 172, a right direction switch 174, a select switch 176, a save switch 178, and a power/info switch 182. Generally, the components of the programmer 180 have the same functional characteristics as the components described above for the DISPLAY model of the system controller 160 (FIG. 11). However, the programmer 180 may combine the power and info functions in the power/info switch 182. Notably, the programmer 180 may not require the speed control functionality of the DISPLAY model. The programmer 180 may also not require other functionality of the DISPLAY model in relation to driving the power driven wheelchair or positioning the user support surfaces.

The power/info switch 182, for example, may include a momentary switch. Pressing and holding the power/info switch 182 for at least a predetermined time (e.g., three seconds) may provide control of toggling power on and power off functions. For example, if the programmer 180 is powered off, pressing and holding the power/info switch 182 for at least the predetermined time may cause the programmer 180 to be powered on. Similarly, if the programmer 180 is powered on, pressing and holding the power/info switch 182 for at least the predetermined time may cause the programmer 180 to begin a predetermined shutdown sequence. The info function may be provided by pressing and releasing the power/info switch 182 within a predetermined time (e.g., two seconds). The characteristics of the info function of the power/info switch 182 are otherwise the same as those described above for the info switch 162 of the DISPLAY model of the system controller 160 (FIG. 11).

Figure 13:
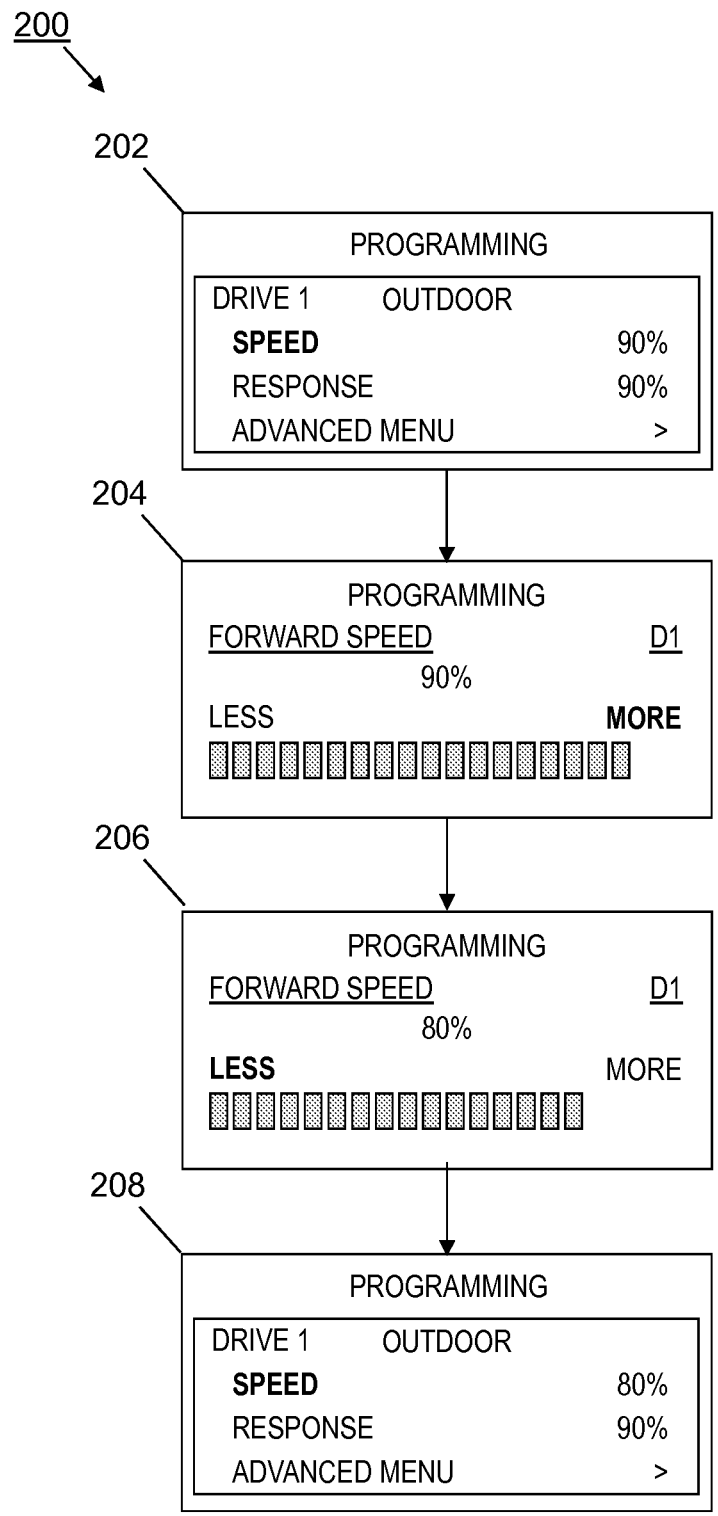
FIGS. 13 and 14 are examples of sequences of display screens associated with setting or modifying an exemplary programmable parameter within a selected programmable parameter set associated with a power driven wheelchair.

With reference to FIG. 13, an exemplary sequence 200 of display screens on a system controller or programmer associated with setting or modifying an exemplary programmable parameter within a selected programmable parameter set associated with a power driven wheelchair begins at a first screen 202. The first screen 202 depicts an exemplary main menu for a programming mode of the power driven wheelchair. As shown in 202, a currently selected programmable parameter set is named DRIVE 1. DRIVE 1 is also labeled OUTDOOR which infers that its programmable parameters are set to values suitable for driving the power driven wheelchair in an outdoor environment. A SPEED programmable parameter in DRIVE 1 is currently set to 90%. Bold highlighting indicates that the SPEED programmable parameter is currently selected. In other embodiments, use of a pointer or any other suitable form of highlighting may be used to indicate the current or active selection in this menu and subsequent menus or other types of screens. With the SPEED programmable parameter selected, a "select" activation advances the sequence 200 to the second screen 204. The "select" activation, for example, may be performed by moving a joystick control to the right or by activating a select switch.

The second screen 204 depicts an exemplary set/modify screen for the SPEED programmable parameter. As shown in 204, the current value of the SPEED programmable parameter for drive 1 (i.e., D1) is 90%. A progress bar may provide a graphical representation of the current 90% value. The MORE and LESS objects indicate that the programmable parameter is a "range" parameter and that the value of the parameter may be selected by activation of, for example, a joystick control or up or down direction switches. For example, moving a joystick control on a system controller forward may be a MORE activation and moving it back may be a LESS activation. Similarly, pressing an up direction switch on a system controller or programmer may be a MORE activation and pressing a down direction switch may be a LESS activation. As shown by the bold highlighting, the MORE object may have been the last control activation. In other embodiments, use of a pointer or any other suitable form of highlighting may be used to indicate the last control activation. However, if the LESS object was the last control activation, the LESS object may be highlighted in bold. For example, after one or more LESS activations, the third screen 206 may be displayed.

The third screen 206 shows that the current value for the SPEED programmable parameter is now 80%. For example, if the SPEED programmable parameter is adjusted in five percent intervals, this change from 90% to 80% is based on two LESS activations. Alternatively, if the resolution for adjusting the programmable parameter is two percent, five LESS activations would produce the ten percent adjustment shown in the third screen 206. The interval or resolution for adjustment of a given programmable parameter can be any suitable value and can be linear or non-linear. In one embodiment, neither the LESS nor the MORE objects are initially highlighted by default. However, the LESS object is highlighted, for example, in bold and the MORE object is returned to normal text following a LESS activation. Similarly, for a MORE activation, the MORE object is highlighted, for example, in bold and the LESS object is returned to normal text. At 206, activation of a save switch saves the displayed value (i.e., 80%) for the SPEED programmable parameter in a corresponding storage location associated with the selected programmable parameter set (e.g., D1).

Activation of the save switch may also automatically advance the sequence 200 to the fourth screen 208 which is the main menu for the programming mode. In another embodiment, a previous menu activation may be required to reverse the sequence 200 until the main menu is again displayed as shown in the fourth screen 208. For example, moving a joystick control on a system controller to the left may be interpreted as a previous menu activation. Similarly, pressing a left direction switch on a system controller or programmer may be interpreted as a previous menu activation. The fourth screen 208 depicts the exemplary main menu of the programming mode with the current value of the SPEED programmable parameter for DRIVE 1 now set to 80%.

Figure 14:
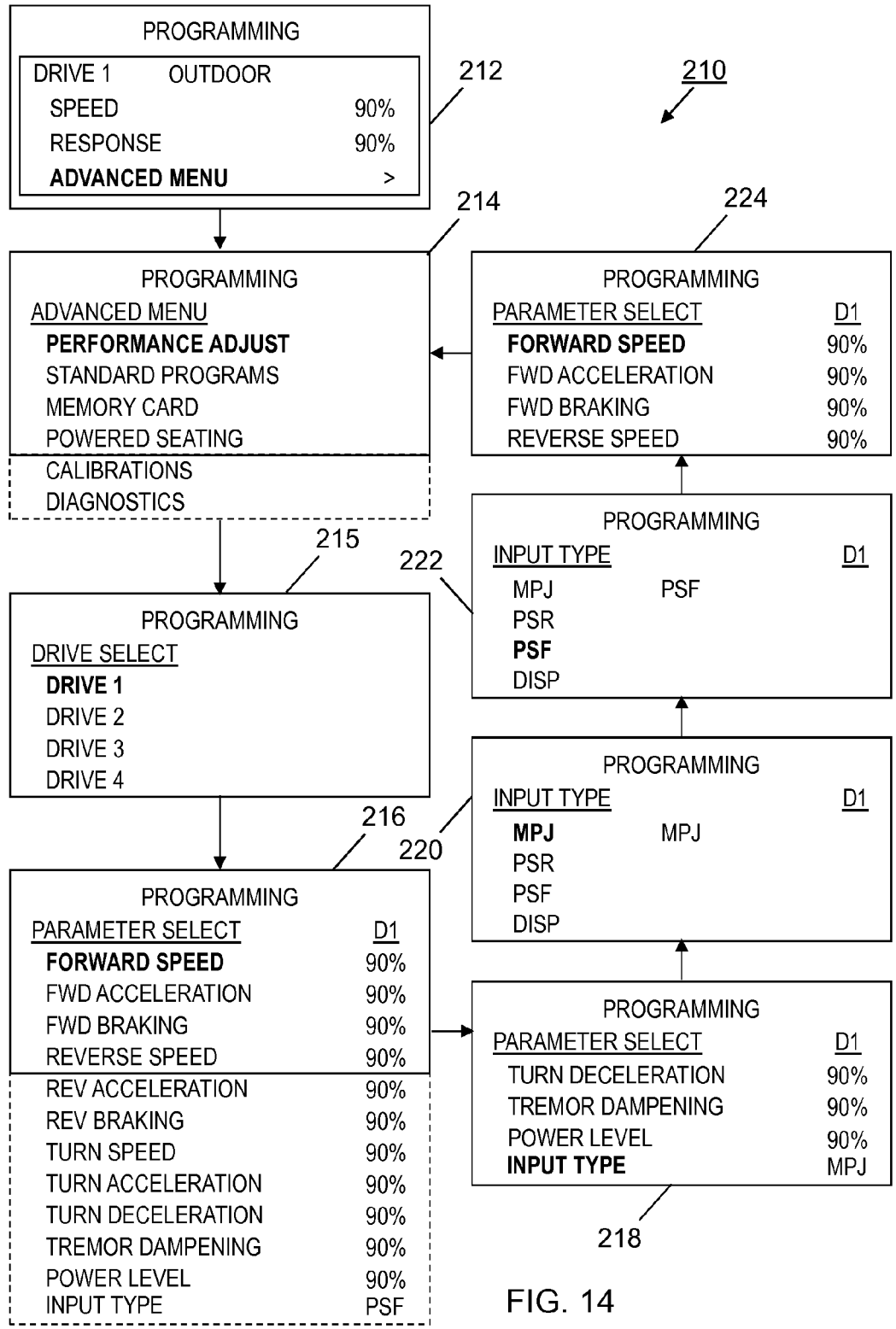
Figure 15A:
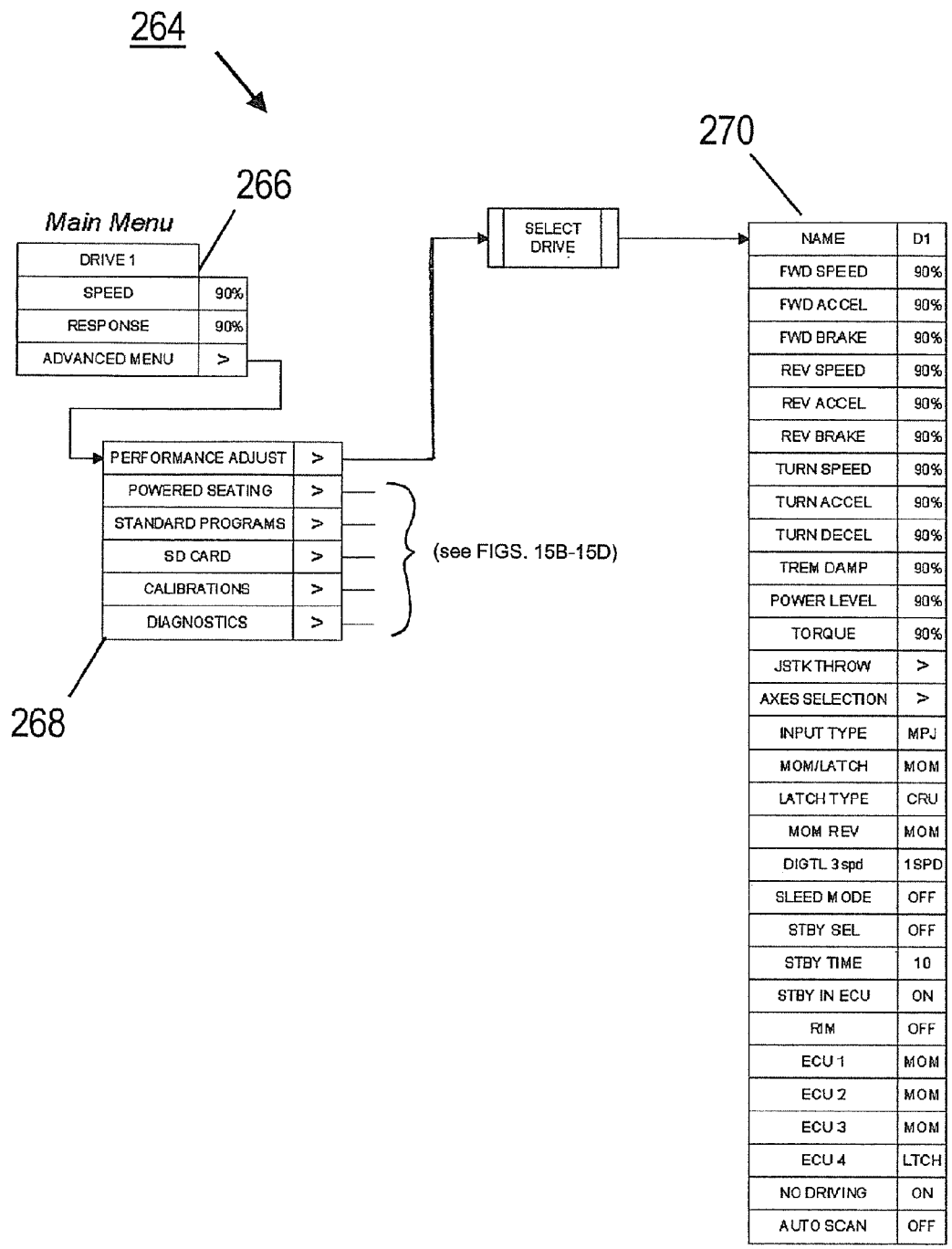
FIG. 15A is a portion of an exemplary menu hierarchy for a programming mode associated with operation or support of a power driven wheelchair.
Figure 15B:
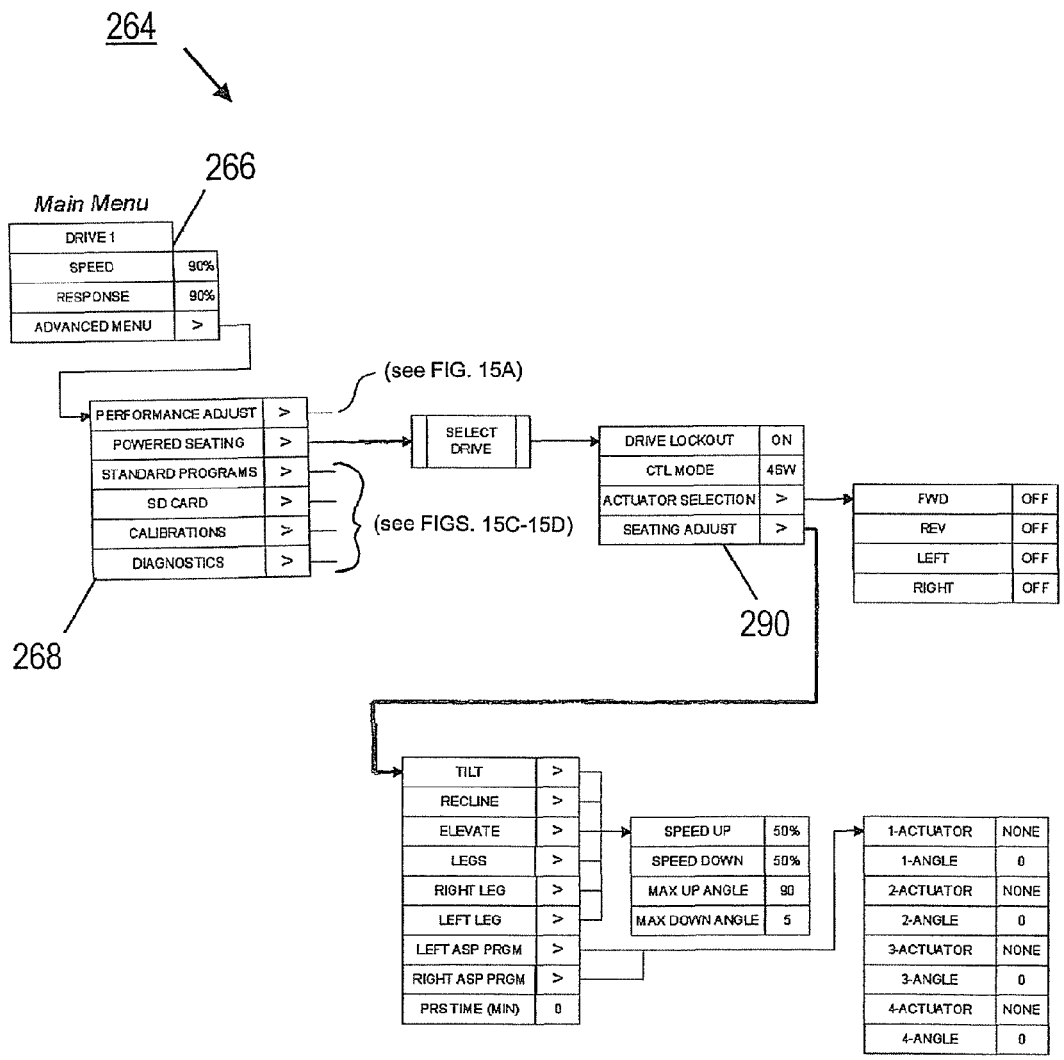
FIG. 15B is another portion of the exemplary menu hierarchy for a programming mode associated with operation or support of a power driven wheelchair.
Figure 15C:
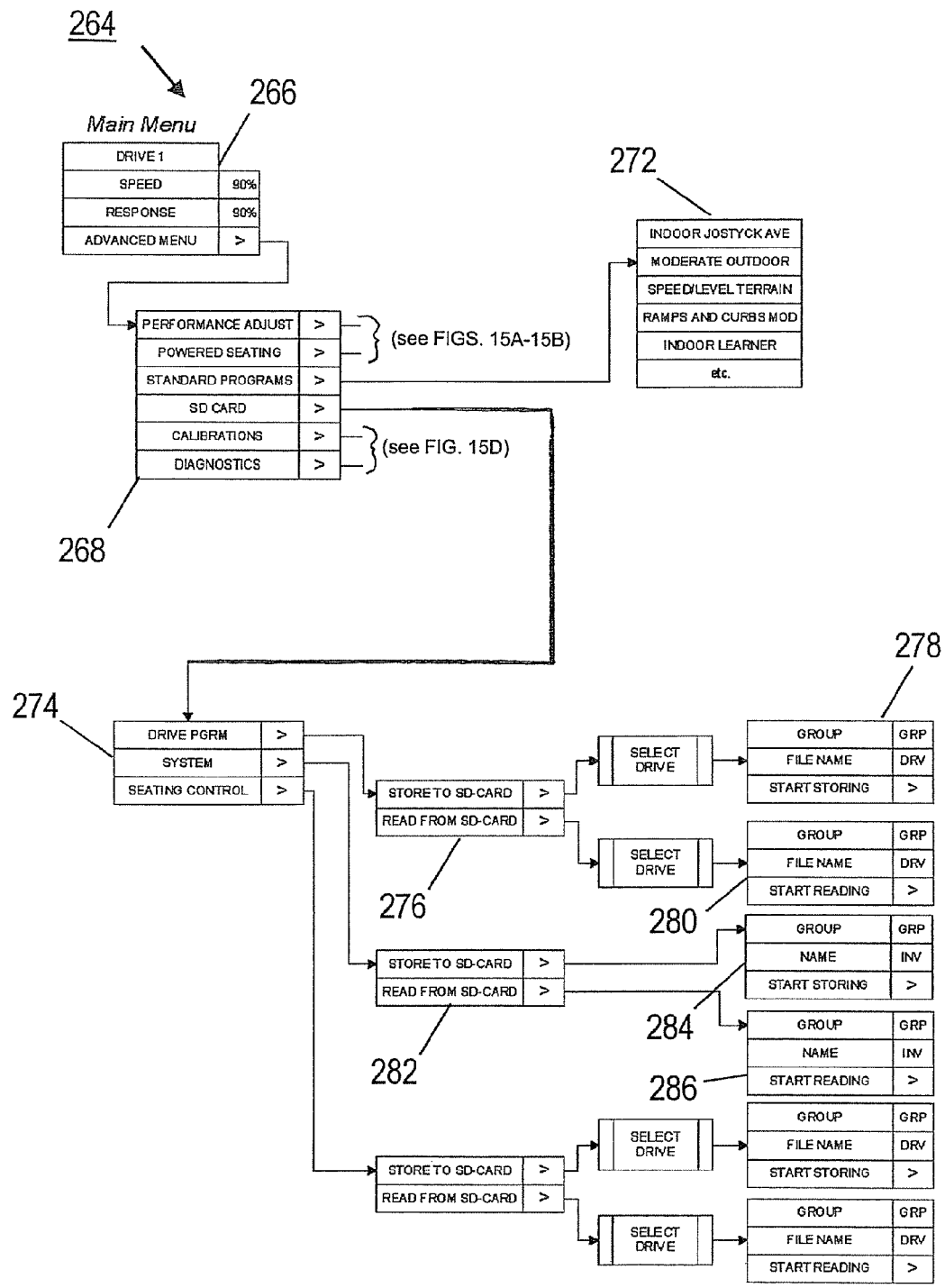
FIG. 15C is another portion of the exemplary menu hierarchy for a programming mode associated with operation or support of a power driven wheelchair.
Figure 15D:
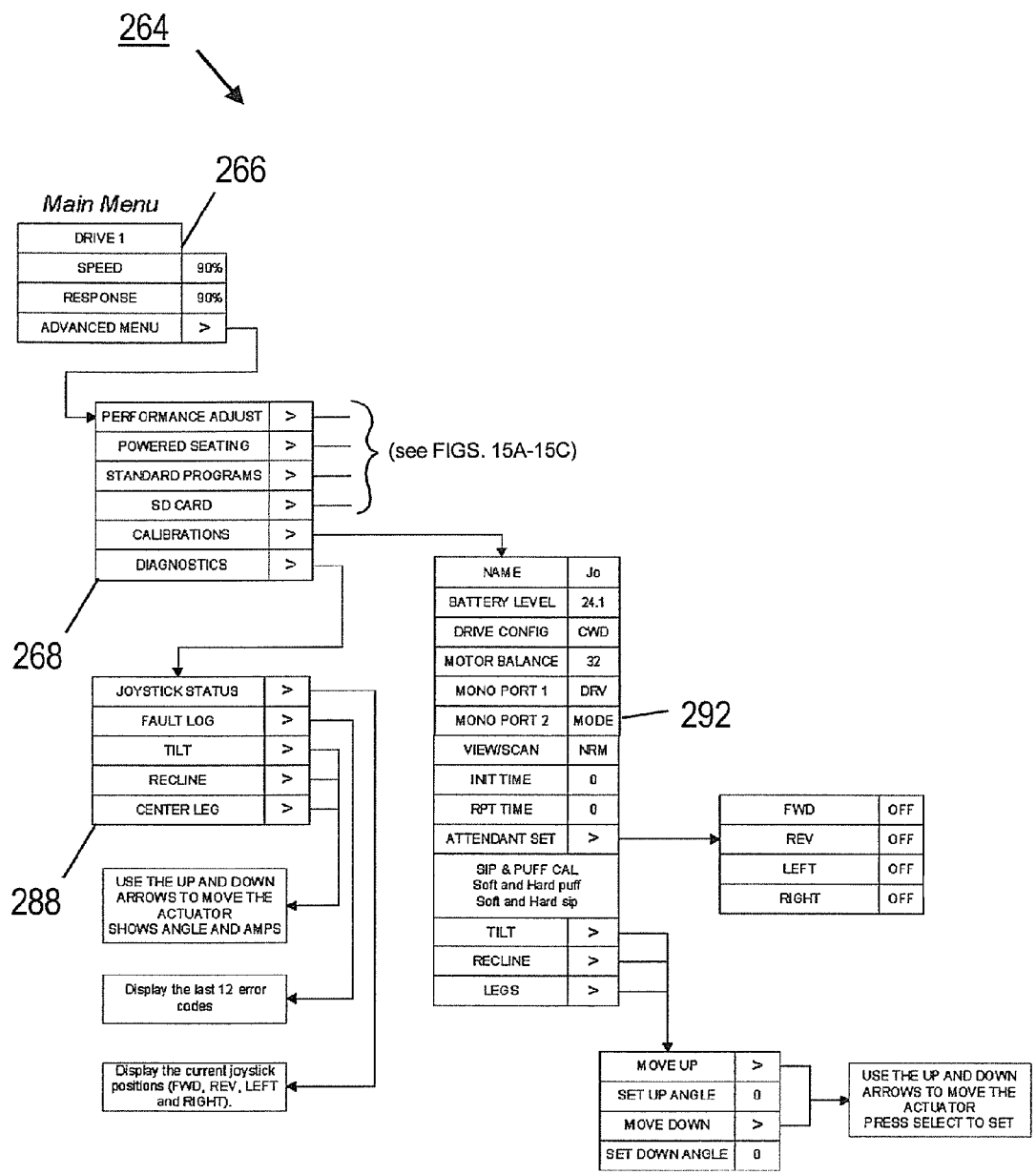
FIG. 15D is another portion of the exemplary menu hierarchy for a programming mode associated with operation or support of a power driven wheelchair.

With reference to FIG. 14, another exemplary sequence 210 of display screens on a system controller or programmer associated with setting or modifying another exemplary programmable parameter within a selected programmable parameter set associated with a power driven wheelchair begins at a first screen 212. The first screen 212 depicts an exemplary main menu for a programming mode of the power driven wheelchair. As shown in 212, a currently selected programmable parameter set is named DRIVE 1. DRIVE 1 is also labeled OUTDOOR which infers that its programmable parameters are set to values suitable for driving the power driven wheelchair in an outdoor environment. Bold highlighting indicates that the ADVANCED MENU is currently selected. This may be the default selection when the main menu is initially displayed or it may be the result of one or more down or up activations using a joystick control or an up or down direction switch. In other embodiments, use of a pointer or any other suitable form of highlighting may be used to indicate the current or active selection in this menu and subsequent menus or other types of screens. With the ADVANCED MENU selected, a "select" activation advances the sequence 210 to the second screen 214. The "select" activation, for example, may be performed by moving the joystick control to the right or by activating a select switch.

The second screen 214 depicts an exemplary ADVANCED MENU. The ADVANCED MENU, for example, may include five or more menu items in a list. An individual menu item may be selected by navigating up or down the list of menu items. The display, however, may not be able to display all of the menu items together. As shown in 214, the first four items are initially displayed on the screen and bold highlighting indicates that the first menu item, PERFORMANCE ADJUST, is currently selected. In order to select the last menu item, five down activations may be required. With the fourth down activation, the screen may begin to scroll down the list of menu items. After the last menu item selected, for example, the display may continue to scroll to the beginning of the list with additional down activations. Conversely, if the last menu item is selected, additional down activations may have no effect and up activations may be required to move up the menu list. Of course, up or down activations using the joystick control or up and down direction switches may be used to navigate the list of menu items. For the second screen 214, PERFORMANCE ADJUST is selected and a "select" activation advances the sequence 210 to the third screen 215.

The third screen 215 depicts an exemplary DRIVE SELECT list. The DRIVE SELECT list identifies multiple programmable parameter sets for selection of a specific set for which programmable parameters are to be set or modified. As shown in 215, there may be four programmable parameter sets and a currently selected programmable parameter set (i.e., DRIVE 1) may be initially selected by default and highlighted in bold. Up or down activations using the joystick control or up and down direction switches may be used to navigate the list of menu items. For the third screen 215, a "select" activation selects the programmable parameter set associated with the highlighted menu item and advances the sequence 210 to the fourth screen 216.

The fourth screen 216 depicts an exemplary PARAMETER SELECT list of programmable parameters. The PARAMETER SELECT list, for example, may include a plurality of programmable parameters for DRIVE 1 which may be individually selected by navigating up or down the list. For example, after eleven down activations, the display has scrolled down the list to an INPUT TYPE programmable parameter associated with DRIVE 1 and the fifth screen 218 is displayed. At this point, the INPUT TYPE programmable parameter is selected and a "select" activation advances the sequence 210 to the sixth screen 220.

The sixth screen 220 depicts an exemplary set/modify screen for the INPUT TYPE programmable parameter. As shown in 220, the current value of the INPUT TYPE programmable parameter for DRIVE 1 is MPJ. For example, MPJ may represent an MPJ model system controller. The list of four options (e.g., MPJ, PSR, PSF, and DISP) indicates that programmable parameter is a "choice" parameter and that the value of the parameter may be selected by navigating up or down the list. For example, two down activations moves the pointer down to the PSF option and a "select" activation advances the sequence 210 to the seventh screen 222. For example, PSF may represent a PSF model system controller.

The seventh screen 222 shows that the current value for the INPUT TYPE programmable parameter is now PSF. With the current value and the selected option both PSF, for example, a "save" activation saves the current value of the INPUT TYPE programmable parameter for DRIVE 1 in a corresponding storage location. With the current value and the selected option both PSF, for example, activation of the save switch may also automatically advance to the eighth screen 224. In another embodiment, one or more previous menu activation may be required to reach the eighth screen 224. Under the exemplary circumstances described herein, the select switch and the save switch can be a common multi-function switch, such as moving a joystick control to the right. However, in another embodiment, the select and save switches may be separate switches.

The eighth screen 224 depicts the exemplary PARAMETER SELECT list of programmable parameters as displayed in the fourth screen 216. However, at this point, if one were to scroll down to the INPUT TYPE programmable parameter, the current value would be PSF. From 224, a previous menu activation, for example, may result in display of the ADVANCE MENU screen 214 again. Likewise, another previous menu activation, for example, may result in display of the main menu again, as shown in the first screen 212.

With reference to FIG. 15, an exemplary programming mode menu hierarchy 264 for setting or modifying a programmable parameter associated with operation of a power driven wheelchair begins with a main menu 266. A similar embodiment of the main menu 266 is also depicted in FIG. 13 and described above in more detail. An advanced menu 268 may be selected from the main menu 266. A similar embodiment of the advanced menu 268 is described above in more detail with reference to FIG. 14. Performance adjust 270 may be selected after from the advanced menu 268. A similar embodiment of the performance adjust 270 is described above in more detail with reference to FIG. 14.

A standard programs menu 272 may be selected from the advanced menu 268. An SD card menu 274 may also be selected from the advanced menu 254. Additional menus or items, such as a drive pgrm (program) item 276, a store (drive program) to SD card item 278, a read (drive program) from SD card item 280, a system item 282, a store (system) to SD card item 284, and a read (system) from SD card item 286 may be selected within the hierarchy of the SD card menu 274. In other embodiments, the SD card menu 274 may be referred to as a removable memory card menu or a portable storage medium menu. Additional menus or lists, such as a diagnostics menu 288, a powered seating menu 290, and a calibrations menu 292 may also be selected from the advanced menu 268.

Figure 16:
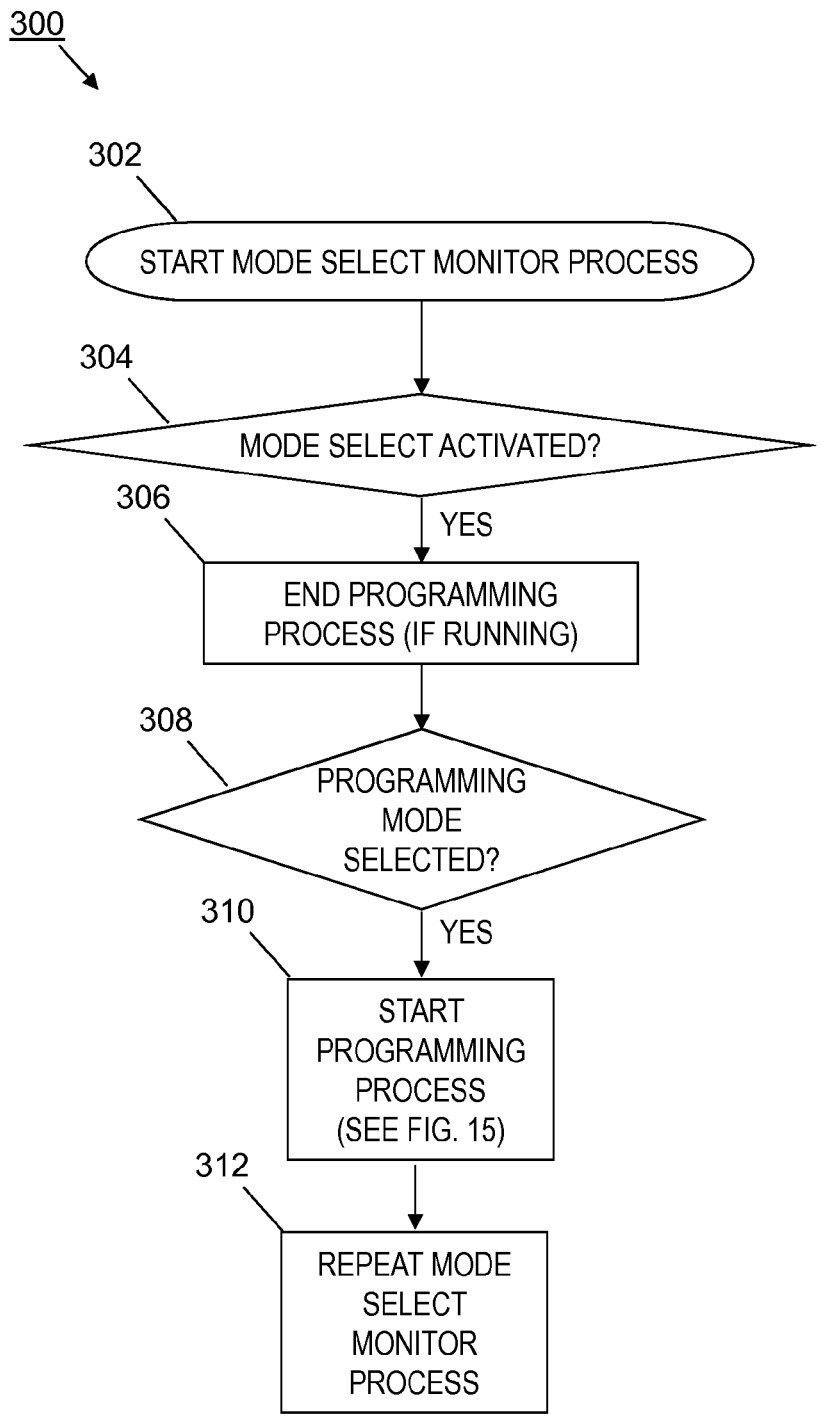
FIG. 16 is a flow chart of an exemplary mode select monitor process associated with setting or modifying a programmable parameter.

With reference to FIG. 16, an exemplary mode select monitor process 300 associated with setting or modifying a programmable parameter begins at 302 where the process starts. At 304, the process may detect activation of a mode select switch (e.g., 124 (FIG. 8)). In another embodiment, the process may periodically check the condition of the mode select switch. If the mode select switch was activated, system programs that are running for a current mode, such as a driving mode, may be suspended or ended so that a system mode can be selected (306). After a mode is selected, suspended system programs that are compatible with the selected mode may be continued while those that are not compatible may be ended. If the programming mode is selected in 308, the programming process (see FIG. 17) may be started in 310. If the programming process was suspended in 306, it may be continued in 310. Next, at 312, the mode select monitor process is repeated. The various aspects of FIG. 16 described above may be automated, semi-automated, or manual and may be implemented through hardware, software, firmware, or combinations thereof.

Figure 17:
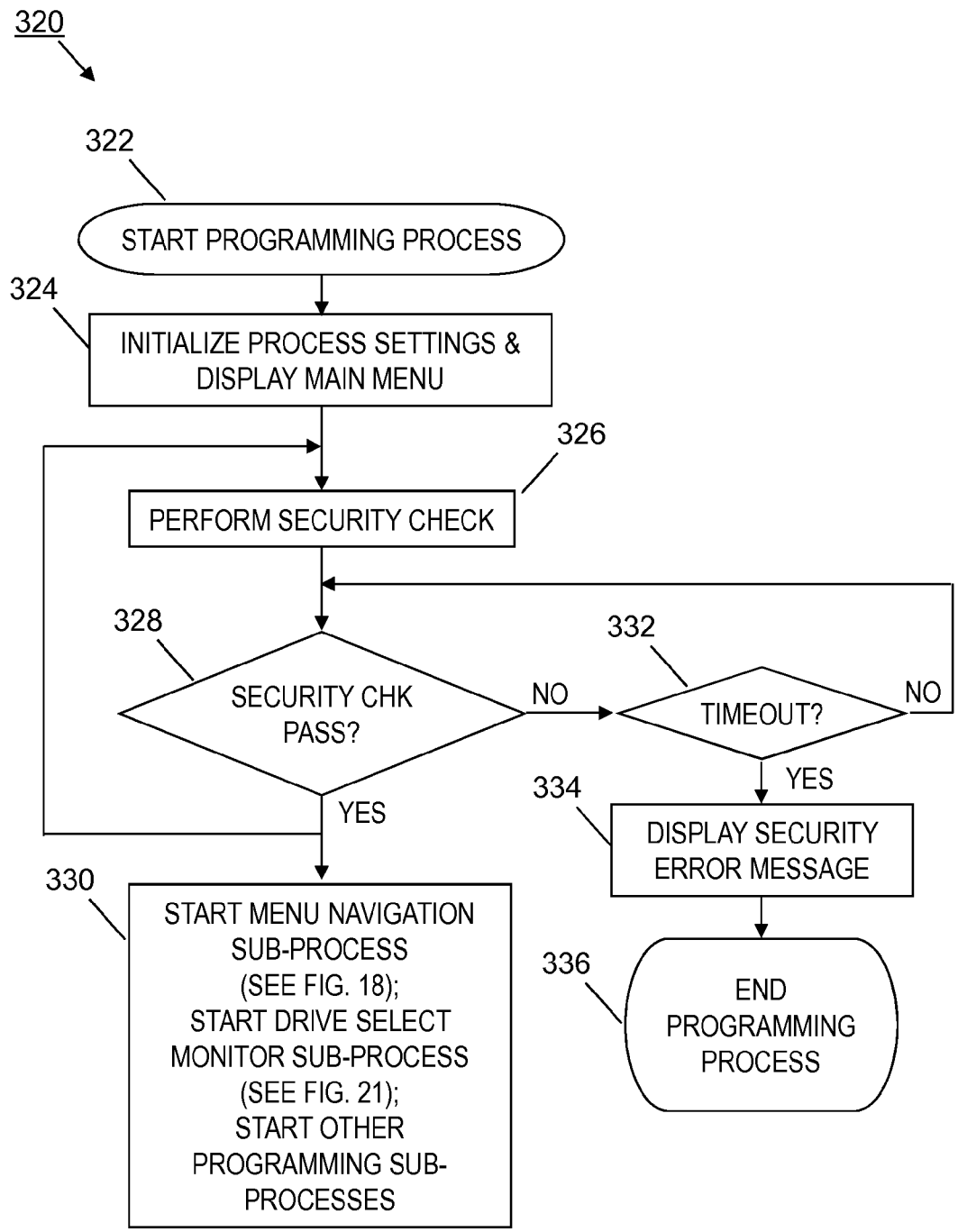
FIG. 17 is a flow chart of an exemplary programming process associated with setting or modifying a programmable parameter.

With reference to FIG. 17, an exemplary programming process 320 associated with setting or modifying a programmable parameter begins at 322 where the process starts. At 324, programming process settings may be initialized and a main menu may be displayed on a graphic display (e.g., 124 (FIG. 8)). A security check may be performed prior to advancing from the main menu to prevent unauthorized setting or modifying of programmable parameters (326). This security check is optional and not required, particularly in regard to the programming functions. It is described here because in certain applications users, attendants, and technicians may have different privileges with regard to operation and support of the power driven wheelchair. A security check facilitates limiting access to one or more features provided in the power driven wheelchair. For example, a security check may be used to limit access to programming function to technicians.

In one embodiment, the security check, for example, may include a hardware or software key associated with insertion of an appropriate portable storage medium (e.g., 86 (FIG. 4)), such as a removable memory card, in a storage medium interface (e.g., 72 (FIG. 4)), such as removable memory card slot (e.g., 144 (FIG. 9)). In another embodiment, the security check, for example, may include a hardware or software key associated with connection of the programmer (e.g., 60 (FIG. 3)) to the system controller (e.g., 32 (FIG. 3)). If the programmer is being used, the security check may include a key status signal transmitted by the programmer to the system controller.

Figure 21:
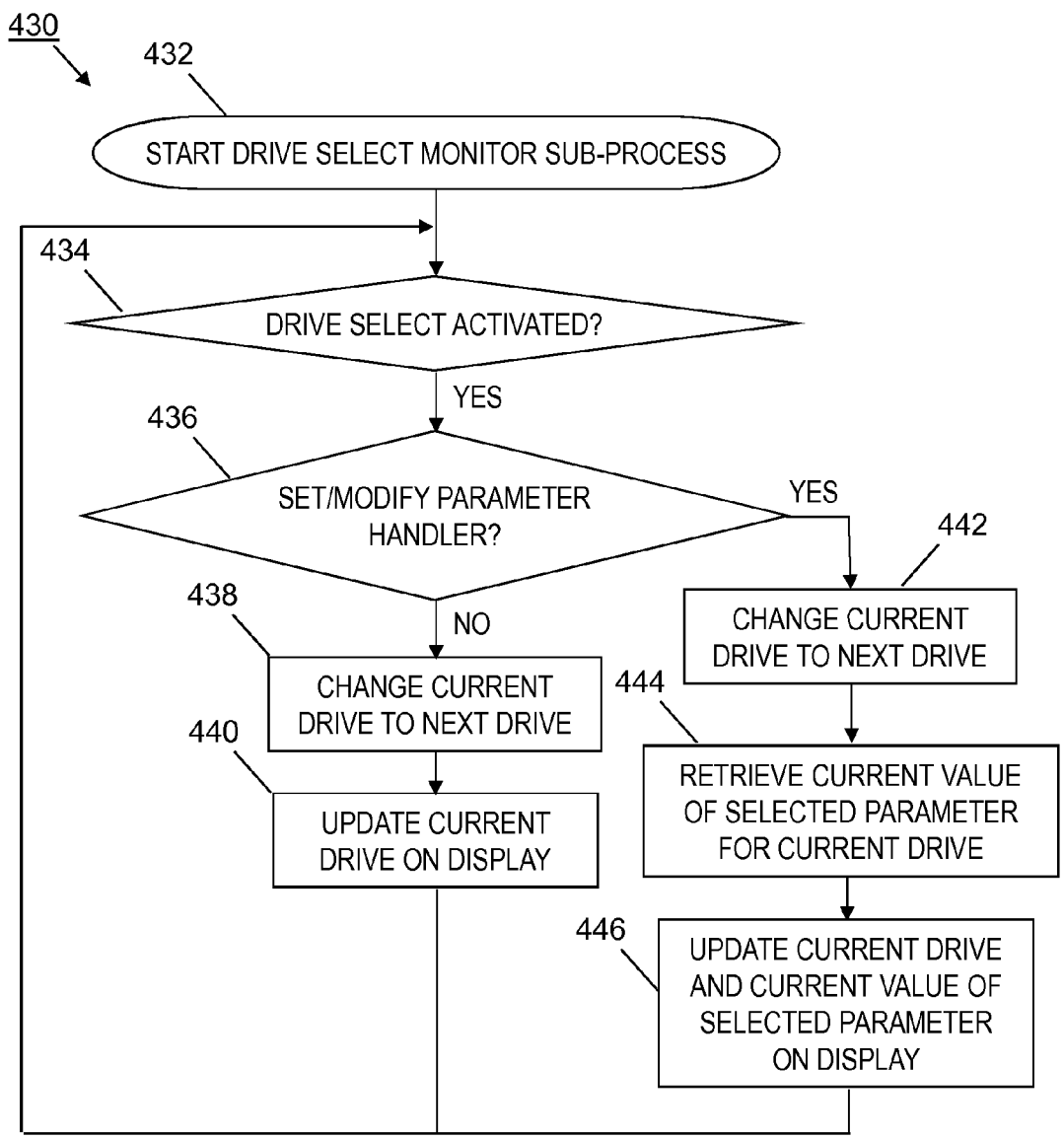
FIG. 21 is a flow chart of an exemplary drive select monitor sub-process associated with setting or modifying a programmable parameter.

If the security check at 328 passes, the programming process may return to 326 to repeat the security check and also may advance to 330 to start or continue a menu navigation sub-process (see FIG. 18) and to start or continue a drive select monitor sub-process (see FIG. 21). At 330, other programming sub-processes may also be started or continued. The security check, for example, may be repeated about every ten milliseconds while the programming process is running. In additional embodiments, the security check may be repeated at a different periodic interval. Moreover, the interval between successive security checks may be aperiodic, rather than periodic. Since 326-330 are repeated, after the initial successful pass through the security check the menu navigation sub-process, drive select monitor sub-process, and any other programming sub-process may be continued in 330 after additional successful passes through the security check.

If the security check does not pass at 328, the programming process may advance to 332 to determine if a predetermined timeout period has expired. If the timeout period is not expired, the process may return to 328 to determine if the security check passed. If the timeout period is expired at 332, a security error message may be displayed (334) and the programming process may be ended (336). The various aspects of FIG. 17 described above may be automated, semi-automated, or manual and may be implemented through hardware, software, firmware, or combinations thereof.

Figure 18:
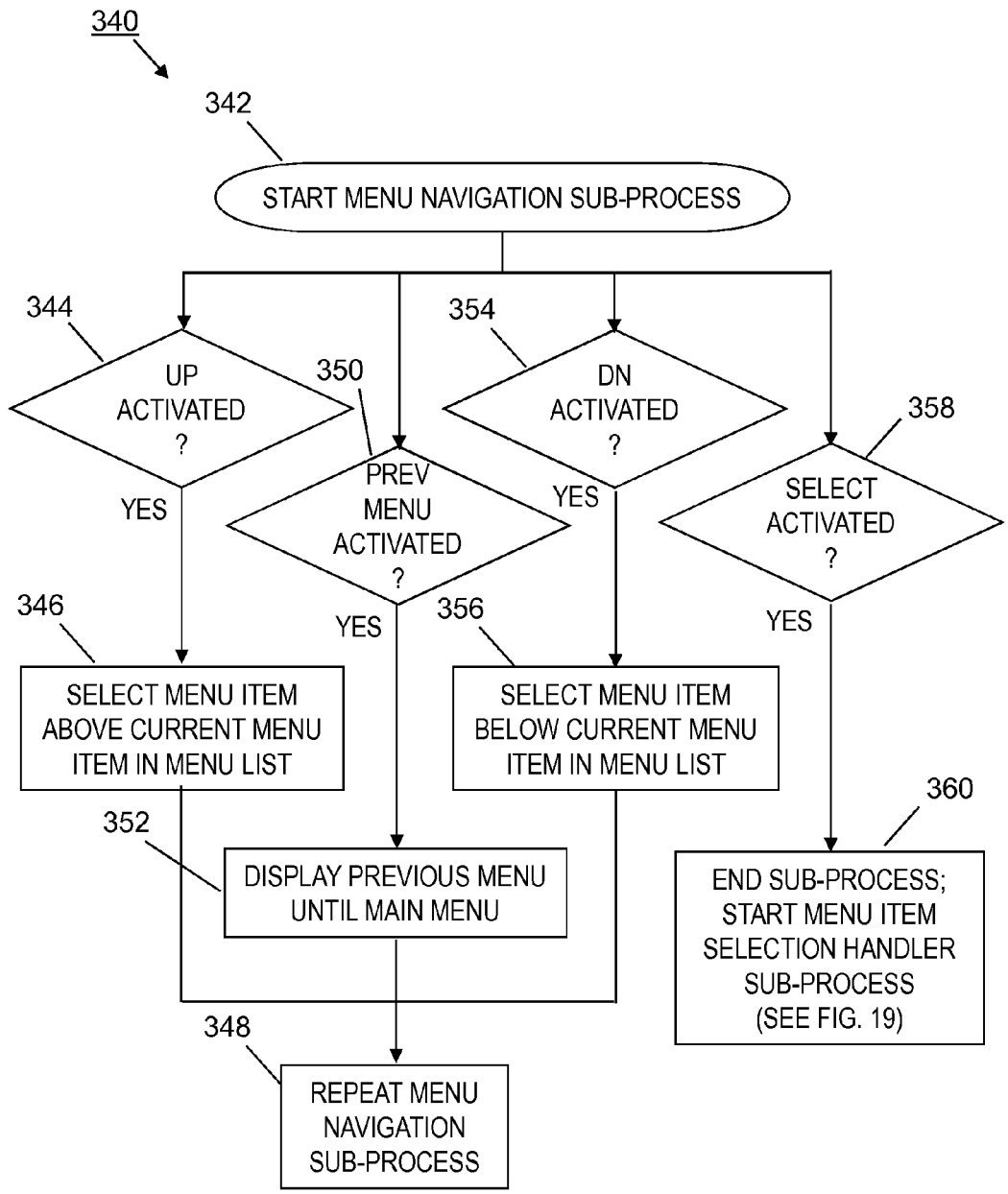
FIG. 18 is a flow chart of an exemplary menu navigation sub-process associated with setting or modifying a programmable parameter.

With reference to FIG. 18, an exemplary menu navigation sub-process 340 associated with setting or modifying a programmable parameter begins at 342 where the sub-process starts. At 344, the process may detect an up activation. If an up activation is not detected, the process does not advance beyond 344. For example, moving a joystick control (e.g., 128 (FIG. 8)) forward or pressing an up direction switch (e.g., 168 (FIG. 11)) may provide an up activation. If an up activation is detected, the menu item above the current menu item may be selected and highlighted to indicate the newly selected menu item (346). The previously highlighted menu item may be returned to normal text. Next, at 348, the menu navigation sub-process may be repeated.

At 350, the process may detect a previous menu activation. If a previous menu activation is not detected, the process does not advance beyond 350. For example, moving a joystick control (e.g., 128 (FIG. 8)) to the left or pressing a menu/left direction switch (e.g., 172 (FIG. 11)) may provide an previous menu activation. If a previous menu activation is detected, the previous menu in a menu hierarchy (e.g., 264 (FIG. 15)) may be displayed (352), unless, for example, the current menu is the main menu. Next, at 348, the menu navigation sub-process may be repeated with respect to the previous menu.

At 354, the process detects a down activation. If a down activation is not detected, the process does not advance beyond 354. For example, moving a joystick control (e.g., 128 (FIG. 8)) backward or pressing a down direction switch (e.g., 174 (FIG. 11)) may provide a down activation. If a down activation is detected, the menu item below the current menu item may be selected and highlighted to indicate the newly selected menu item (356). The previously highlighted menu item may be returned to normal text. Next, at 348, the menu navigation sub-process may be repeated.

At 358, the process detects a select activation. If a select activation is not detected, the process does not advance beyond 358. For example, moving a joystick control (e.g., 128 (FIG. 8)) to the right or pressing a select switch (e.g., 174 (FIG. 11)) may provide a select activation. If a select activation is detected, the menu navigation sub-process may be ended and a menu item selection handler sub-process (see FIG. 19) may be started.

In another embodiment, the menu navigation sub-process 340 may periodically check the condition of the corresponding components associated with an up activation, previous menu activation, down activation, and select activation in a loop to determine if corresponding activations occur. The various aspects of FIG. 18 described above may be automated, semi-automated, or manual and may be implemented through hardware, software, firmware, or combinations thereof.

Figure 19:
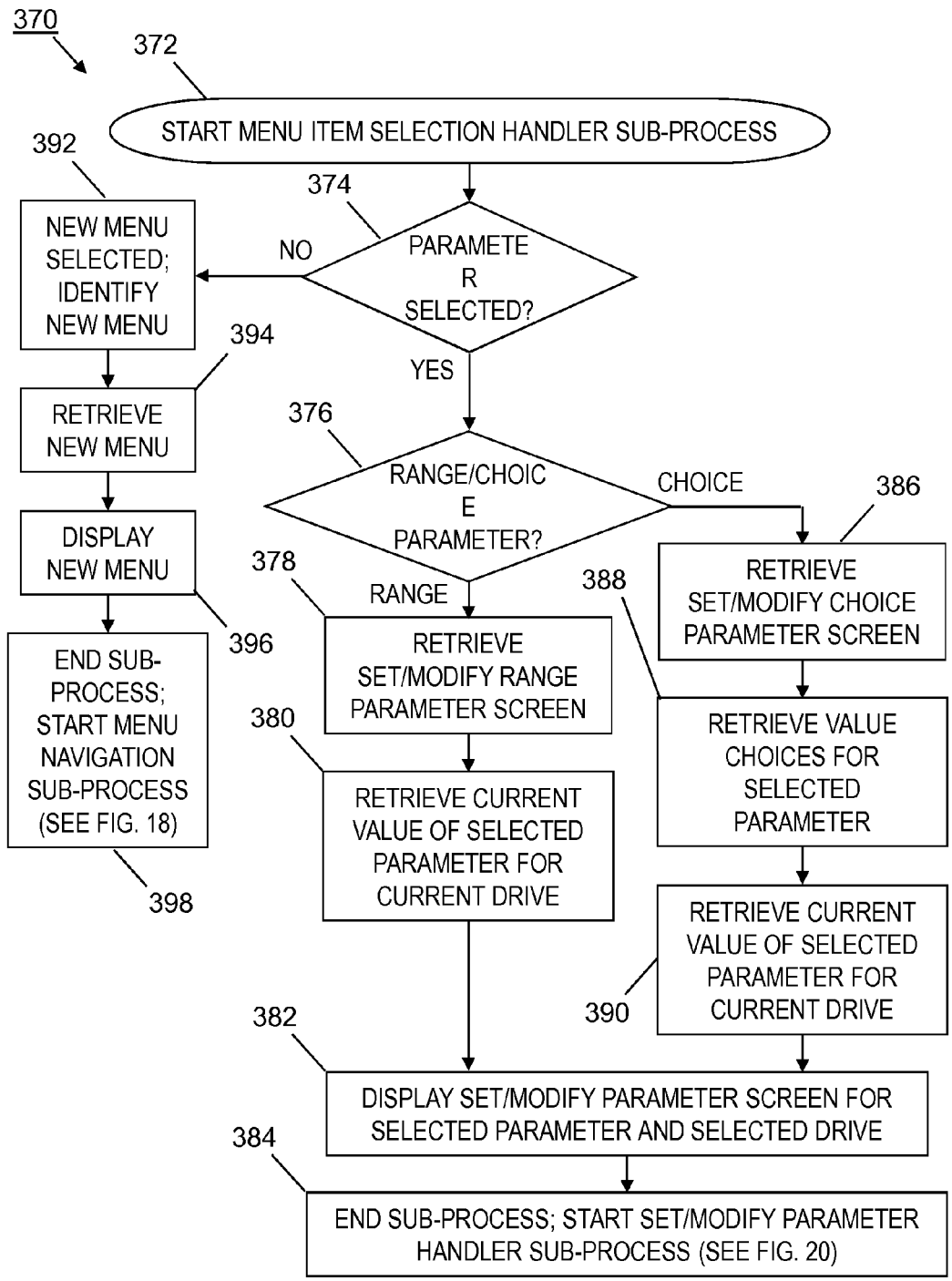
FIG. 19 is a flow chart of an exemplary menu item selection handler sub-process associated with setting or modifying a programmable parameter.

With reference to FIG. 19, an exemplary menu item selection handler sub-process 370 associated with setting or modifying a programmable parameter begins at 372 where the sub-process starts. At 374, if the current menu item selection is a programmable parameter, the sub-process may advance to 376 to determine whether the programmable parameter is a "range" parameter or a "choice" parameter. A "range" parameter is a programmable parameter that may be set or modified to a value within a predetermined range of values (e.g., 204 (FIG. 13)). A "choice" parameter is a programmable parameter that may be set to any value within a list of value choices (e.g., 220 (FIG. 14)). If the selected programmable parameter is a "range" parameter, a set/modify "range" parameter screen may be retrieved (378). Next, a current value for the selected programmable parameter associated with a currently selected drive may be retrieved (380). The currently selected drive may be based on, for example, a default drive selection or activations of the power/drive select switch (e.g., 122 (FIG. 8)). The currently selected drive may also be based on drive selection using a drive select screen (e.g., 215 (FIG. 14)) and corresponding menu navigation (see FIG. 18) to select the drive. The currently selected drive corresponds to a programmable parameter set from a plurality of programmable parameters. At 382, the set/modify parameter screen with the current value for the selected programmable parameter and selected drive may be displayed on a graphic display (e.g., 126 (FIG. 8)). Next, the menu item selection handler sub-process may be ended and the set/modify parameter handler sub-process (see FIG. 20) may be started.

At 376, if the selected programmable parameter is a "choice" parameter, a set/modify choice parameter screen may be retrieved (386). Then, values for each item in the list of choices for the selected programmable parameter may be retrieved (388). Next, a current value for the selected programmable parameter associated with a currently selected drive may be retrieved (390). At this point, the process advances to 382 and continues as described above.

At 374, if the current menu item selection is not a programmable parameter, a new (i.e., lower level) menu was selected and the sub-process may advance to 392 to identify the new menu. Next, the new menu may be retrieved (394). At 396, the new menu may be displayed. Next, the menu item selection handler sub-process may be ended and the menu navigation sub-process (see FIG. 18) may be started. The various aspects of FIG. 19 described above may be automated, semi-automated, or manual and may be implemented through hardware, software, firmware, or combinations thereof.

Figure 20:
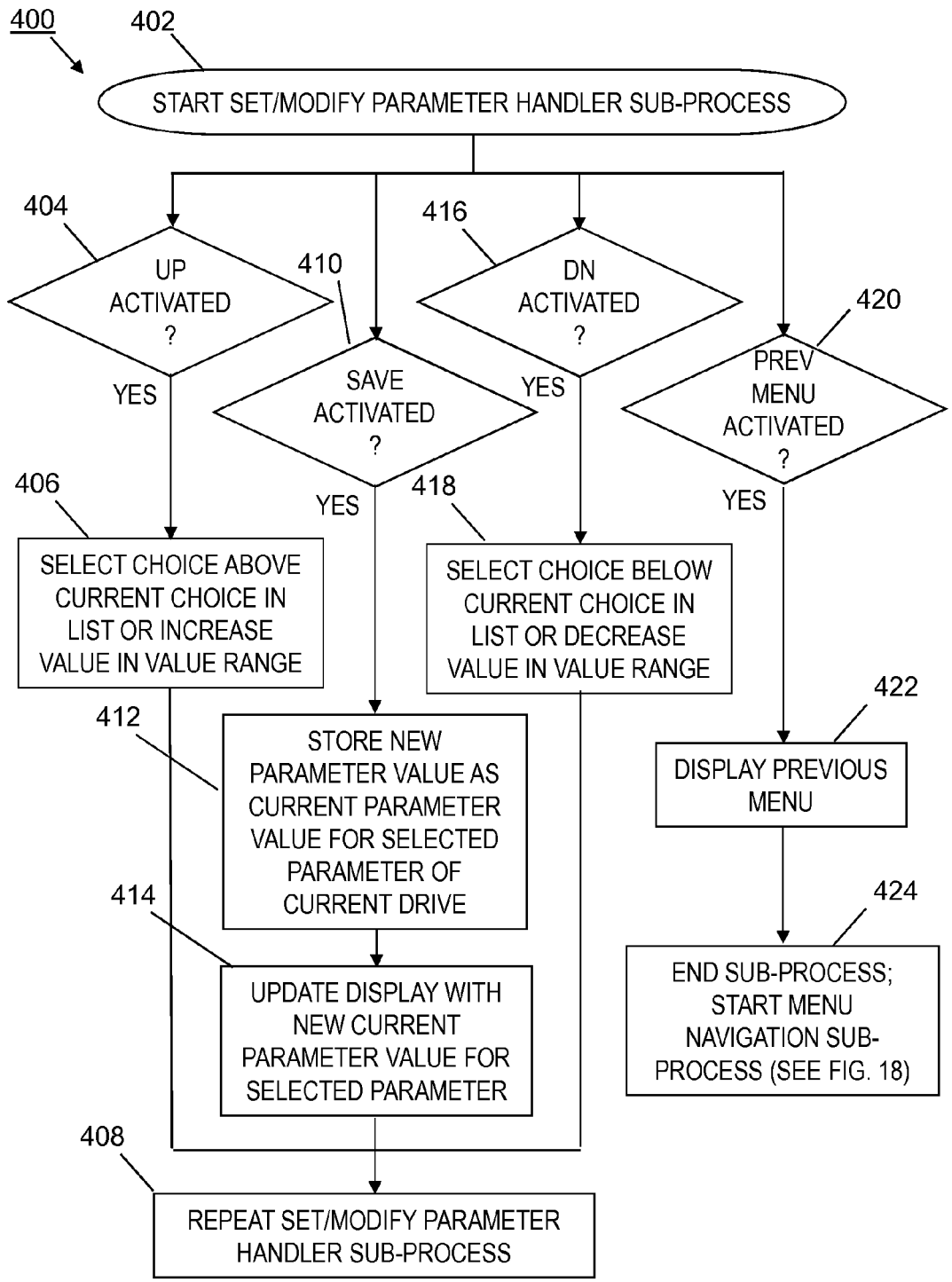
FIG. 20 is a flow chart of an exemplary set/modify parameter handler sub-process associated with setting or modifying a programmable parameter.

With reference to FIG. 20, an exemplary set/modify parameter handler sub-process 400 associated with setting or modifying a programmable parameter begins at 402 where the sub-process starts. At 404, the process may detect an up activation. If an up activation is not detected, the process does not advance beyond 404. If an up activation is detected, the parameter value choice above the current parameter value choice may be selected and highlighted to indicate the newly selected parameter value from a list of parameter value choices (i.e., when the selected programmable parameter is a "choice" parameter) (406). Alternatively, when the selected programmable parameter is a "range" parameter, if an up activation is detected, the selected parameter value may be increased to the next predetermined higher value within the range of values for the corresponding programmable parameter (406). For the "range" parameter adjustment, a MORE screen object may be highlighted to indicate the last adjustment made to the selected programmable parameter was based on an up activation. Next, at 408, the set/modify parameter handler sub-process may be repeated.

At 410, the process may detect a save activation. If a save activation is not detected, the process does not advance beyond 410. For example, moving a joystick control (e.g., 128 (FIG. 8)) to the right or pressing a save switch (e.g., 178 (FIG. 11)) may provide a save activation. If a save activation is detected, the new parameter value may be stored as the current parameter value for the selected programmable parameter of the currently selected drive (412). At 414, the set/modify parameter display may be updated with the new current parameter value for the selected programmable parameter of the currently selected drive. Next, at 408, the set/modify parameter handler sub-process may be repeated.

At 416, the process may detect a down activation. If a down activation is not detected, the process does not advance beyond 416. If an down activation is detected, the parameter value choice below the current parameter value choice may be selected and highlighted to indicate the newly selected parameter value from the list of parameter value choices (i.e., when the selected programmable parameter is a "choice" parameter) (406). Alternatively, when the selected programmable parameter is a "range" parameter, if a down activation is detected, the selected parameter value may be decreased to the next predetermined lower value within the range of values for the corresponding programmable parameter (406). For the "range" parameter adjustment, a LESS screen object may be highlighted to indicate the last adjustment made to the selected programmable parameter was based on a down activation. Next, at 408, the set/modify parameter handler sub-process may be repeated.

At 420, the process detects a previous menu activation. If a previous menu activation is not detected, the process does not advance beyond 420. If a previous menu activation is detected, the previous menu in a menu hierarchy (e.g., 264 (FIG. 15)) may be displayed (422), unless, for example, the current menu is the main menu. Next, at 424, the set/modify parameter handler sub-process may be ended and a menu navigation sub-process (see FIG. 18) may be started.

In another embodiment, set/modify parameter handler sub-process 400 may periodically check the condition of the corresponding components associated with an up activation, save activation, down activation, and previous menu activation in a loop to determine if corresponding activations occur. The various aspects of FIG. 20 described above may be automated, semi-automated, or manual and may be implemented through hardware, software, firmware, or combinations thereof.

With reference to FIG. 21, an exemplary drive select monitor sub-process 430 associated with setting or modifying a programmable parameter begins at 432 where the sub-process starts. At 434, the sub-process may detect a drive select activation of a power/drive select switch (e.g., FIG. 8, 122). In another embodiment, the process may periodically check the condition of the drive select position of the power/drive select switch. If there is a drive select activation, the sub-process may determine if the set/modify parameter handler sub-process is running (436). If the set/modify parameter handler sub-process is not running, the next drive after the currently selected drive in a predetermined list of drives may become the current drive (438). The list of drives corresponds to a list of programmable parameter sets. Generally, the list of drives may be advanced through in a continuous loop so that the selected drive advances incrementally from the first drive to the last drive with the first drive following the last drive. At 440, the selected drive identified on the display may be updated to reflect the newly selected drive and the sub-process returns to 434. Notably, the drive select monitor sub-process may be repeated until the programming process ends.

At 436, if the set/modify parameter handler sub-process is running, the next drive after the currently selected drive may become the current drive (442). Next, a current value for the selected programmable parameter associated with the new current drive may be retrieved (444). At 446, the selected drive identified on the display is updated to reflect the newly selected drive, the current value of the selected programmable parameter on the display may be updated to reflect the current value associated with the newly selected drive, and the sub-process returns to 434. The various aspects of FIG. 21 described above may be automated, semi-automated, or manual and may be implemented through hardware, software, firmware, or combinations thereof.

Figure 22:
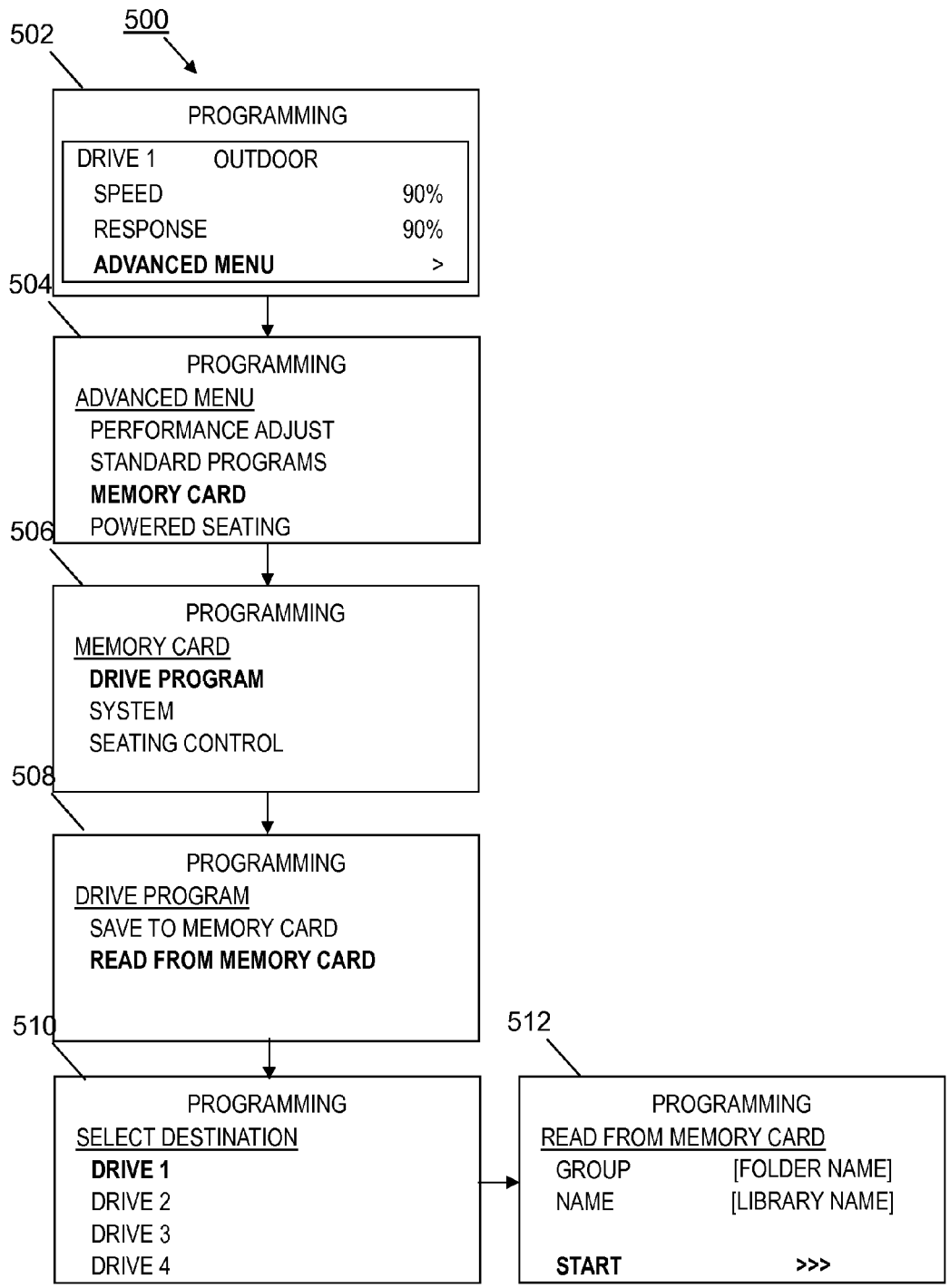
FIGS. 22 and 23 are examples of sequences of display screens on an apparatus associated with a power driven wheelchair for communicating one or more library parameter sets from a portable storage medium to a local storage device associated with the power driven wheelchair.

With reference to FIG. 22, an exemplary sequence of display screens 500 on an apparatus associated with a power driven wheelchair for communicating a library parameter set from a portable storage medium to a local storage device associated with the power driven wheelchair begins at a first screen 502. The library parameter set may also be referred to as a programmable parameter set. However, to simplify the description when the parameter set is located on the portable storage medium it may be referred to as a library parameter set and when the parameter set is on the local storage device associated with the power driven wheelchair it may be referred to as a programmable parameter set. Thus, the library parameter set may be read from the portable storage medium and saved to the local storage device in storage locations for a programmable parameter set.

The display screens 500 may be presented on a display 66 (FIG. 4) of a system controller 32 (FIG. 4) or on a display 92 (FIG. 5) of a programmer 60 (FIG. 5) connected to the system controller. The first screen 502 depicts an exemplary main menu for a programming mode of the power driven wheelchair. As shown in 502, a currently selected programmable parameter set may be identified as DRIVE 1 and may be named OUTDOOR. The main menu may include three menu items and bold highlighting may indicate that the third menu item, ADVANCED MENU, is currently selected. In other embodiments, use of a pointer or any other suitable form of highlighting may be used to indicate the current or active selection in this menu and subsequent menus or other types of screens. With the ADVANCED MENU selected, a "select" activation may advance the sequence 500 to the second screen 504. A "select" activation, for example, may be provided by moving a joystick control 128 (FIG. 8) to the right or by pressing a select switch 176 (FIG. 12).

The second screen 504 depicts an exemplary ADVANCED MENU. As shown in 504, the ADVANCED MENU may include four menu items and bold highlighting may indicate that the third menu item, MEMORY CARD, is currently selected. With the MEMORY CARD selected, a "select" activation may advance the sequence 500 to the third screen 506.

The third screen 506 depicts an exemplary MEMORY CARD menu. As shown in 506, the MEMORY CARD menu may include three menu items and bold highlighting may indicate that the first menu item, DRIVE PROGRAM, is currently selected. With the DRIVE PROGRAM selected, a "select" activation may advance the sequence 500 to the fourth screen 508.

The fourth screen 508 depicts an exemplary DRIVE PROGRAM menu. As shown in 508, the DRIVE PROGRAM menu may include two menu items and bold highlighting may indicate that the second menu item, READ FROM MEMORY CARD, is currently selected. With READ FROM MEMORY CARD selected, a "select" activation may advance the sequence 500 to the fifth screen 510.

The fifth screen 510 depicts a SELECT DESTINATION menu. As shown in 510, the SELECT DESTINATION menu may include four menu items and bold highlighting may indicate that the first menu item, DRIVE 1, is currently selected. With DRIVE 1 selected, a "select" activation may select a storage area designated for a programmable parameter set named DRIVE 1 as the destination location for a library parameter set from the portable storage medium. Additionally, the "select" activation may advance the sequence 500 to the sixth screen 512.

The sixth screen 512 depicts an exemplary READ FROM MEMORY CARD screen. As shown in 512, the READ FROM MEMORY CARD screen may include three menu items and bold highlighting may indicate that the third menu item, START, is currently selected. The first and second menu items may include fields that are used to identify a desired library parameter set to be read. For example, a GROUP menu item may include a [FOLDER NAME] field that may identify a folder on the portable storage medium within which the desired library parameter set is stored. Additionally, a NAME menu item may include a [LIBRARY NAME] field that may identify a physical or logical name (e.g., library 1 parameter set) associated with the desired library parameter set. The [FOLDER NAME] and [LIBRARY NAME] fields, for example, may be filled by browsing a pull-down list using a navigation control and selecting a desired item. Alternatively, any suitable technique for filling the [FOLDER NAME] and [LIBRARY NAME] fields may be implemented. Once the [FOLDER NAME] and [LIBRARY NAME] fields are filled, with START selected, a "select" activation will initiate reading the selected library parameter set from the portable storage medium at storage locations associated with the [FOLDER NAME] and [LIBRARY NAME] and saving it to the local storage device as a programmable parameter set at storage locations associated with the selected destination (i.e., DRIVE 1).

Figure 23:
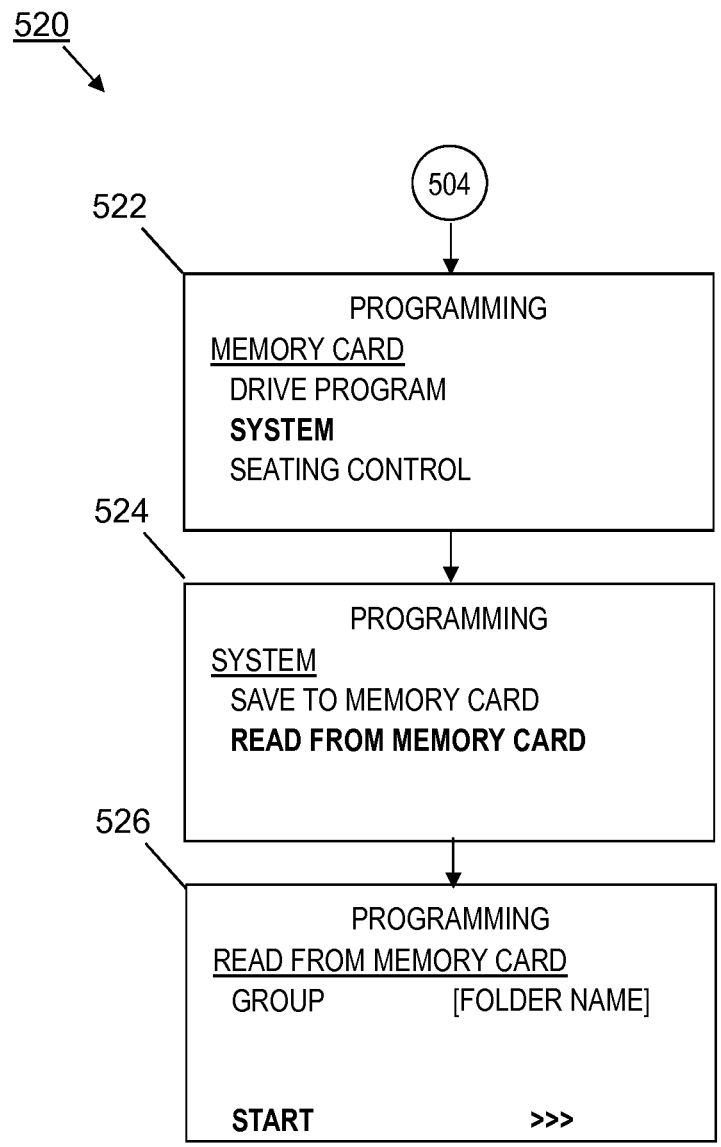

With reference to FIG. 23, an exemplary sequence of display screens 520 on an apparatus associated with a power driven wheelchair for communicating a group of library parameter sets from a portable storage medium to a local storage device associated with the power driven wheelchair begins with the first two screens (502, 504) of FIG. 22. The third screen 522 depicts an exemplary MEMORY CARD menu. As shown in 522, bold highlighting may indicate that the second menu item, SYSTEM, is currently selected. With SYSTEM selected, a "select" activation may advance the sequence 520 to the fourth screen 524.

The fourth screen 524 depicts an exemplary SYSTEM menu. As shown in 524, the SYSTEM menu may include two menu items and bold highlighting may indicate that the second menu item, READ FROM MEMORY CARD, is currently selected. With READ FROM MEMORY CARD selected, a "select" activation may advance the sequence 520 to the fifth screen 526.

The fifth screen 526 depicts an exemplary READ FROM MEMORY CARD screen. As shown in 526, the READ FROM MEMORY CARD screen may include two menu items and bold highlighting may indicate that the second menu item, START, is currently selected. The first menu item may include a field that is used to identify a desired group of library parameter sets to be read. For example, a GROUP menu item may include a [FOLDER NAME] field that may identify a folder on the portable storage medium within which the desired group of library parameter sets is stored. The [FOLDER NAME] field, for example, may be filled by browsing a pull-down list using a navigation control and selecting a desired item. Alternatively, any suitable technique for filling the [FOLDER NAME] field may be implemented. Once the [FOLDER NAME] field is filled, with START selected, a "select" activation will initiate reading the selected group of library parameter sets from the portable storage medium at storage locations associated with the [FOLDER NAME] and saving the group to the local storage device as programmable parameter sets at storage locations designated for the programmable parameter sets.

Figure 24:
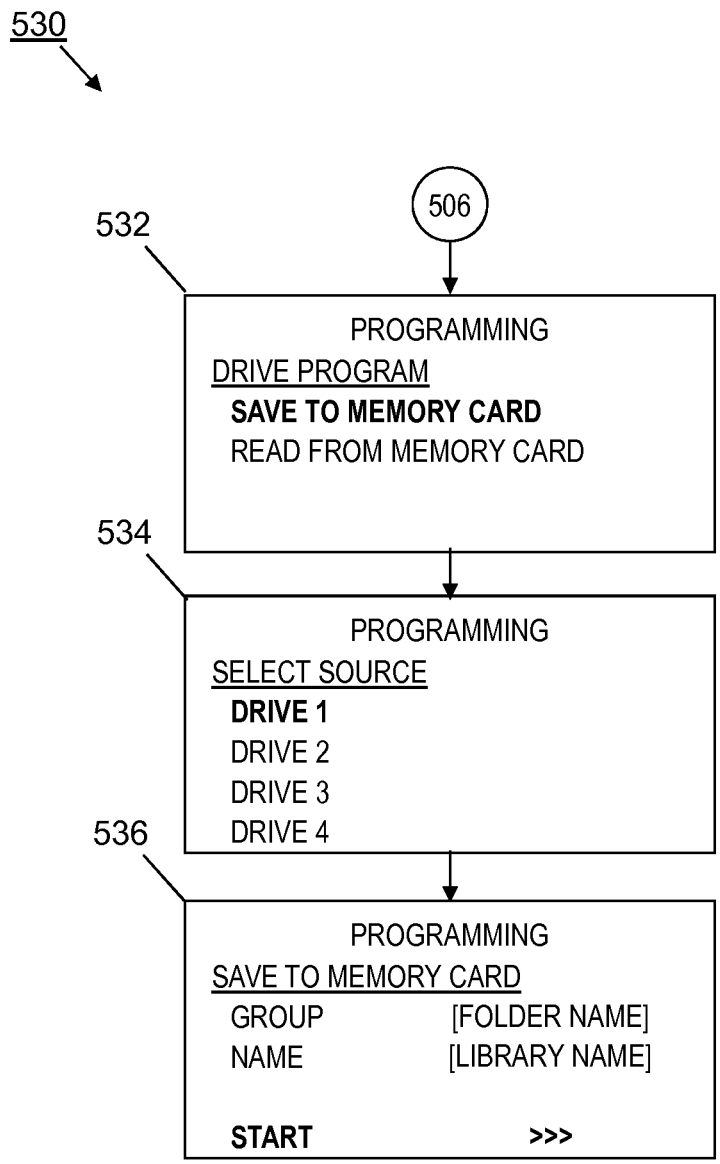
FIGS. 24 and 25 are examples of sequences of display screens on an apparatus associated with a power driven wheelchair for communicating one or more programmable parameter sets from a local storage device associated with the power driven wheelchair to a portable storage medium.

With reference to FIG. 24, an exemplary sequence of display screens 530 on an apparatus associated with a power driven wheelchair for communicating a programmable parameter set from a local storage device associated with the power driven wheelchair to a portable storage medium begins with the first three screens (502, 504, 506) of FIG. 22. The fourth screen 532 depicts an exemplary DRIVE PROGRAM menu. As shown in 532, the DRIVE PROGRAM menu may include two menu items and bold highlighting may indicate that the first menu item, SAVE TO MEMORY CARD, is currently selected. With SAVE TO MEMORY CARD selected, a "select" activation may advance the sequence 530 to the fifth screen 534.

The fifth screen 534 depicts a SELECT SOURCE menu. As shown in 534, the SELECT SOURCE menu may include four menu items and bold highlighting may indicate that the first menu item, DRIVE 1, is currently selected. With DRIVE 1 selected, a "select" activation may select a storage area designated for a programmable parameter set named DRIVE 1 as the source location of a programmable parameter set from the local storage device. Additionally, the "select" activation may advance the sequence 530 to the sixth screen 536.

The sixth screen 536 depicts an exemplary SAVE TO MEMORY CARD screen. As shown in 536, the SAVE TO MEMORY CARD screen may include three menu items and bold highlighting may indicate that the third menu item, START, is currently selected. The first and second menu items may include fields that are used to identify the programmable parameter set to be saved as a library parameter set. For example, a GROUP menu item may include a [FOLDER NAME] field that may identify a folder on the portable storage medium within which the library parameter set will be saved. Additionally, a NAME menu item may include a [LIBRARY NAME] field that may identify a physical or logical name (e.g., library 1 parameter set) associated with the library parameter set to be saved. The [FOLDER NAME] and [LIBRARY NAME] fields, for example, may be filled by browsing a pull-down list using a navigation control and selecting a desired item. Alternatively, any suitable technique for filling the [FOLDER NAME] and [LIBRARY NAME] fields may be implemented. Once the [FOLDER NAME] and [LIBRARY NAME] fields are filled, with START selected, a "select" activation will initiate reading the selected programmable parameter set from the local storage device at storage locations associated with the selected source (i.e., DRIVE 1) and saving it to the portable storage medium as a library parameter set at storage locations associated with the [FOLDER NAME] and [LIBRARY NAME] fields.

Figure 25:
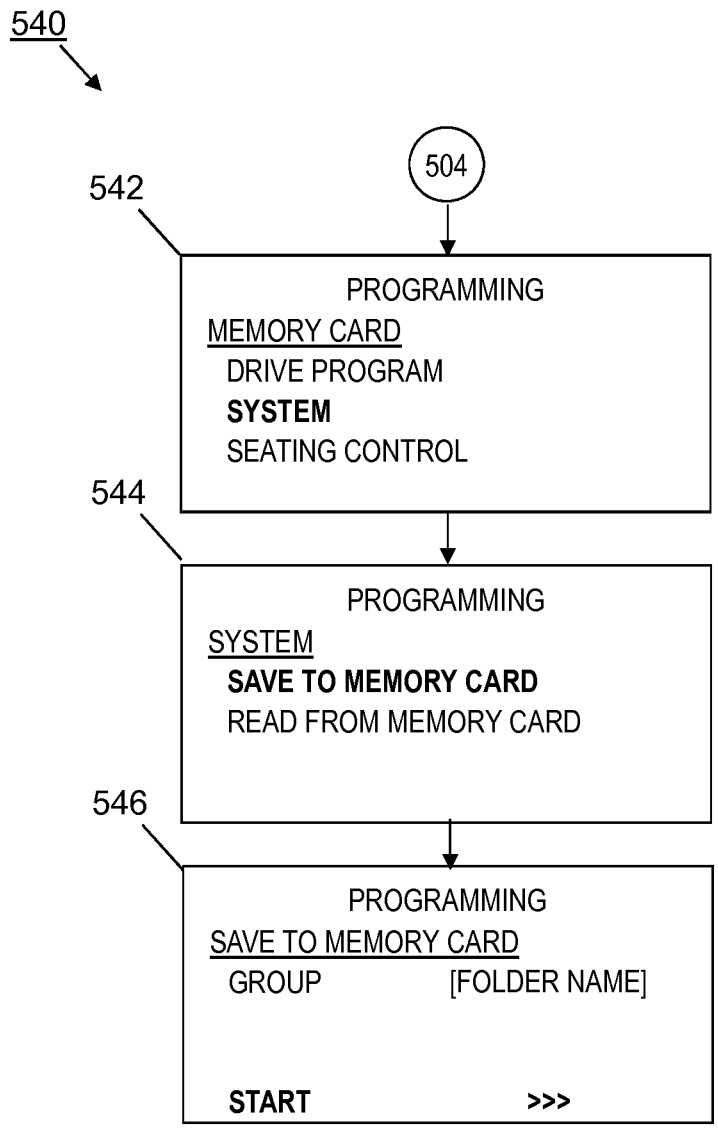

With reference to FIG. 25, an exemplary sequence of display screens 540 on an apparatus associated with a power driven wheelchair for communicating a group of programmable parameter sets from a local storage device associated with the power driven wheelchair to a portable storage medium begins with the first two screens (502, 504) of FIG. 22. The third screen 542 depicts an exemplary MEMORY CARD menu. As shown in 542, bold highlighting may indicate that the second menu item, SYSTEM, is currently selected. With SYSTEM selected, a "select" activation may advance the sequence 540 to the fourth screen 544.

The fourth screen 544 depicts an exemplary SYSTEM menu. As shown in 544, the SYSTEM menu may include two menu items and bold highlighting may indicate that the first menu item, SAVE TO MEMORY CARD, is currently selected. With SAVE TO MEMORY CARD selected, a "select" activation may advance the sequence 540 to the fifth screen 546.

The fifth screen 546 depicts an exemplary SAVE TO MEMORY CARD screen. As shown in 546, the SAVE TO MEMORY CARD screen may include two menu items and bold highlighting may indicate that the second menu item, START, is currently selected. The first menu item may include a field that is used to identify where a group of library parameter sets are to be saved. For example, a GROUP menu item may include a [FOLDER NAME] field that may identify a folder on the portable storage medium within which the group of programmable parameter sets are to be saved. The [FOLDER NAME] field, for example, may be filled by browsing a pull-down list using a navigation control and selecting a desired item. Alternatively, any suitable technique for filling the [FOLDER NAME] field may be implemented. Once the [FOLDER NAME] field is filled, with START selected, a "select" activation will initiate reading a group of programmable parameter sets from the local storage device at storage locations designated for programmable parameter sets and saving the group to the portable storage medium as library parameter sets at storage locations associated with the [FOLDER NAME].

With reference to FIGS. 22 and 24, similar exemplary sequences of display screens on an apparatus associated with a power driven wheelchair may be associated with selection of the third menu item, SEATING CONTROL, in the MEMORY CARD menu 506. With selection of SEATING CONTROL, the parameters being read from the portable storage medium or saved to the portable storage medium may be associated with control of powered seating functions or powered front rigging functions. Accordingly, with selection of DRIVE PROGRAM, the parameters being read from the portable storage medium or saved to the portable storage medium may be associated with control of powered driving functions and other non-seating control functions. However, in another embodiment, parameters for powered driving functions, powered seating functions, and powered front rigging functions may be included when the DRIVE PROGRAM is selected.

Figure 26:
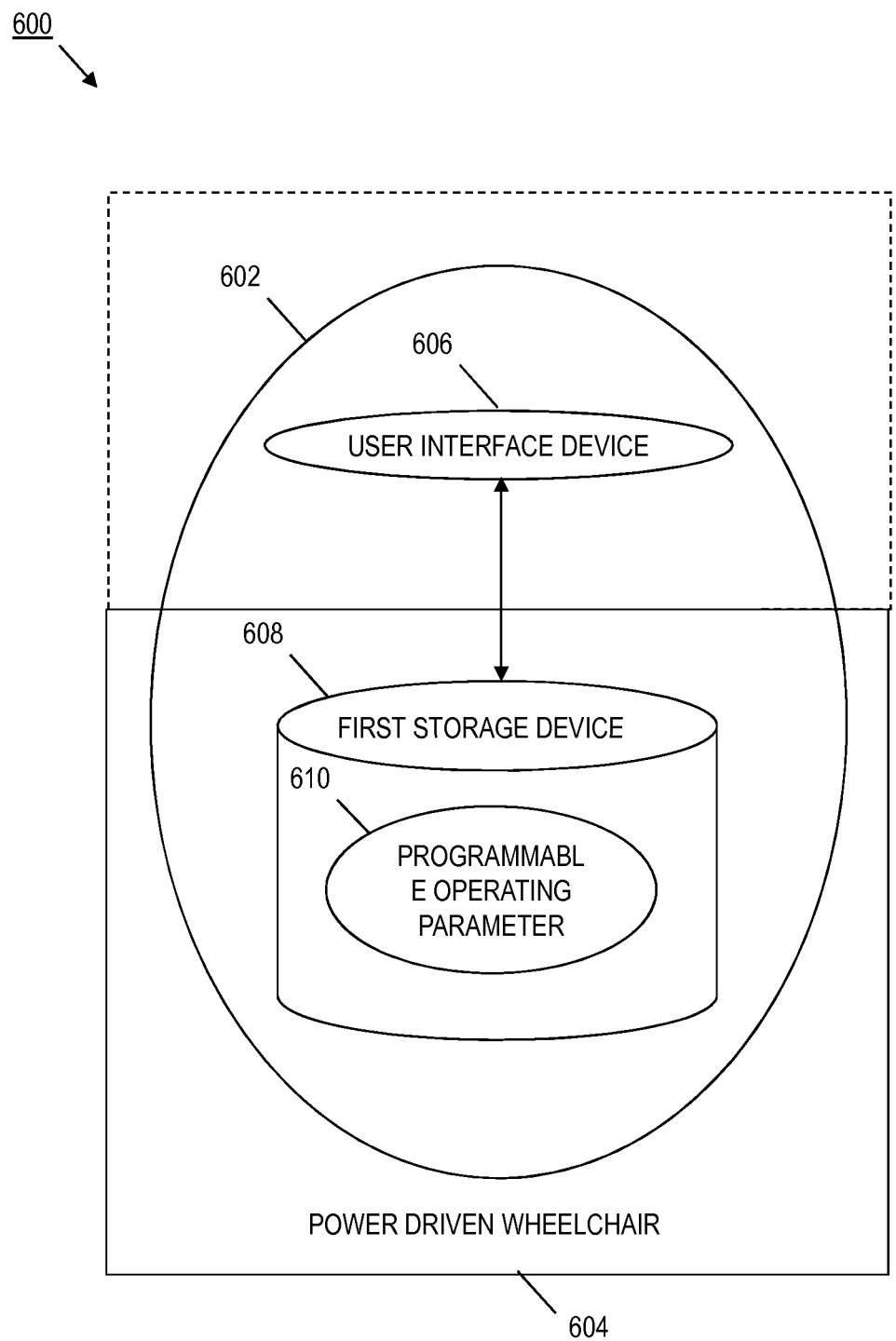
FIG. 26 is an exemplary block diagram of an apparatus associated with a power driven wheelchair for setting or modifying a programmable parameter.

With reference to FIG. 26, a block diagram 600 depicts an apparatus 602 associated with a power driven wheelchair 604 for setting or modifying a programmable parameter. As shown, the apparatus 602 may include a user interface device 606 and a first storage device 608. The user interface device may be associated with the power driven wheelchair 604 and may be adapted to operate in a programming mode. The first storage device 608 may be in operative communication with the user interface device 606. At least a portion of the first storage device 608 may be designated for storage of a programmable operating parameter 610. The programmable operating parameter 610 may be associated with operation of the power driven wheelchair 604. The user interface device 606 may be used to select the programmable operating parameter 610, select a value for the programmable operating parameter 610, and save the selected value for the programmable operating parameter 610 in the portion of the first storage device 608.

In one embodiment, the user interface device 606 may be separate from the power driven wheelchair 604, like the programmer 60 (FIG. 5) described above. In another embodiment, as shown by the dotted line, the user interface device 606 may be part of the power driven wheelchair 604, like the system controller 32 (FIG. 4) described above. Accordingly, in one embodiment, the user interface device 606 and the first storage device 608 may form at least a portion of a system controller 32 (FIG. 4) associated with the power driven wheelchair 604. In this embodiment, at least one of an on-board storage device 70 (FIG. 4) and an on-chip storage device 82 (FIG. 4) may form at least a portion of the first storage device 608.

In another embodiment, the user interface device 606 may form at least a portion of a programmer 60 (FIG. 5) associated with the power driven wheelchair 604 and the first storage device 608 may form at least a portion of a system controller 32 (FIG. 4) associated with the power driven wheelchair 604. In this embodiment, the programmer may be in operative communication with the system controller. Additionally, at least one of an on-board storage device 70 (FIG. 4) and an on-chip storage device 82 (FIG. 4) may form at least a portion of the first storage device 608. The various aspects of FIG. 26 described above may be automated, semi-automated, or manual and may be implemented through hardware, software, firmware, or combinations thereof.

Figure 27:
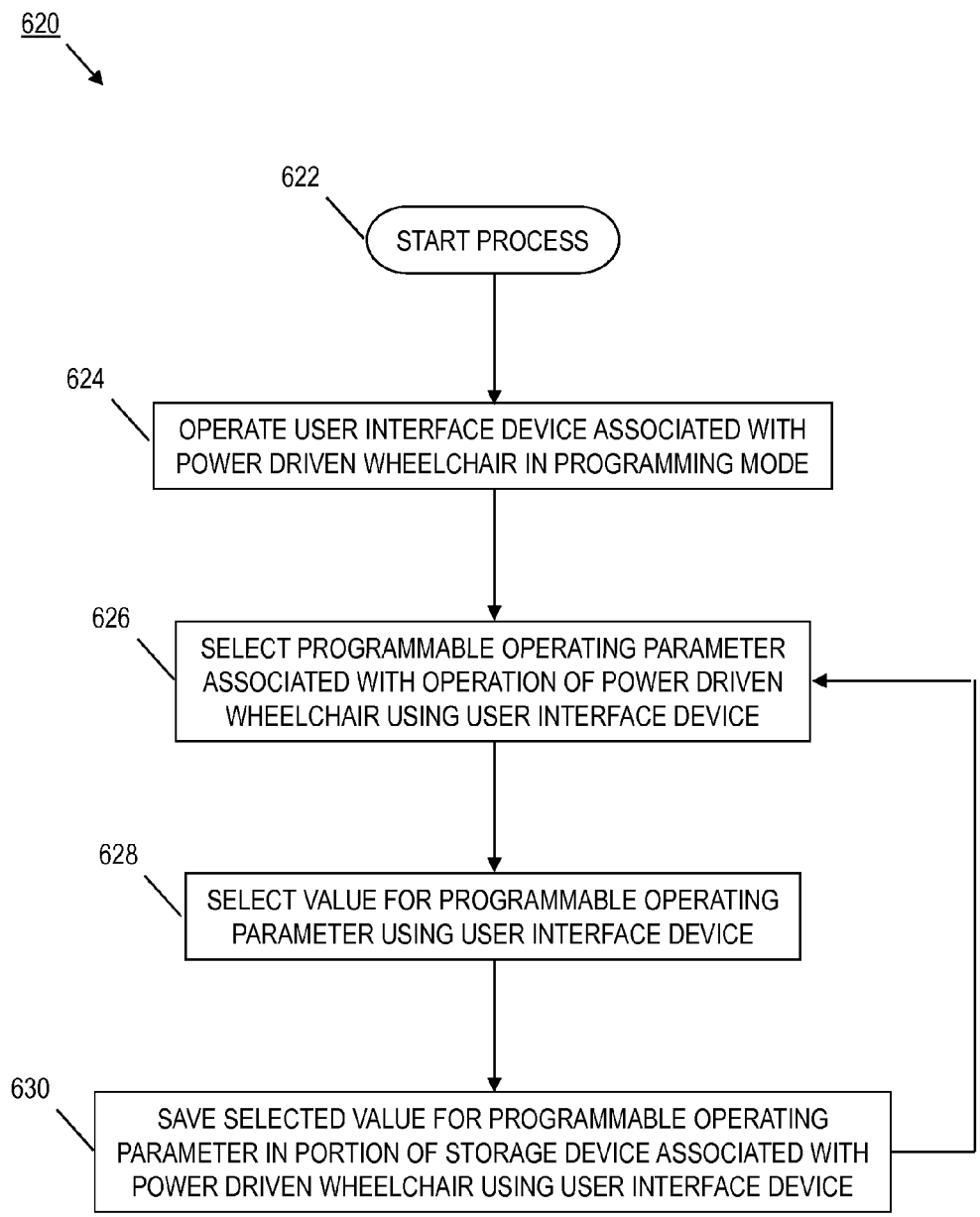
FIG. 27 is an exemplary flow chart of a process associated with a power driven wheelchair for setting or modifying a programmable parameter.

With reference to FIG. 27, a process 620 associated with a power driven wheelchair for setting or modifying a programmable parameter may begin at 622. At 624, a user interface device associated with a power driven wheelchair may be operated in a programming mode. Next, a programmable operating parameter associated with operation of the power driven wheelchair may be selected using the user interface device (626). At 628, a value for the programmable operating parameter may be selected using the user interface device. Next, the selected value for the programmable operating parameter may be saved in a portion of a storage device associated with the power driven wheelchair using the user interface device (630). From 630, the selecting and saving in 626, 628, and 630, respectively, may be repeated.

In another embodiment, the user interface device and the storage device may form at least a portion of a system controller 32 (FIG. 4) associated with the power driven wheelchair. In still another embodiment, the user interface device may form at least a portion of a programmer 60 (FIG. 5) associated with the power driven wheelchair and the storage device may form at least a portion of a system controller associated with the power driven wheelchair. In this embodiment, the programmer may be in operative communication with the system controller. In yet another embodiment, the programmable operating parameter may be a range parameter with selectable parameter values within a range defined by a lower parameter limit and an upper parameter limit. In this embodiment, the selectable parameter values for the range parameter are further defined by predetermined increments between a next higher parameter value or a next lower parameter value for a currently selected parameter value. In still another embodiment, the programmable operating parameter may be a choice parameter with a plurality of selectable parameter values. The various aspects of FIG. 27 described above may be automated, semi-automated, or manual and may be implemented through hardware, software, firmware, or combinations thereof.

Figure 28:
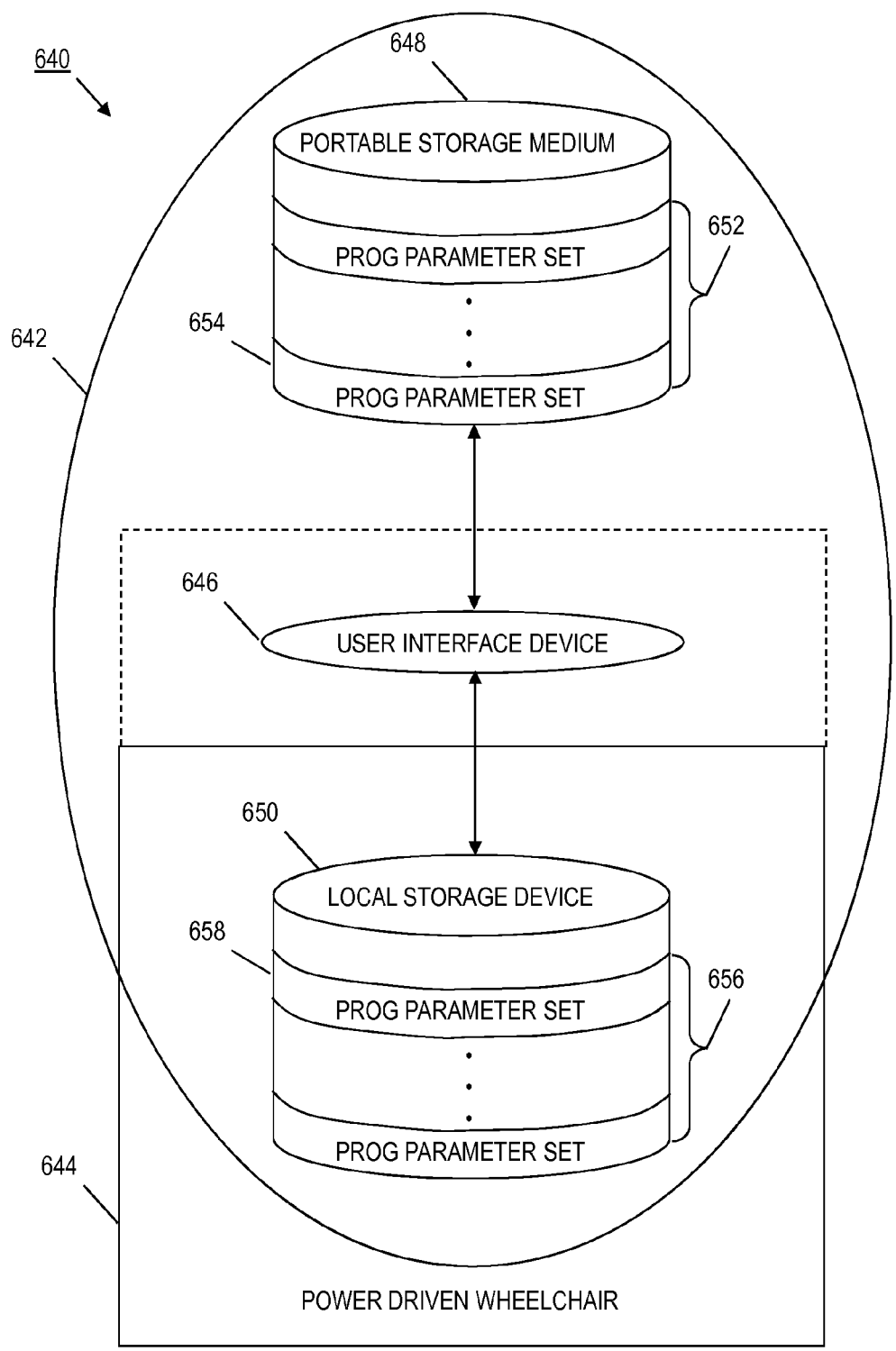
FIG. 28 is an exemplary block diagram of an apparatus associated with a power driven wheelchair for communicating a programmable parameter set.

With reference to FIG. 28, a block diagram 640 depicts an apparatus 642 associated with a power driven wheelchair 644 for communicating a programmable parameter set. As shown, the apparatus 642 may include a user interface device 646, a portable storage medium 648, and a local storage device 650. The user interface device 646 may be associated with the power driven wheelchair 644 and may be adapted to operate in a programming mode. The portable storage medium 648 may be in operative communication with the user interface device 646 with at least a portion 652 designated for storage of one or more programmable parameter sets 654 associated with operation of the power driven wheelchair 644. The local storage device 650 may be in operative communication with the user interface device 646 with at least a portion 656 designated for storage of one or more programmable parameter sets 658 associated with operation of the power driven wheelchair 644. The user interface device 646 may be used to select one or more programmable parameter sets 654 from the portable storage medium 648 and save said selected programmable parameter sets 654 to the local storage device 650 or vice versa.

In another embodiment, the user interface device 646 and the local storage device 650 may form at least a portion of a system controller 32 (FIG. 4) associated with the power driven wheelchair 644. The system controller 32 (FIG. 4) may include a storage medium interface 72 (FIG. 4) adapted to receive the portable storage medium 648 and facilitate operative communication between the user interface device 646 and the portable storage medium 648.

In still another embodiment, the user interface device 646 may form at least a portion of a programmer 60 (FIG. 5) associated with the power driven wheelchair 644 and the local storage device 650 may form at least a portion of a system controller 32 (FIG. 4) associated with the power driven wheelchair 644. The programmer 60 (FIG. 5) may be in operative communication with the system controller 32 (FIG. 4). The system controller 32 (FIG. 4) may include a storage medium interface 72 (FIG. 4) adapted to receive the portable storage medium 648 and facilitate operative communication between the user interface device 646 and the portable storage medium 648.

In yet another embodiment, the user interface device 646 may form at least a portion of a programmer 60 (FIG. 5) associated with the power driven wheelchair 644 and the local storage device 650 may form at least a portion of a system controller 32 (FIG. 4) associated with the power driven wheelchair 644. The programmer 60 (FIG. 5) may be in operative communication with the system controller 32 (FIG. 4). The programmer 60 (FIG. 5) may include a storage medium interface 98 (FIG. 5) adapted to receive the portable storage medium 648 and facilitate operative communication between the user interface device 646 and the portable storage medium 648. The various aspects of FIG. 28 described above may be automated, semi-automated, or manual and may be implemented through hardware, software, firmware, or combinations thereof.

Figure 29:
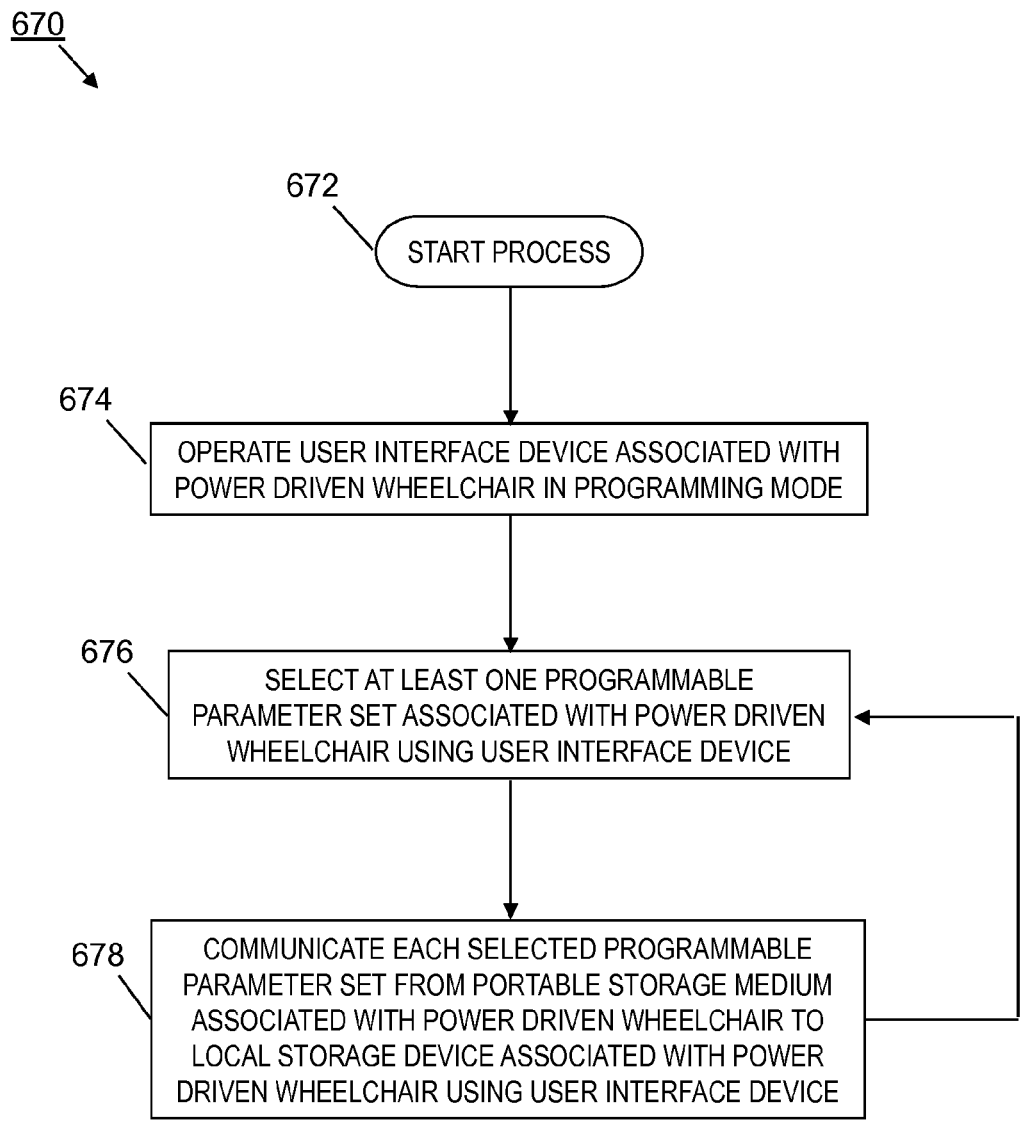
FIG. 29 is an exemplary flow chart of a process associated with a power driven wheelchair for communicating a programmable parameter set.

With reference to FIG. 29, a process 670 associated with a power driven wheelchair for communicating a programmable parameter set may start at 672. At 674, a user interface device associated with a power driven wheelchair may be operated in a programming mode. Next, at least one programmable parameter set associated with the power driven wheelchair may be selected using the user interface device (676). At 678, each selected programmable parameter set may be communicated from a portable storage medium associated with the power driven wheelchair to a local storage device associated with the power driven wheelchair or vice versa using the user interface device. In this embodiment, the portable storage device may include at least a portion designated for storage of one or more programmable parameter sets and the local storage device may include at least a portion designated for storage of one or more programmable parameter sets. From 678, the selecting and communicating in 676 and 678, respectively, may be repeated.

In another embodiment, the user interface device and the local storage device may form at least a portion of a system controller 32 (FIG. 4) associated with the power driven wheelchair. In this embodiment, the system controller 32 (FIG. 4) may include a storage medium interface 72 (FIG. 4) adapted to receive the portable storage medium and facilitate operative communication between the user interface device and the portable storage medium.

In still another embodiment, the user interface device may form at least a portion of a programmer 60 (FIG. 5) associated with the power driven wheelchair and the local storage device may form at least a portion of a system controller 32 (FIG. 4) associated with the power driven wheelchair. In this embodiment, the programmer 60 (FIG. 5) may be in operative communication with the system controller 32 (FIG. 4). The system controller 32 (FIG. 4) may include a storage medium interface 72 (FIG. 4) adapted to receive the portable storage medium and facilitate operative communication between the user interface device and the portable storage medium.

In yet another embodiment, the user interface device may form at least a portion of a programmer 60 (FIG. 5) associated with the power driven wheelchair and the local storage device may form at least a portion of a system controller 32 (FIG. 4) associated with the power driven wheelchair. In this embodiment, the programmer 60 (FIG. 5) may be in operative communication with the system controller 32 (FIG. 4). The programmer 60 (FIG. 5) may include a storage medium interface 98 (FIG. 5) adapted to receive the portable storage medium and facilitate operative communication between the user interface device and the portable storage medium.

In another embodiment, the programmable parameter sets may include programmable operating parameters associated with driving the power driven wheelchair. In another embodiment, the programmable parameter sets may include programmable operating parameters associated with operating powered seating for the power driven wheelchair. In still another embodiment, the programmable parameter sets may include programmable operating parameters associated with operating powered front rigging for the power driven wheelchair.

In yet another embodiment, the selecting in 676 may include selecting all programmable parameter sets stored on the local storage device and the communicating in 678 may include communicating said selected programmable parameter sets from the local storage device to the portable storage medium. In another embodiment, the selecting in 676 may include selecting all programmable parameter sets stored within a select folder on the portable storage medium and the communicating in 678 may include communicating said selected programmable parameter sets from the portable storage medium to the local storage device. The various aspects of FIG. 29 described above may be automated, semi-automated, or manual and may be implemented through hardware, software, firmware, or combinations thereof.

While the invention is described herein in conjunction with one or more exemplary embodiments, it is evident that many alternatives, modifications, and variations will be apparent to those skilled in the art. Accordingly, exemplary embodiments in the preceding description are intended to be illustrative, rather than limiting, of the spirit and scope of the invention. More specifically, it is intended that the invention embrace all alternatives, modifications, and variations of the exemplary embodiments described herein that fall within the spirit and scope of the appended claims or the equivalents thereof. Any element in a claim that does not explicitly state "means for" performing a specified function, or "step for" performing a specific function, is not to be interpreted as a "means" or "step" clause as specified in 35 U.S.C. §112, ¶6. In particular, the use of "step of" in the claims herein is not intended to invoke the provisions of 35 U.S.C. §112, ¶6.

The invention claimed is:

1. An apparatus associated with a power driven wheelchair, comprising:
   a controller of the power driven wheelchair; and
   a portable storage medium interface adapted to facilitate operative communication between the controller and a portable storage medium;
   wherein information from the portable storage medium is communicated to the controller or vice versa via the portable storage medium interface.

2. The apparatus of claim 1, further comprising:
   a local storage device in operative communication with the controller, wherein at least a portion of the local storage device is designated for storage of information associated with operation of the power driven wheelchair;
   wherein at least a portion of the portable storage medium is designated for storage of information associated with operation of the power driven wheelchair; and
   wherein information associated with operation of the power driven wheelchair is communicated from the portable storage medium to the local storage device or vice versa.

3. The apparatus of claim 2, further comprising:
   a user interface device;
   wherein communication of information between the portable storage medium and the local storage device is in response to a selection by a user via the user interface device.

4. The apparatus of claim 2, wherein the local storage device forms at least a portion of a system controller associated with the power driven wheelchair, the system controller comprising the portable storage medium interface.

5. The apparatus of claim 2, wherein the local storage device forms at least a portion of a programmer associated with the power driven wheelchair, the programmer comprising the portable storage medium interface.

6. The apparatus of claim 1, further comprising:
   a user interface device;
   wherein communication of information between the portable storage medium and the controller is in response to a selection by a user via the user interface device.

7. The apparatus of claim 1, wherein the information includes at least one of a software program, a parameter set, help information, and a security key.

8. The apparatus of claim 1, wherein the information includes a parameter set associated with at least one of a drive setting, a system setting, and a seating setting.

9. The apparatus of claim 1, wherein the information communicated between the portable storage medium and the controller is communicated at least one of automatically, semi-automatically, and manually.

10. The apparatus of claim 1, wherein the portable storage medium comprises a mobile telephone.

11. The apparatus of claim 1, wherein the portable storage medium comprises a secure digital (SD) card.

12. The apparatus of claim 1, wherein communication of information between the portable storage medium and the controller is via at least one of a USB interface, a Bluetooth interface, and an IEEE 802.11 standard interface.

13. A method associated with a power driven wheelchair, comprising:
providing a controller of the power driven wheelchair;
providing a portable storage medium interface adapted to facilitate operative communication between the controller and a portable storage medium; and
communicating information from the portable storage medium to the controller or vice versa via the portable storage medium interface.

14. The method of claim 13, further comprising:
providing a local storage device in operative communication with the controller, wherein at least a portion of the local storage device is designated for storage of information associated with operation of the power driven wheelchair, and wherein at least a portion of the portable storage medium is designated for storage of information associated with operation of the power driven wheelchair; and
communicating information associated with operation of the power driven wheelchair from the portable storage medium to the local storage device or vice versa.

15. The method of claim 14, further comprising:
operating a user interface device associated with the power driven wheelchair;
selecting at least one programmable parameter set associated with the power driven wheelchair using the user interface device; and
communicating each selected programmable parameter set from the portable storage medium to the local storage device or vice versa.

16. The method of claim 15, further comprising performing a security check before allowing selection of the at least one programmable parameter set, wherein the security check is based on a key associated with the portable storage medium.

17. The method of claim 13, further comprising:
providing a user interface device associated with the power driven wheelchair; and
communicating information between the portable storage medium and the controller in response to a selection by a user via the user interface device.

18. The method of claim 13, further comprising establishing operative communication between the portable storage medium and the controller via a wired connection.

19. The method of claim 13, further comprising establishing operative communication between the portable storage medium and the controller via a wireless connection.

20. An apparatus associated with a power driven wheelchair, comprising:
a controller means of the power driven wheelchair; and
a portable storage medium interface means adapted to facilitate operative communication between the controller means and a portable storage medium means;
means for communicating information from the portable storage medium means to the controller means or vice versa via the portable storage medium interface means.

* * * * *